US012723571B2

(12) United States Patent
Pedretti

(10) Patent No.: US 12,723,571 B2
(45) Date of Patent: Sep. 1, 2026

(54) ENERGY STORAGE AND DELIVERY SYSTEM AND METHOD

(71) Applicant: Energy Vault, Inc., Westlake Village, CA (US)

(72) Inventor: Andrea Pedretti, Thousand Oaks, CA (US)

(73) Assignee: Energy Vault, Inc., Westlake Village, CA (US)

( * ) Notice: Subject to any disclaimer, the term of this patent is extended or adjusted under 35 U.S.C. 154(b) by 3 days.

(21) Appl. No.: 18/864,679

(22) PCT Filed: Apr. 27, 2023

(86) PCT No.: PCT/US2023/020233
§ 371 (c)(1),
(2) Date: Nov. 11, 2024

(87) PCT Pub. No.: WO2023/224780
PCT Pub. Date: Nov. 23, 2023

(65) Prior Publication Data

US 2025/0305485 A1 Oct. 2, 2025

Related U.S. Application Data

(60) Provisional application No. 63/364,864, filed on May 17, 2022.

(51) Int. Cl.
*F03G 3/00* (2006.01)
*H02K 7/18* (2006.01)

(52) U.S. Cl.
CPC .......... *F03G 3/094* (2021.08); *H02K 7/1807* (2013.01)

(58) Field of Classification Search
CPC .......... F03G 3/00; F03G 3/087; F03G 3/094; H02K 7/1807; H02K 7/1853
See application file for complete search history.

(56) References Cited

U.S. PATENT DOCUMENTS 1,720,732 A 7/1929 Jongedyk
1,822,432 A 9/1931 Bradley
(Continued)

FOREIGN PATENT DOCUMENTS

CL 199701049 5/1997
CL 201001028 9/2010
(Continued)

OTHER PUBLICATIONS

"A Weighting game," International Water Power & Dam Construction, Apr. 13, 2010, 8 pages.
(Continued)

*Primary Examiner* — Phillip A Johnson
(74) *Attorney, Agent, or Firm* — Knobbe Martens Olson & Bear LLP

(57) ABSTRACT

An energy storage and delivery system includes an elevator cage assembly operable to move blocks from a lower elevation to a higher elevation of a frame to store energy and operable to move blocks from the higher elevation to the lower elevation of the frame (e.g., by gravity) to generate electricity. The elevator cage assembly is operable to center the block relative to an elevator cage of the elevator cage assembly. The system includes a trolley on top of the frame that is operatively coupled to the elevator cage assembly by one or more cables. The trolley is operable to move to an extended position to lift the elevator cage assembly to lift a block off a row and to move to a compact position to lower the elevator cage assembly to lower a block onto a row.

20 Claims, 44 Drawing Sheets

(56) References Cited

U.S. PATENT DOCUMENTS

| | | | | |
|---|---|---|---|---|
| 2,547,935 | A | 4/1951 | Grabinski | |
| 2,627,176 | A | 2/1953 | Levy | |
| 2,924,484 | A | 2/1960 | Tolsma | |
| 3,158,228 | A * | 11/1964 | Bentley | B66B 1/42 187/291 |
| 3,405,278 | A | 10/1968 | Ley | |
| 4,018,021 | A | 4/1977 | Dow | |
| 4,284,899 | A | 8/1981 | Bendiks | |
| 4,381,839 | A | 5/1983 | Engler et al. | |
| 4,693,089 | A | 9/1987 | Bourne et al. | |
| 4,796,439 | A | 1/1989 | Yamada et al. | |
| 4,918,282 | A | 4/1990 | Cheek | |
| 5,340,218 | A | 8/1994 | Cuthbertson | |
| 5,888,043 | A | 3/1999 | Jatcko | |
| 6,282,859 | B1 | 9/2001 | Van Der Heijden | |
| 6,557,316 | B2 | 5/2003 | Van Der Heijden | |
| 6,836,035 | B1 | 12/2004 | Pawletko | |
| 6,866,815 | B2 | 3/2005 | Gohres et al. | |
| 6,955,015 | B2 | 10/2005 | Manthei | |
| 7,191,710 | B2 | 3/2007 | Powell | |
| 7,561,936 | B2 | 7/2009 | Matsufuji | |
| 7,712,326 | B2 | 5/2010 | Jagusztyn et al. | |
| 7,743,609 | B1 | 6/2010 | Brostmeyer | |
| 7,775,571 | B2 | 8/2010 | Waisanen | |
| 7,836,646 | B2 | 11/2010 | Matsufuji | |
| 7,886,537 | B2 | 2/2011 | Jagusztyn et al. | |
| 7,973,420 | B2 | 7/2011 | Scott | |
| 8,176,702 | B2 | 5/2012 | Adam | |
| 8,465,071 | B2 | 6/2013 | Risi et al. | |
| 8,628,289 | B1 | 1/2014 | Benedict | |
| 8,667,750 | B2 | 3/2014 | Speer | |
| 8,674,527 | B2 | 3/2014 | Fyke et al. | |
| 9,059,605 | B2 | 6/2015 | Murray et al. | |
| 9,422,108 | B2 | 8/2016 | Hognaland | |
| 9,523,201 | B2 | 12/2016 | Romanenko | |
| 9,688,520 | B1 | 6/2017 | Khalil | |
| 9,989,271 | B1 | 6/2018 | Becker | |
| 10,683,851 | B2 | 6/2020 | Pedretti et al. | |
| 10,830,216 | B2 | 11/2020 | Pedretti et al. | |
| 10,837,429 | B2 | 11/2020 | Pedretti et al. | |
| 10,883,772 | B2 | 1/2021 | Alsadah et al. | |
| 10,935,005 | B2 | 3/2021 | Bhargava | |
| 10,961,051 | B1 | 3/2021 | Lindbo et al. | |
| 11,011,967 | B2 | 5/2021 | Zhang | |
| 11,193,702 | B2 | 12/2021 | Bissell et al. | |
| 11,525,437 | B2 | 12/2022 | Pedretti et al. | |
| 11,555,484 | B2 | 1/2023 | Pedretti et al. | |
| 11,719,229 | B2 | 8/2023 | Pedretti et al. | |
| 11,746,758 | B2 | 9/2023 | Pedretti et al. | |
| 11,761,431 | B2 | 9/2023 | Pedretti et al. | |
| 11,761,432 | B2 | 9/2023 | Pedretti | |
| 11,820,629 | B2 | 11/2023 | Pedretti et al. | |
| 11,920,569 | B2 | 3/2024 | Pedretti et al. | |
| 12,044,218 | B2 | 7/2024 | Pedretti | |
| 12,049,874 | B2 | 7/2024 | Pedretti et al. | |
| 12,132,312 | B2 | 10/2024 | Pedretti et al. | |
| 12,215,676 | B2 | 2/2025 | Pedretti | |
| 12,345,239 | B2 | 7/2025 | Pedretti et al. | |
| 2002/0197135 | A1 | 12/2002 | Amtzen et al. | |
| 2003/0009970 | A1 | 1/2003 | MacDonald et al. | |
| 2003/0019828 | A1 | 1/2003 | Choi et al. | |
| 2003/0214135 | A1 | 11/2003 | Peloquin | |
| 2003/0215318 | A1 | 11/2003 | Buzzoni | |
| 2004/0020145 | A1 | 2/2004 | Matsufuji | |
| 2005/0252144 | A1 | 11/2005 | MacDonald et al. | |
| 2007/0000246 | A1 | 1/2007 | Prastitis | |
| 2007/0186502 | A1 | 8/2007 | Marsh et al. | |
| 2007/0193183 | A1 | 8/2007 | Price et al. | |
| 2007/0193808 | A1 | 8/2007 | Perakes et al. | |
| 2008/0098687 | A1 | 5/2008 | Marsh et al. | |
| 2009/0077920 | A1 | 3/2009 | Korman et al. | |
| 2009/0173027 | A1 | 7/2009 | Bennett | |
| 2009/0193808 | A1 | 8/2009 | Fiske | |
| 2009/0200814 | A1 | 8/2009 | Hellgren | |
| 2009/0231123 | A1 | 9/2009 | Rowell et al. | |
| 2009/0284021 | A1 | 11/2009 | Scott | |
| 2010/0283263 | A1 | 11/2010 | Schilling | |
| 2010/0301616 | A1 | 12/2010 | Al-Khamis | |
| 2011/0027107 | A1 | 2/2011 | Bekken | |
| 2011/0037275 | A1 | 2/2011 | Peitzke et al. | |
| 2011/0050158 | A1 | 3/2011 | MacDonald et al. | |
| 2011/0112731 | A1 | 5/2011 | Harada | |
| 2011/0123257 | A1 | 5/2011 | Mills et al. | |
| 2011/0241356 | A1 | 10/2011 | Khoshnevis | |
| 2012/0067674 | A1 | 3/2012 | Legeret et al. | |
| 2012/0272500 | A1 | 11/2012 | Reuteler | |
| 2012/0306223 | A1 | 12/2012 | Karlsson | |
| 2013/0125540 | A1 | 5/2013 | Vainonen et al. | |
| 2013/0241210 | A1 | 9/2013 | Chan et al. | |
| 2014/0110194 | A1 | 4/2014 | Zhu et al. | |
| 2014/0271240 | A1 | 9/2014 | Daily | |
| 2015/0048622 | A1 | 2/2015 | Schegerin | |
| 2015/0130191 | A1 | 5/2015 | Houvener et al. | |
| 2015/0285037 | A1 | 10/2015 | Sadiq | |
| 2016/0032586 | A1 | 2/2016 | Radford | |
| 2016/0084236 | A1 * | 3/2016 | Kellinger | F03B 13/186 60/495 |
| 2016/0138572 | A1 | 5/2016 | Boone | |
| 2017/0030069 | A1 | 2/2017 | Radford | |
| 2017/0038103 | A1 | 2/2017 | Torrent | |
| 2017/0288457 | A1 | 10/2017 | Peitzke et al. | |
| 2018/0010582 | A1 | 1/2018 | Aranovich et al. | |
| 2018/0362272 | A1 | 12/2018 | Stott et al. | |
| 2019/0393756 | A1 | 12/2019 | Nehmeh | |
| 2020/0028379 | A1 | 1/2020 | Pedretti et al. | |
| 2020/0044481 | A1 | 2/2020 | Soloboev et al. | |
| 2020/0109703 | A1 | 4/2020 | Bhargava | |
| 2020/0290804 | A1 | 9/2020 | Fjeldheim | |
| 2021/0188549 | A1 | 6/2021 | Fjeldheim et al. | |
| 2021/0198039 | A1 | 7/2021 | Salichs et al. | |
| 2021/0214100 | A1 | 7/2021 | Thayer | |
| 2021/0214199 | A1 | 7/2021 | Austrheim | |
| 2021/0221618 | A1 | 7/2021 | Austrheim | |
| 2021/0387769 | A1 | 12/2021 | Austrheim et al. | |
| 2021/0404446 | A1 | 12/2021 | Pedretti et al. | |
| 2021/0404447 | A1 * | 12/2021 | Pedretti | H02K 7/1853 |
| 2022/0002076 | A1 | 1/2022 | Austrheim | |
| 2022/0002077 | A1 | 1/2022 | Austrheim et al. | |
| 2022/0041372 | A1 | 2/2022 | Austrheim | |
| 2022/0065231 | A1 | 3/2022 | Colt et al. | |
| 2022/0073279 | A1 | 3/2022 | Austrheim et al. | |
| 2022/0097967 | A1 | 3/2022 | Austrheim | |
| 2022/0161662 | A1 | 5/2022 | Fjeldheim | |
| 2022/0163018 | A1 | 5/2022 | Waller et al. | |
| 2022/0228572 | A1 | 7/2022 | Franklin et al. | |
| 2024/0418154 | A1 | 12/2024 | Pedretti et al. | |
| 2025/0012259 | A1 | 1/2025 | Pedretti | |
| 2025/0047098 | A1 | 2/2025 | Pedretti et al. | |
| 2025/0163896 | A1 | 5/2025 | Pedretti et al. | |

FOREIGN PATENT DOCUMENTS

| | | | |
|---|---|---|---|
| CL | 201200123 | | 1/2012 |
| CL | 63805 | | 1/2020 |
| CN | 1671929 | A | 9/2005 |
| CN | 101782049 | | 7/2010 |
| CN | 101980946 | A | 2/2011 |
| CN | 103334887 | A | 10/2013 |
| CN | 203404028 | U | 1/2014 |
| CN | 103867408 | A | 6/2014 |
| CN | 204096953 | U | 1/2015 |
| CN | 107628554 | A | 1/2018 |
| CN | 109665430 | | 4/2019 |
| CN | 110578662 | A | 12/2019 |
| CN | 111692055 | A | 9/2020 |
| CN | 113460841 | A | 10/2021 |
| CN | 114183317 | A | 3/2022 |
| DE | 1279906 | | 10/1968 |
| DE | 2152879 | A1 | 4/1973 |
| DE | 4135440 | A1 | 4/1993 |
| DE | 10037678 | A1 | 2/2002 |
| DE | 102010014342 | A1 | 10/2011 |
| DE | 102011119116 | A1 | 5/2013 |
| DE | 202012102937 | U1 | 11/2013 |

(56) References Cited

FOREIGN PATENT DOCUMENTS

| | | | | |
|---|---|---|---|---|
| EA | 27072 | B1 | 6/2017 | |
| FR | 1135656 | | 5/1957 | |
| FR | 2146481 | A1 | 3/1973 | |
| FR | 2812865 | A1 | 2/2002 | |
| FR | 3099212 | A1 | 1/2021 | |
| GB | 946 930 | A | 1/1964 | |
| GB | 2351066 | A | 12/2000 | |
| GB | 2578805 | A | 5/2020 | |
| GB | 2585124 | A | 12/2020 | |
| JP | S63160995 | A | 7/1988 | |
| JP | S648197 | A | 1/1989 | |
| JP | H05239923 | | 9/1993 | |
| JP | 06193553 | | 7/1994 | |
| JP | 2001163574 | A | 6/2001 | |
| JP | 2004123243 | A | 4/2004 | |
| JP | 2004277165 | A | 10/2004 | |
| JP | 2006022529 | A | 1/2006 | |
| JP | 2009242088 | A | 10/2009 | |
| JP | 2013501682 | A | 1/2013 | |
| JP | 2014034468 | A | 2/2014 | |
| KR | 10-0570880 | B1 | 4/2006 | |
| KR | 10-2009-0110891 | A | 10/2009 | |
| KR | 101036255 | A | 6/2011 | |
| RU | 2026252 | C1 | 1/1995 | |
| RU | 2585132 | C2 | 5/2016 | |
| SU | 481528 | A1 | 8/1975 | |
| WO | WO 1992/018415 | A1 | 10/1992 | |
| WO | WO-2007077272 | A1 * | 7/2007 | .............. F04B 17/00 |
| WO | WO 2013/050343 | A2 | 4/2013 | |
| WO | WO 2013/005056 | A1 | 10/2013 | |
| WO | WO 2015/037096 | A1 | 3/2015 | |
| WO | WO 2015/039505 | A1 | 3/2015 | |
| WO | WO 2015/039534 | A1 | 3/2015 | |
| WO | WO 2018/013562 | A1 | 1/2018 | |
| WO | WO 2018/184868 | A2 | 10/2018 | |
| WO | WO 2020/018329 | A1 | 1/2020 | |
| WO | WO 2020/040717 | A1 | 2/2020 | |
| WO | WO 2020/169474 | A1 | 8/2020 | |
| WO | WO 2021/219888 | A1 | 11/2021 | |
| WO | WO 2021/255763 | A1 | 12/2021 | |
| WO | WO 2021/260450 | A1 | 12/2021 | |
| WO | WO 2022/006584 | A1 | 1/2022 | |
| WO | WO 2023/224780 | A1 | 11/2023 | |

OTHER PUBLICATIONS

Wood, Bruce; "Hanging Tomato Plants"; Mar. 4, 2009; retrieved May 9, 2013 using Internet Archive to view rubberingot.com.

International Search Report and Written Opinion received in International Patent Application No. PCT/US2023/020233, dated Oct. 9, 2023, in 26 pages.

* cited by examiner

ENERGY STORAGE AND DELIVERY SYSTEM AND METHOD

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application is a national phase of PCT Application No. PCT/US2023/020233, which claims priority to U.S. Provisional Patent Application No. 63/364,864 filed My 17, 2022, the entirety of which is incorporated by reference herein and should be considered a part of this specification.

BACKGROUND

Field

The invention is directed to an energy storage and delivery system, and more particularly to an energy storage and delivery system and method for storing and delivering electricity via the vertical movement of blocks or bricks.

Description of the Related Art

Power generation from renewable energy sources (e.g., solar power, wind power, hydroelectric power, biomass, etc.) continues to grow. However, many of these renewable energy sources (e.g., solar power, wind power) are intermittent an unpredictable, limiting the amount of electricity that can be delivered to the grid from intermittent renewable energy sources.

SUMMARY

Accordingly, there is a need for improved system to capture electricity generated by renewable energy sources for predictable delivery to the electrical grid. As used herein, the electrical grid is an interconnected network for delivery of electricity from producers to consumers and spans a large geographical region, including cities, states and/or countries.

In accordance with another aspect of the disclosure, a gravity driven power storage and delivery system is provided. An example gravity driven power storage and delivery system includes an elevator cage operable to store energy by moving one or more blocks from a lower elevation to a higher elevation and operable to generate electricity by moving one or more blocks from a higher elevation to a lower elevation under the force of gravity.

In accordance with another aspect of the disclosure, the energy storage and delivery system can in one example store solar power to produce off-hours electricity. The energy storage and delivery system can move a plurality of blocks from a lower elevation to a higher elevation to store solar energy as potential energy in the blocks during daylight hours when solar electricity is abundant. The energy storage system can then operate to move the blocks from the higher elevation to a lower elevation during nighttime to drive a generator to produce electricity for delivery to the power grid.

In accordance with another aspect of the disclosure a method for storing and generating electricity is provided. The method comprises operating an elevator cage on a tower to move a plurality of blocks from a lower elevation on the tower to a higher elevation on the tower to store energy in the blocks, each of the blocks storing an amount of energy corresponding to a potential energy amount of the block. The method also comprises operating the elevator cage to move the blocks from a higher elevation on the tower to a lower elevation on the tower under a force of gravity, thereby generating an amount of electricity corresponding to a kinetic energy amount of said one or more blocks when moved from the higher elevation to the lower elevation. The method includes moving the blocks so that the average load on the tower is approximately constant during operation of the crane or elevator cage.

In accordance with one aspect of the disclosure, an energy storage and delivery system is provided comprising one or more modules. Each module comprises a plurality of blocks and a frame having a vertical height above a foundation defined by a plurality of rows that extend horizontally. The frame includes an upper section having a first set of rows, each of the first set of rows configured to receive and support a plurality of blocks thereon, a lower section having a second set of rows, each of the second set of rows configured to receive and support a plurality of blocks thereon, an intermediate section between the upper section and the lower section that is free of blocks, a pair of elevator shafts disposed on opposite ends of the plurality of rows, and an elevator cage movably disposed in each of the pair of elevator shafts and operatively coupled to an electric motor-generator, the elevator cage sized to receive and support one or more blocks therein. The elevator cage in each of the pair of elevator shafts is operable to move one or more blocks from alternating rows of the second set of rows to corresponding alternating rows of the first set of rows to store and amount of electrical energy corresponding to a potential energy amount of said blocks. The elevator cage in each of the pair of elevator shafts is operable to move one or more blocks from alternating rows of the first set of rows to corresponding alternating rows of the second set of rows under a force of gravity to generate an amount of electricity. The elevator cage moves said blocks between each of the second set of rows and each of the corresponding first set of rows along a same vertical distance.

In accordance with another aspect of the disclosure, an energy storage and delivery system is provided. The system comprises a plurality of blocks and a frame having a vertical height above a foundation defined by a plurality of rows that extend horizontally. The frame includes an upper section having a first set of rows, each of the first set of rows configured to receive and support a plurality of blocks thereon, a lower section having a second set of rows, each of the second set of rows configured to receive and support a plurality of blocks thereon, an intermediate section between the upper section and the lower section that is free of blocks, and a pair of elevator shafts disposed on opposite ends of the plurality of rows. A trolley is movably coupled to each row in one or both of the first set of rows and the second set of rows, the trolley operable to travel beneath the blocks in the row and configured to lift a block for movement of said block horizontally along the row. An elevator cage is movably disposed in each of the pair of elevator shafts and operatively coupled to an electric motor-generator. The elevator cage is sized to lift a block from a row and to support the block therein while moving along the elevator shaft, the elevator cage further configured to lower the block onto a row at a different vertical elevation. The elevator cage in each of the pair of elevator shafts is operable to move one or more blocks from alternating rows of the second set of rows to corresponding alternating rows of the first set of rows to store and amount of electrical energy corresponding to a potential energy amount of said blocks. The elevator cage in each of the pair of elevator shafts is operable to move one or more of the blocks from alternating rows of the first set of rows to corresponding alternating rows of the second set of rows under a force of gravity to generate an amount of electricity. The elevator cage moves said blocks between each of the second set of rows and each of the corresponding first set of rows along a same vertical distance.

In accordance with another aspect of the disclosure, a method for storing and generating electricity is provided. The method comprises operating a pair of elevator cages on opposite ends of a plurality of rows of a frame to move a plurality of blocks between a first set of rows in an upper section of the frame and a corresponding second set of rows in a lower section of the frame disposed below an intermediate section of the frame that is free of the blocks. Operating the pair of elevator cages includes moving with the pair of elevator cages one or more of the blocks from alternating rows of the second set of rows to corresponding alternating rows of the first set of rows to store and amount of electrical energy corresponding to a potential energy amount of said blocks. Operating the pair of elevator cages also includes moving with the pair of elevator cages one or more of the blocks from alternating rows of the first set of rows to corresponding alternating rows of the second set of rows under a force of gravity to generate an amount of electricity via an electric motor-generator electrically coupled to the elevator cages. The elevator cages move said blocks between each of the second set of rows and each of the corresponding first set of rows by an equal vertical distance.

In accordance with another aspect of the disclosure, a method for storing and generating electricity is provided. The method comprises horizontally moving one or more blocks along alternating rows of a first set of rows in an upper section of a frame with a trolley toward elevator cages on opposite ends of the rows. The method also comprises operating the elevator cages to vertically move the one or more blocks past an intermediate section of the frame to corresponding alternating rows of a second set of rows of the frame under a force of gravity to generate an amount of electricity via an electric motor-generator electrically coupled to the elevator cages. The elevator cages move said blocks between the alternating rows of the first set of rows and each of the corresponding alternating second set of rows by an equal vertical distance.

In accordance with another aspect of the disclosure, an elevator cage assembly is provided for use in an energy storage and delivery system to move blocks between a lower elevation of a tower and a higher elevation of a tower to store energy and to move blocks between the higher elevation of the tower and the lower elevation of the tower under force of gravity to generate electricity. The elevator cage assembly comprises an elevator cage, a base disposed below the elevator cage, and a sliding mechanism actuatable to move the elevator cage laterally relative to the base. The elevator cage has one or more supports movable relative to a bottom support of the elevator cage, the one or more supports actuatable to lift or lower a block relative to the bottom support.

In accordance with another aspect of the disclosure, an elevator cage assembly is provided. The elevator cage assembly comprises an elevator cage comprising a top support coupleable to one or more cables or ribbons, a rear support attached to the top support and a bottom support attached to the rear support, the elevator cage having a C shaped side profile. The elevator cage also comprises a base disposed below the elevator cage, a sliding mechanism interposed between the elevator cage and the base and actuatable to laterally displace the elevator cage relative to the base, and a frame movably coupled to a bottom support of the elevator cage. The elevator cage also comprises a plurality of pistons coupled between the frame and the bottom support of the elevator cage, one or more of the pistons being selective actuatable to laterally move the frame and/or to rotate the frame relative to the elevator cage to adjust an orientation of a block supported by the frame to center the block relative to the elevator cage.

In accordance with another aspect of the disclosure, an energy storage and delivery system is provided. The system comprises a plurality of blocks and a frame having a vertical height above a foundation defined by a plurality of rows that extend horizontally, the frame including an elevator shaft. The system also comprises an elevator cage assembly movable along the elevator shaft and operatively coupled to an electric motor-generator. The elevator cage assembly is sized to hold and support a block therein while moving along the elevator shaft. The elevator cage assembly comprises an elevator cage movably coupled to a base via a sliding mechanism, the sliding mechanism comprising a linear actuator selectively actuatable to laterally displace the elevator cage relative to the base of the elevator cage assembly. The system also comprises a trolley movably coupled to a top of the frame. The trolley comprises a base, a frame pivotally coupled to the base, a front roller coupled to a front portion of the base, and a rear roller coupled to a rear portion of the frame. The trolley also comprises a piston-cylinder assembly actuatable to move the frame relative to the base between a compact position of the trolley where the frame is adjacent the base so that the rear roller is at a first vertical position and an extended position of the trolley where a rear portion of the frame is spaced from the base so that the rear roller is at a second vertical position. The system also comprises a ribbon that couples to the elevator cage assembly, extends over the front roller and the rear roller of the trolley and extends to the electric motor-generator. Actuation of the piston-cylinder assembly to move the trolley to the extended position lifts the block with the elevator cage assembly by an amount greater than an elongation of the ribbon, and wherein actuation of the piston-cylinder assembly to move the trolley to the compact position lowers the block and releases the elongation of the ribbon.

In accordance with another aspect of the disclosure, a trolley for an energy storage and delivery system to move blocks with an elevator cage between floors of a tower is provided. The trolley comprises a base, a frame pivotally coupled to the base, a front roller coupled to a front portion of the base, and a rear roller coupled to a rear portion of the frame, the front roller and the rear roller configured to receive thereover a ribbon that couples to the elevator cage. The trolley also comprises a piston-cylinder assembly actuatable to move the frame relative to the base between a compact position of the trolley where the frame is adjacent the base so that the rear roller is at a first vertical position and an extended position of the trolley where a rear portion of the frame is spaced from the base so that the rear roller is at a second vertical position. Actuation of the piston-cylinder assembly to move the trolley to the extended position lifts the block with the elevator cage by an amount greater than an elongation of the ribbon, and wherein actuation of the piston-cylinder assembly to move the trolley to the compact position lowers the block and releases the elongation of the ribbon. In one implementation, the trolley also comprises a hydraulic accumulator in fluid communication with the piston-cylinder assembly, wherein actuation of the piston-cylinder assembly to move the trolley to the compact position charges the hydraulic accumulator.

DETAILED DESCRIPTION

Disclosed below is an energy storage and delivery system operable to convert electricity into potential energy, and generate electricity from the potential energy when electricity is in demand. The energy storage and delivery system can be operatively coupled to the electrical grid for stabilizing the electrical grid and delivering electricity for residential, commercial, and/or industrial consumers.

Figure 1:
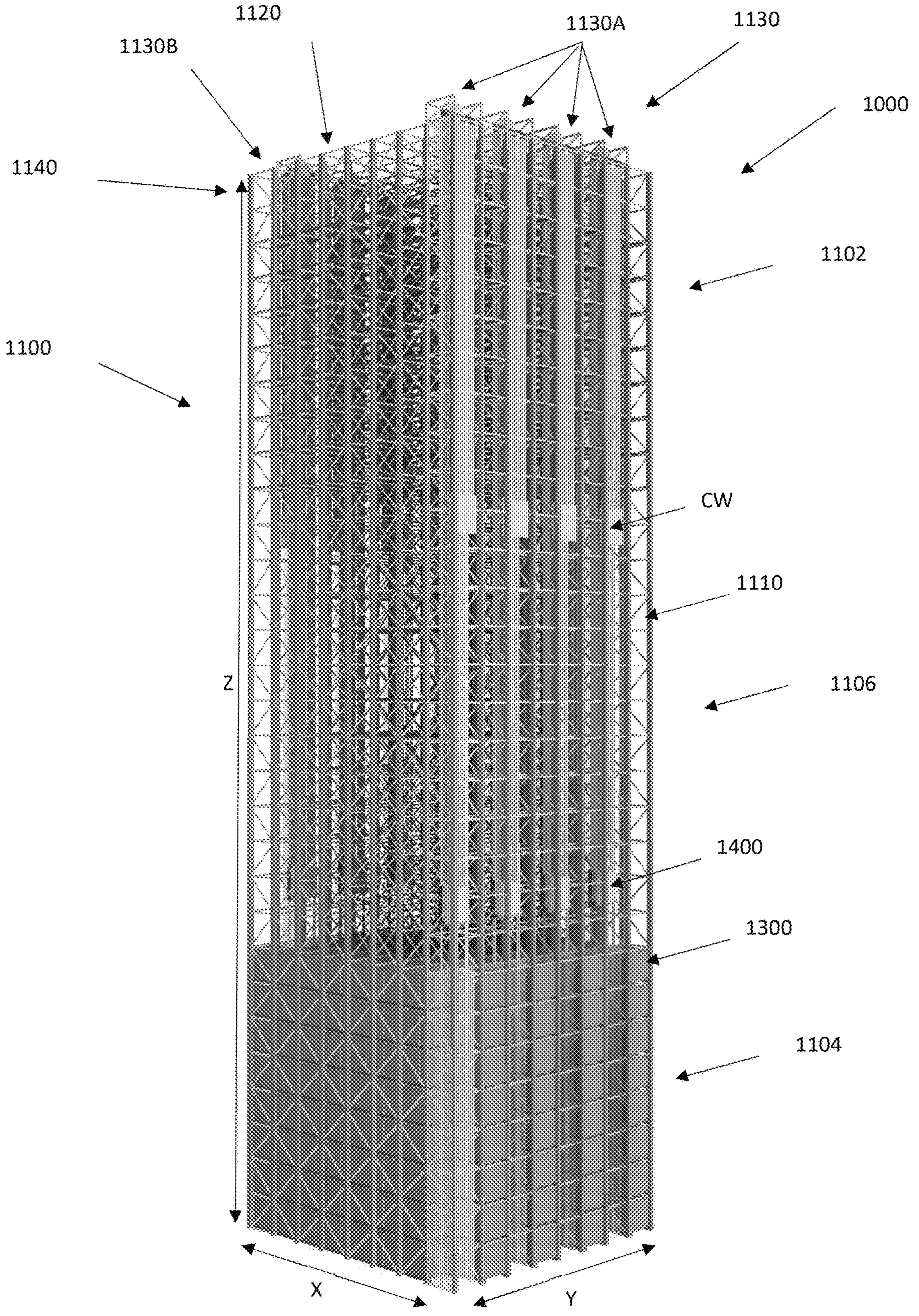
FIG. 1 is a schematic perspective view of an energy storage and delivery system for storing energy and generating electricity on demand.
Figure 2:
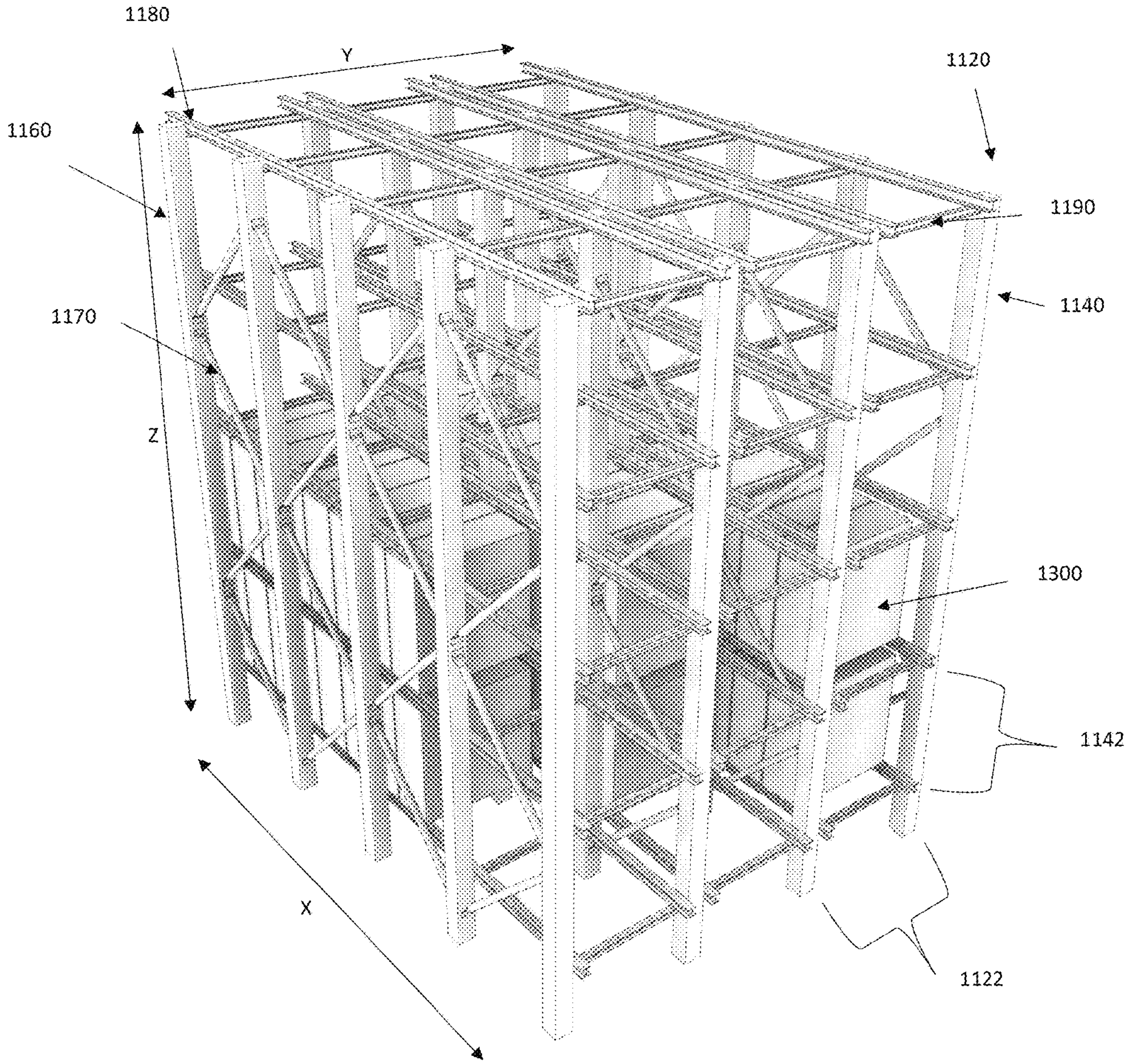
FIG. 2 is a schematic view of a portion of the system of FIG. 1.

FIGS. 1-2 illustrate an example energy storage and delivery system 1000 (the "system") operable to convert electrical energy or electricity into potential energy for storage, and to convert potential energy into electrical energy or electricity, for example, for delivery to an electrical grid.

The system 1000 includes a frame or tower 1100 (also referred to as a module in this disclosure) having one or more columns 1120 that extend in a height direction Z of the tower 1100, one or more rows or floors 1140 that extend in a width direction X of the frame or tower 1100 and one or more structures 1110 (e.g., slices of the module 1100) defined by a set of rows 1140 and columns 1120 in a depth direction Y of the frame or tower 1100. Each structure 1110 (e.g., slice of the module 1100) can be operated independently depending on demand for energy from the system 1000. The frame 1100 has an upper section 1102, a lower section 1104 and an intermediate section 1106. In one implementation, ballast weights or blocks 1300 are moved between the upper section 1102 and the lower section 1104, as further described below, allowing the intermediate section 1106 to be used for other purposes.

In one implementation, the intermediate section 1106 can be used for vertical farming. For example, the intermediate section 1106 can operate as a greenhouse, providing illuminated hydroponic farming, where such illumination can be powered by electricity generated by the energy storage and delivery system 1000 (e.g., by lowering blocks 1300). In another implementation, the intermediate section 1106 can be used for the storage of water. In another implementation, the intermediate section 1106 can be used as a warehouse to store material (e.g., storage of material, unattended by humans). In still another implementation, the intermediate section 1106 can be used as a data center (e.g., storing computer servers), where the data center can be powered by electricity generated by the energy storage and delivery system 1000 (e.g., by lowering blocks 1300). Therefore, the intermediate section 1106 can be productively used and does not remain empty during operation of the system 1000, providing additional value to the system 1000.

The upper section 1102 and lower section 1104 can have the same size (e.g., same number of rows 1140 and columns 1120). In some implementations, the number of rows 1140 in the upper section 1102 and lower section 1104 are each an even number (e.g., 8, 10, 12 rows). In other implementations, the number of rows 1140 in the upper section 1102 and lower section 1104 are each an odd number (e.g., 9, 11, 13 rows).

In one implementation, the upper section 1102 and lower section 1104 each take up ¼ of the height or area of the frame or tower 1100, with the intermediate section 1106 making up the remaining ½ of the height or area of the frame or tower 1100. In another implementation, the upper section 1102 and lower section 1104 each take up ⅓ of the height or area of the frame or tower 1100, with the intermediate section 1106 making up the remaining ⅓ of the height or area of the frame or tower 1100.

The frame 1100 includes a plurality of elevator shafts 1130. For example, the frame 1100 can have elevator shaft(s) 1130A on one end of the rows 1140 and elevator shaft(s) 1130B on an opposite end of the rows 1140 (for each structure 1110), via which the blocks 1300 are moved between one or more rows 1140 in the upper section 1102 and one or more rows in the lower section 1104 of the frame 1100, as further described below. In one implementation, an equal number of elevator shafts 1130A are on one end of the rows 1140 of the frame or tower 1100 as the number of elevator shafts 1130B on the opposite end of the rows 1140. The frame or tower 1100 can in one implementation have a height of a 30 story building (e.g., approximately 90 meters tall). However, the frame or tower 1100 can have a smaller or greater height than 30 stories (e.g., 120 meters tall).

With continued reference to FIG. 1 the blocks 1300 are moved horizontally along the rows 1140 (via a trolley in each row 1140, described further below) to the elevator shafts 1130A, 1130B at the ends of the rows 1140 and then moved vertically along the elevator shafts 1130A, 1130B via an elevator cage assembly 1400 (described in more detail below) in each elevator shaft 1130A, 1130B. The elevator cage assemblies 1400 move (e.g., under force of gravity) to a lower elevation to generate electricity, and are raised by motor-generators (1500 in FIG. 25, 2500 in FIG. 29) at the top of the tower or frame 1100. Counterweights CW facilitate the movement of the elevator cage assembly 1400. The movement of the elevator cage assemblies 1400 in opposite elevator shafts 1130A, 1130B are synchronized to maximize efficiency of the system 1000.

The longer the rows 1140 are between the elevator shafts 1130A, 1130B, the more blocks 1300 (e.g., mass) the row 1140 can hold and the greater the energy (e.g., hours of energy) the system 1000 can deliver. The greater the depth (in the Y direction) of the elevator shafts 1130A, 1130B (e.g. the greater the number of structures 1110 or slices of the module 1100 in the Y direction), the greater the amount of power the system 1000 can generate. In one implementation, operation of the elevator cage assembly 1400 in each elevator shaft 1130A, 1130B can provide between about 500 kW and about 1000 kW (e.g., about 800 kW) of power, so that the two elevator shafts 1130A, 1130B in one structure 1110 or slice of the module 1100 can generate approximately 1.6 MW. In a system that has eight structures 1110 (e.g., slices of the module 1100) in the Y direction, each structure 1110 having two elevator shafts 1130, 1130B, the system can generate approximately 12.8 MW of power. Assuming the length of the rows 1140 allows for four hours of energy, the total output of the system is approximately 12.8 MW×4 hr. or 51.2 MW-hrs.

As best shown in FIG. 2, the frame 1100 can be made of a plurality of pillars 1160 (e.g., of reinforced concrete, pre-casted columns of concrete) that define the one or more columns 1120, cross-members 1170 (e.g., diagonal bracing members, made of metal) that interconnect the columns 1120 to provide stability to the frame 1100 (e.g., in a width-wise direction X of the frame 1100), and a plurality of beams (e.g., I-beams) 1180 that define the one or more rows 1140 and are supported on cross-beams 1190 that extends in a depth direction Y of the frame 1100 between the columns 1120. The beams 1180 and cross-beams 1190 can be made of metal (e.g., steel). The columns 1120 can be spaced from each other in the depth direction Y of the frame 1100 by a distance 1122, and the rows 1140 can be spaced from each other in the height direction Z of the frame 1100 by a distance 1142. The distances 1122, 1142 are sized to allow the one or more blocks 1300 to fit in each row (one behind another) so that the blocks 1300 are supported on the beams 1180 as further discussed below. In one implementation, the distances 1122, 1142 are the same, allowing the blocks 1300 to have a substantially square end face (see FIG. 12), for example to simplify the manufacturing of the blocks 1300. In one implementation, the blocks 1300 can be made from local soil and/or remunerated waste material (e.g., coal combustion residuals such as bottom ash, fiberglass from decommissioned wind turbine blades, waste tailings from mining processes) or other recycled material.

Figure 3:
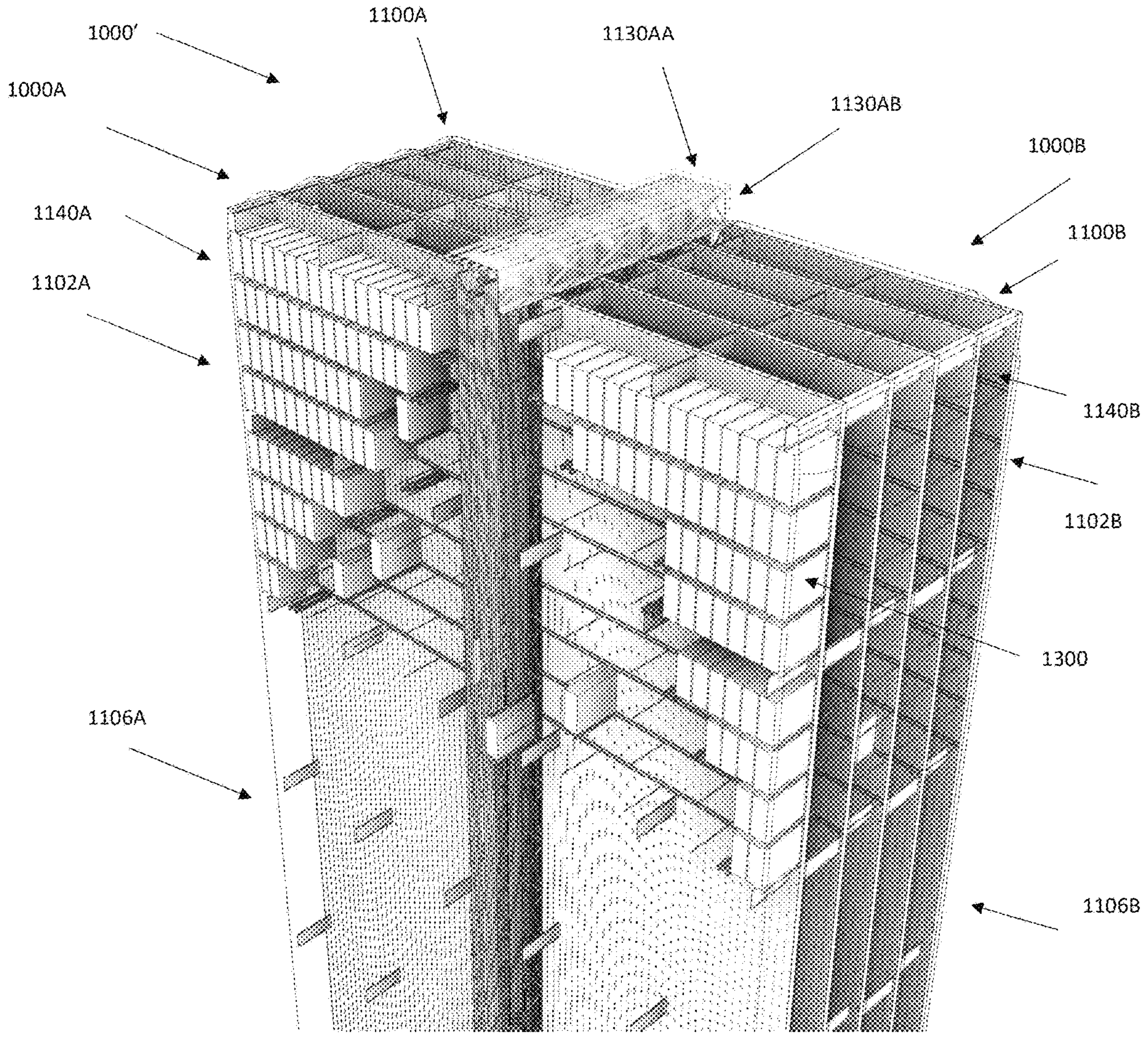
FIG. 3 is a partial schematic view of an energy storage and delivery system, showing arrangement of blocks in an upper portion of the tower of two adjacent modules similar to the system in FIG. 1.

FIG. 3 shows a partial perspective view of a portion of an energy storage and delivery system 1000' having two modules 1000A, 1000B arranged adjacent each other. The modules 1000A, 1000B are each similar to the module 1100 of the energy storage and delivery system 1000 shown in FIGS. 1-2. Thus, reference numerals used to designate the various components of the modules 1000A, 1000B are identical to those used for identifying the corresponding components of the module 1100 in FIGS. 1-2, except that an "A" or "B" has been added to the end of the numerical identifier. Therefore, the structure and description for the various features of the module 1100 in FIGS. 1-2 are understood to also apply to the corresponding features of the modules 1000A, 1000B of the system 1000' in FIG. 3, except as described below.

Figure 7:
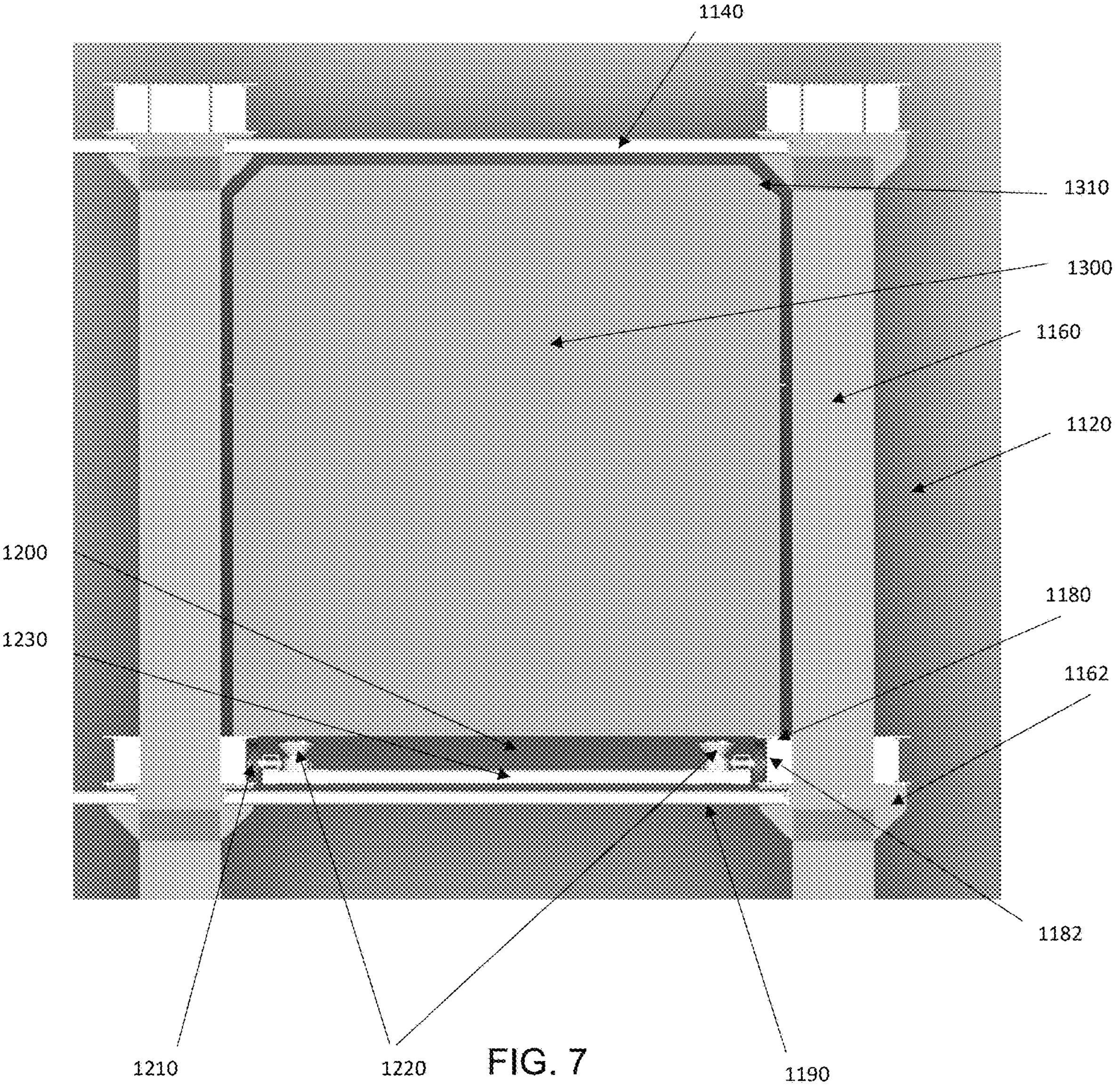
FIG. 7 is a schematic end view of the system in FIG. 5, showing the trolley movably coupled to beams of a row of the system and illustrating the block supported on the beans of said row.

The elevator shafts 1130AA, 1130AB of the modules 1000A, 1000B can be adjacent each other and the rows 1140A, 1140B oriented in generally the same direction (e.g., aligned) for both modules 1000A, 1000B (e.g., in the upper sections 1102A, 1102B). As shown in FIG. 7, no blocks 1300 are stored in the intermediate sections 1106A, 1106B of the frame 1100A, 1100B of the modules 1000A, 1000B of the system 1000'. As discussed above, the intermediate sections 1106A, 1106B can be used for other purposes. Optionally, the intermediate section 1106A of the module 1100A is used for a different purpose than the intermediate section 1106B of the module 1100B.

Figure 4:
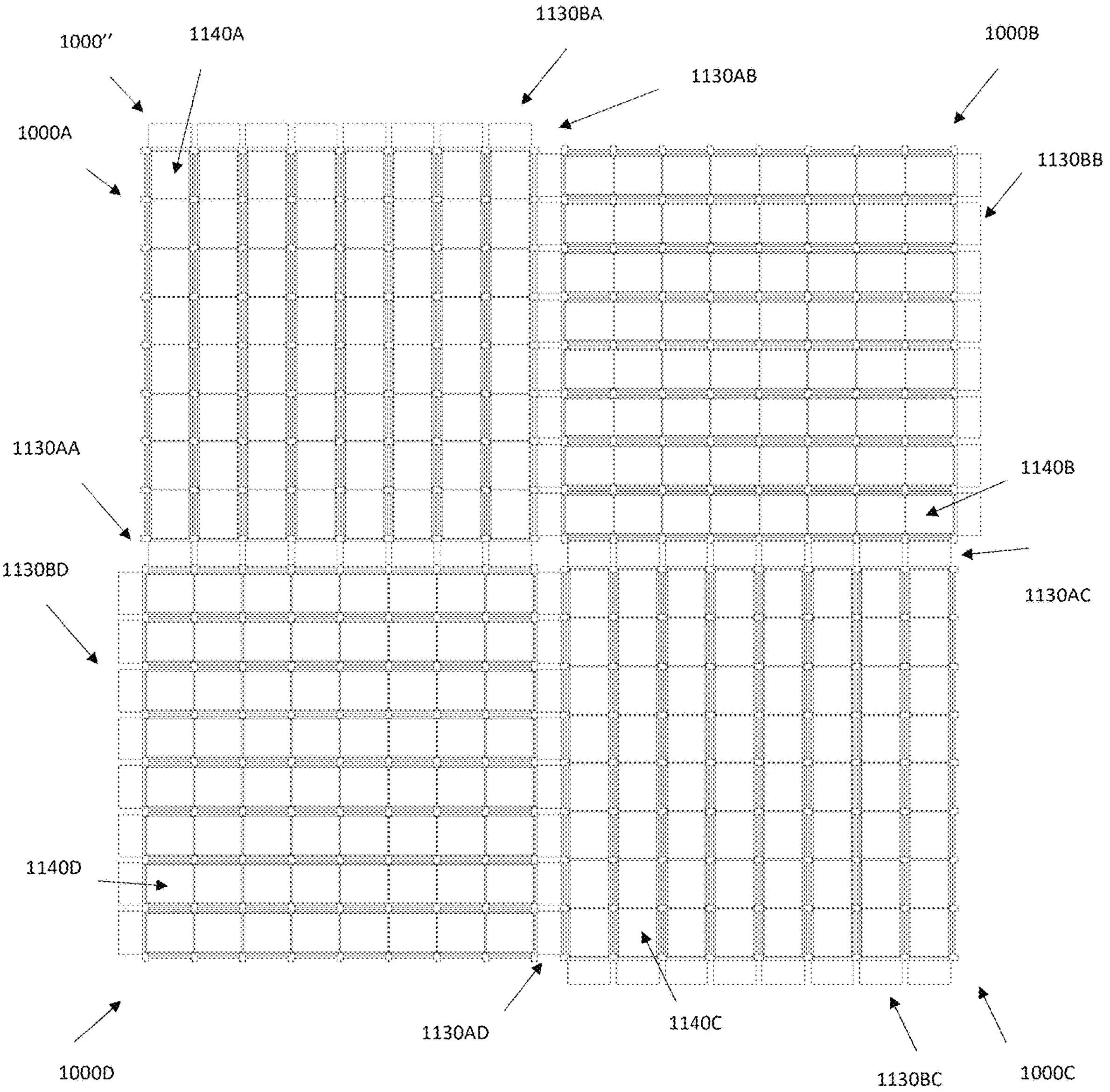
FIG. 4 is a schematic top view of four modules of an energy storage and delivery system, each module similar to the system in FIG. 1, the modules arranged adjacent each other.

FIG. 4 shows a top or plan view of an energy storage and delivery system 1000" including four modules 1000A, 1000B, 1000C, 1000D arranged adjacent each other. The modules 1000A, 1000B, 1000C, 1000D are each similar to the module 1100 shown in FIGS. 1-2. Thus, reference numerals used to designate the various components of the modules 1000A, 1000B, 1000C, 1000D are identical to those used for identifying the corresponding components of the module 1100 in FIGS. 1-2, except that an "A", "B", "C" or "D" has been added to the end of the numerical identifier. Therefore, the structure and description for the various features of the system or module 1100 in FIGS. 1-2 are understood to also apply to the corresponding features of the modules 1000A, 1000B, 1000C and 1000D of the system 1000" in FIG. 4, except as described below.

As with the module 1100, each of the modules 1000A-1000D has two sets of elevator shafts on opposite ends of the rows of the system. For example, module 1000A has elevator shafts 1130AA and 1130BA on opposite ends of the rows 1140A, module 1000B has elevator shafts 1130AB and 1130BB on opposite ends of the rows 1140B, module 1000C has elevator shafts 1130AC and 1130BC on opposite ends of the rows 1140C, and module 1000D has elevator shafts 1130AD and 1130BD on opposite ends of the rows 1140D.

As shown in FIG. 4, each of the modules 1000A, 1000B, 1000C, 1000D is oriented so that each of their sets of rows 1140A, 1140B, 1140C, 1140D extend orthogonal (e.g., perpendicular) to the rows in adjacent modules 1000A-1000D. For example, the rows 1140A of module 1000A extend orthogonally to the rows 1140B of module 1000B and to the rows 1140D of module 1000D. This orthogonal arrangement between the modules 1000A-1000D increases the stability of each of the modules 1000A-1000D, advantageously providing automatic bracing to the modules 1000A-1000D in any direction (e.g., bracing against wind and/or seismic forces). As discussed above, cross-members 1170 (e.g., diagonal bracing) interconnect the columns 1120 to provide stability to the module 1100 (e.g., in a width-wise direction X of the frame 1100) along the direction of the rows 1140. However, there are no cross-members in a transverse direction of the frame or module 1100. Therefore, orienting the modules 1000A-1000D orthogonal to each other advantageously allows the cross-members 1170 in one frame 1100 to provide structural stability or bracing to an adjacent module 1000A-1000D in the direction where it does not have any cross-members 1170. Each of the modules 1000A-1000D can be operated independently of each other. For example, during operation, one or more (e.g., one, two, three, or four) of the modules 1000A-1000D can be operated to store and generate electricity (e.g., depending on demand), or only some of the modules 1000A-1000D can be operated while maintenance is performed on the remaining modules 1000A-1000D.

Though FIG. 4 shows four modules 1000A-1000D, one of skill in the art will recognize that the system 1000" can have any number of modules (e.g., two, three, five, six, seven, eight, ten, twelve) that can optionally arranged in the manner described above. Accordingly, the energy storage and delivery system is scalable and can provide for energy storage and delivery on the order of multiple gigawatt hours (GWh). The modules 1000A-100D can operate near a clean energy power generating station (e.g., solar energy farm, wind farm) and operated to store at least a portion of the clean energy power generating station (e.g., for delivery to the electrical grid off hours, such as at night).

Figure 5:
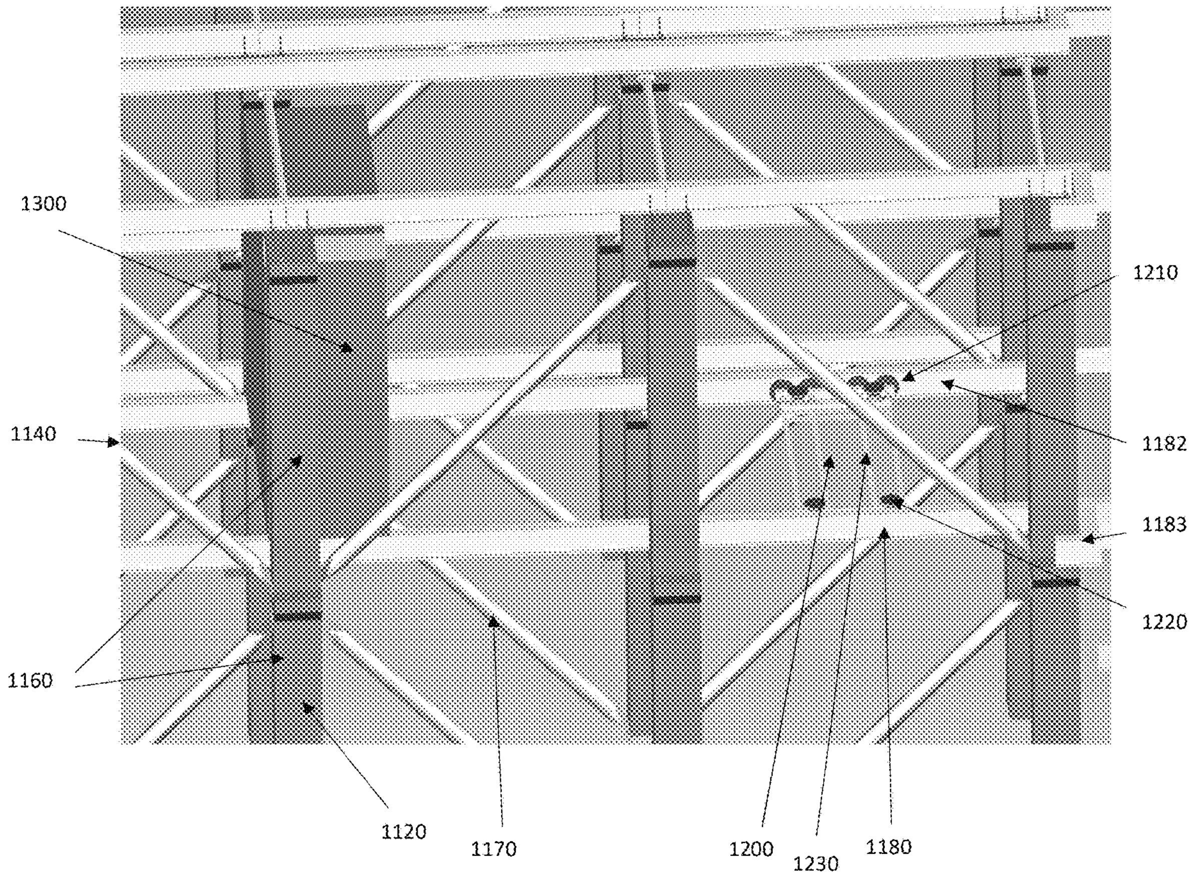
FIG. 5 is a schematic perspective view of a portion of the system in FIG. 1, showing a trolley movably coupled to beams of a row of the system and illustrating a block supported on the beams of said row.
Figure 6:
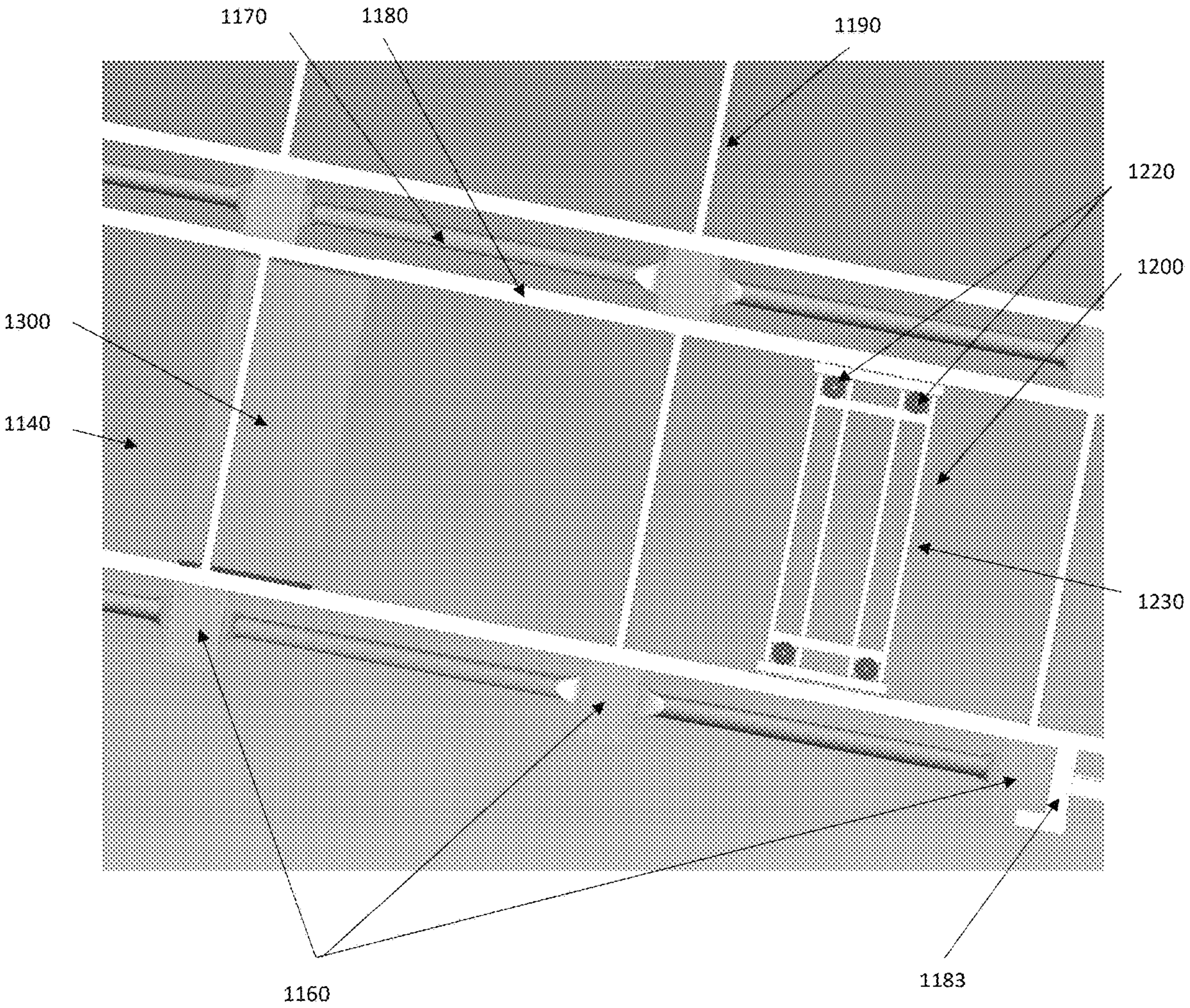
FIG. 6 is a schematic top view of the system in FIG. 5, showing the trolley movably coupled to beams of a row of the system and illustrating the block supported on the beams of said row.

FIGS. 5-7 show features of the system 1000 for moving blocks 1300 along a row 1140 and all of the description above for the features of the system 1000 apply to the features illustrated in FIGS. 5-7. One of skill in the art will recognize that the same features in FIGS. 5-7 and described below can be implemented in the systems 1000', 1000" in FIGS. 3-4, so that the description below also applies to the systems 1000', 1000" in FIGS. 3-4.

With reference to FIG. 5, the block 1300 can be supported (e.g., in a stationary position) on a pair of beams 1180 in a row 1140 of the frame or tower 1100. The beams 1180 can have a I-beam or C-shaped cross-section that defines a channel 1182 (best shown in FIG. 7) between a top (e.g., a top flange) of the beams 1180 on which the block 1300 is supported and a bottom (e.g., a bottom flange) of the beam 1180. The beams 1180 extend toward an elevator shaft 1130 to allow transfer of the block 1300 to an elevator cage assembly 1400 in the elevator shaft 1130, and the elevator cage assembly 1400 can be operated to move the block 1300 to a different vertical location, as further described below. One implementation of the elevator cage assembly 1400 is shown in FIGS. 8-23. A motor-generator 1500 (see FIG. 25 or 2500 in FIG. 29) can be mounted in or on at least a portion of the elevator shaft 1130 (e.g., at a vertical location above the topmost position of the elevator cage assembly 1400).

The block 1300 can have a generally rectangular (e.g., square) shape when viewed from an end (see FIG. 7). In one implementation, the block 1300 can have one or more (e.g., a pair of) chamfered or truncated corners 1310 generally corresponding to a shape of a tapered end 1162 of the pillars 1160. A hook portion (e.g., C-shaped) 1183 (see FIG. 5) of the beams 1180 can be supported by tapered ends 1162 of the pillars 1160 that extend below the beams 1180 and can at least partially circumscribe the pillars 1160 that extend above the beams 1180 to facilitate coupling of the beams 1180 to the pillars 1160 and laterally fix the beams 1180 to the pillars 1160 (in the X direction). As discussed above, in one implementation the width 1122 and height 1142 of the row 1140 are generally equal and define a square shape. In one implementation, the block 1300 is sized to approximate the width 1122 and height 1142 of the row 1140 while allowing the block 1300 to pass through an opening of the row 1140.

A trolley 1200 can be movably coupled to the beams 1180 and can be selectively positioned under the block 1300 (see FIG. 7) that is supported on the beams 1180. Each row 1140 that has one or more blocks 1300 supported on the beams 1180 of the row 1140 can have one or more of the trolleys 1200 to move the blocks 1300 along the row 1140. The trolley 1200 can include wheels 1210 on opposite sides of a frame 1230, where the wheels 1210 move (e.g., rotate) within the channel 1182 of the (pair of) beams 1180 on which the blocks 1300 are supported (e.g., the wheels 1210 roll on the bottom flange of the beams 1180. The trolley 1200 also includes one or more actuatable support pistons 1220, for example on opposite sides of the frame 1230, that face a bottom side of the block 1300 when the trolley 1200 is positioned underneath the block 1300. The support pistons 1220 are actuatable (e.g., hydraulically, pneumatically, electrically via an electric motor) between a retracted state where the support pistons 1220 do not contact the block 1300 and an extended position where the support pistons 1220 are vertically displaced away from the frame 1230 (e.g., upward) to contact and lift the block 1300 (e.g., approximately 2 cm or 1 inch) above the beams 1180 (e.g., so that the weight of the block 1300 is supported solely by the support pistons 1220, allowing the trolley 1200 to move the block 1300 horizontally (e.g., along the X direction). In one implementation, shown in FIGS. 5-6, the trolley 1200 can have two pairs of support pistons 1220 and two pairs of wheel assemblies 1210, each support piston 1220 aligned with one of the wheel assemblies 1210. In another implementation, the supports 1220 can be a platform with a width that generally corresponds with the width of the frame 1230, where the platform can move between a retracted position where it does not engage the bottom of the block 1300 and an extended position where it contacts and lifts the block 1300 off the beams 1180.

Once the trolley 1200 has lifted the block 1300 above the beams 1180 (e.g., so that the block 1300 is not in contact with the beams 1180), the trolley 1200 can translate the block 1300 along the row 1140 (e.g., horizontally in the X direction), for example toward the elevator shaft 1130 to transfer the block 1300 to the elevator cage assembly 1400, as further described below.

Figure 17:
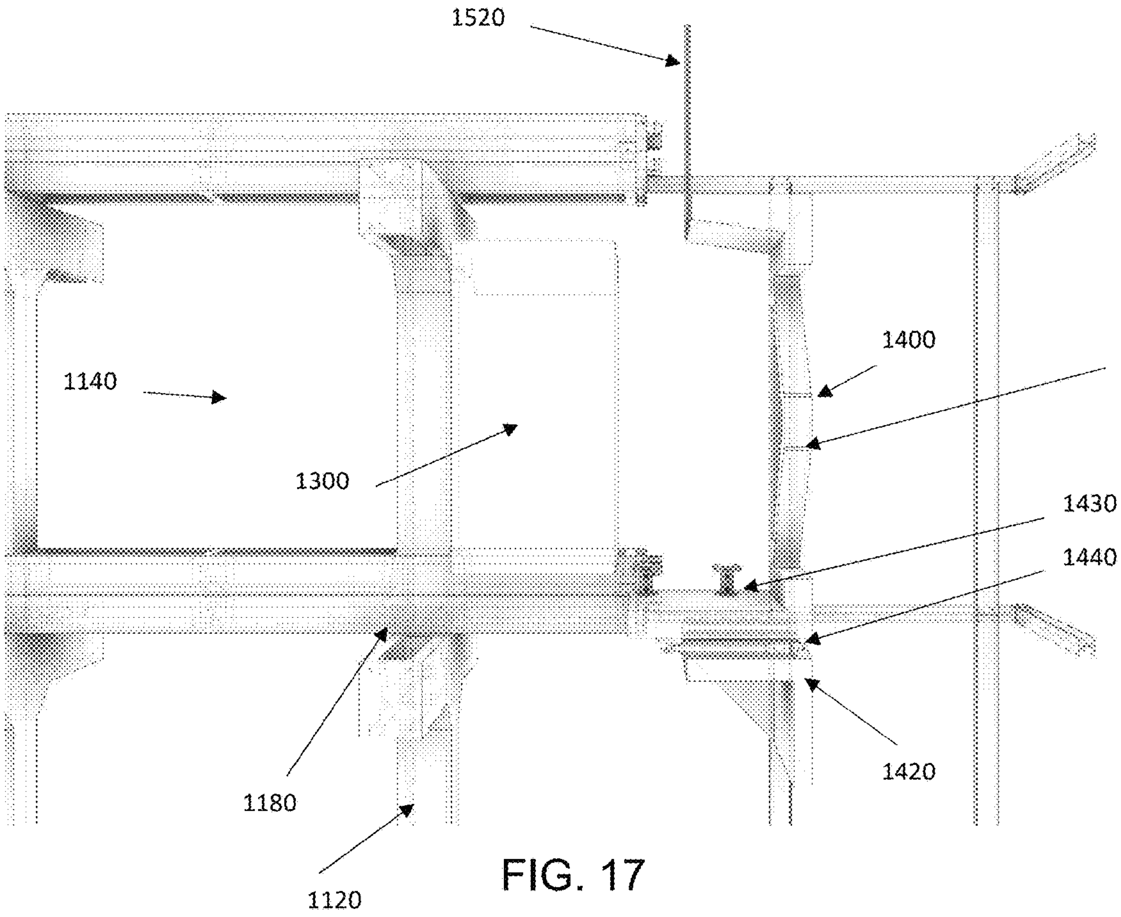

The elevator cage assembly 1400 can include an elevator cage 1410 movably coupled to a base 1420 underneath the elevator cage assembly 1400. The elevator cage 1410 can include a bottom support 1412, a rear wall 1414 and a top support 1416. In one implementation, the elevator cage 1410 can also include sidewalls that extend between the bottom support 1412 and the top support 1416. As best seen in FIG. 17, the top support 1416 can have a smaller length than the bottom support 1412. The top support 1416 is coupled to one or more cables or ribbons (e.g., steel ribbons) 1520 at one end of the cables or ribbons 1520, with the other end of the cables or ribbons 1520 coupled to the counterweight CW, as further discussed below. In one implementation, the elevator cage 1410 can have a C-shaped cross-section (when viewed from the side, as shown in FIG. 17).

One or more (e.g., multiple, four) supports 1430 are movably coupled to the bottom support 1412. In one implementation, the one or more supports 1430 are moved simultaneously. Optionally, the one or more supports 1430 are hydraulically actuated (e.g., actuated by a hydraulic actuator) to move between a lower elevation relative to the bottom support 1412 and a higher elevation relative to the bottom support 1412. In another implementation, the one or more supports 1430 are moved with a solenoid actuator (e.g., electrically actuated) between a lower elevation relative to the bottom support 1412 and a higher elevation relative to the bottom support 1412. In still another implementation, the one or more supports 1430 are pneumatically actuated (e.g., actuated by a pneumatic actuator) to move between a lower elevation relative to the bottom support 1412 and a higher elevation relative to the bottom support 1412. Advantageously, the one or more supports 1430 have a travel distance (e.g., between a collapsed position and an extended position) relative to the bottom support 1412 that is greater than an elongation amount or elasticity of the one or more cables or ribbons 1520 (e.g., when the one or more supports 1430 are actuated to apply a lifting force on a block 1300), which allows the one or more supports 1430 to lift the block 1300 off the beams 1180, as discussed further below. Therefore, the supports 1430 have enough travel to compensate for the elongation or elasticity of the cables or ribbons 1520, and therefore be able to lift the block 1300 off the beams 1180. Advantageously, the support(s) 1430 are actuated (e.g., hydraulically) to lift the block 1300, instead of lifting the block 1300 by operating the main motor 1500 (see FIG. 25, or 2500 in FIG. 29) to lift the cage 1410 via the cable(s) or ribbon(s) 1520, so that the motor 1500 is operated only to move the cage 1410 between rows or floors 1140.

As discussed above, the elevator cage 1410 is movably coupled to the base 1420 underneath the elevator cage 1410. Such movement is provided by a sliding assembly 1440 that moves the cage 1410 horizontally or laterally relative to the base 1420, allowing the elevator cage 1410 to move into and out of a row or floor 1140 (e.g., as shown in FIGS. 10-13). As shown for example in FIG. 19, the sliding assembly 1440 includes one or more (e.g., two, multiple) rails 1442 interposed between and coupled to the base 1420 and the elevator cage 1410, which allow relative movement of the base 1420 and the elevator cage 1410. The sliding assembly 1440 also includes a linear actuator 1444 that moves the cage 1410 laterally relative to the base 1420. In one implementation, the linear actuator 1444 is a hydraulically actuated piston-cylinder assembly. In another implementation, the linear actuator 1444 is a pneumatically actuated piston-cylinder assembly. In still another implementation, the linear actuator 1444 is an electrically actuated assembly (e.g., a piston-cylinder assembly where the piston is moved via a solenoid actuator). In yet another implementation, the linear actuator 1444 is a rack and pinion assembly, where the pinion is rotated (e.g., via an electric actuator) to move the rack linearly.

In one implementation, where the one or more supports 1430 and the linear actuator 1444 of the sliding assembly 1440 are actuated hydraulically, the hydraulic system can operate quickly to effect fast movement of the one or more supports 1430 and the linear actuator 1444. In one implementation, the hydraulic system can include an accumulator, where a pump is operated (e.g., solely operated) to pressurize fluid (e.g., an incompressible liquid, such as oil) in the accumulator, such as from 130 bar to 250 bar. A valve can then be actuated to allow fluid flow through the hydraulic system to actuate the one or more supports 1430 (e.g., to extend the support(s) 1430 to lift a block 1300) or the linear actuator 1444 (e.g., to move the elevator cage 1410 laterally relative to the base 1420).

Figure 8:
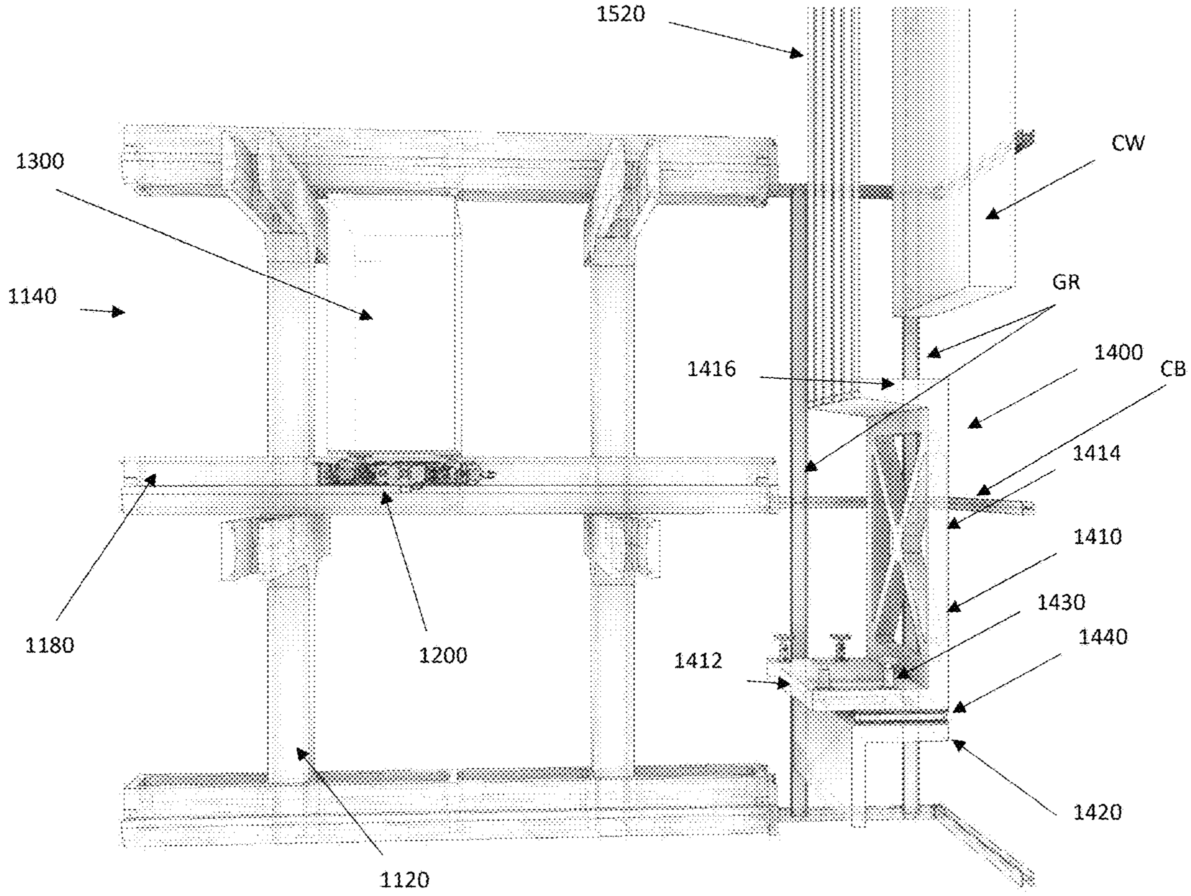
FIGS. 8-14 are partial schematic perspective views of the system of FIG. 1, illustrating a sequence of steps for moving a block along a row of the tower and transferring the block to an elevator cage for vertical movement in an elevator shaft of the system.

As shown in FIG. 8, the system 1000 has guiderails GR in the elevator shaft 1130 along which the elevator cage assembly 1400 and counterweight CW travel (e.g., the base 1420 is movably coupled to one of the guide rails GR and the counterweight CW is movably coupled to another of the guiderails GR). The guiderails GB are coupled to a cross-bar CB (see FIG. 8), for example at every row or floor 1140, which provides lateral support to the guiderails GB, and which in turn provide lateral support to the elevator cage 1410 when it moves horizontally relative to the base 1420 (e.g., as shown in FIGS. 10-13).

Figure 13:
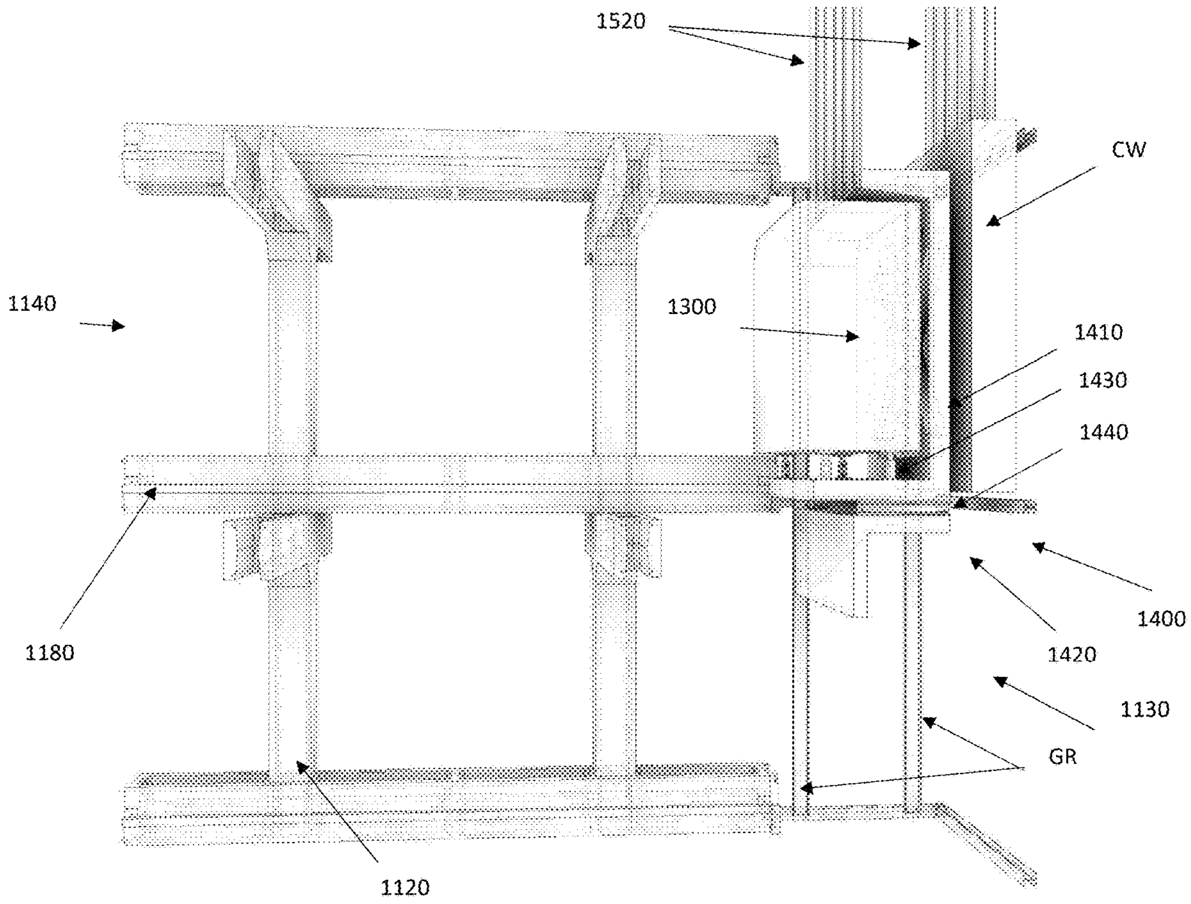

As best shown in FIG. 13, the cables or ribbons 1520 are advantageously aligned with the center of gravity of the elevator cage assembly 1400 and block 1300 when moving the block 1300 along the elevator shaft 1130 (e.g., between rows or floors 1140). The cables or ribbons 1520 are also aligned or centered with the guide rails GR next to the elevator cage assembly 1400. This facilitates movement of the block 1300 along the elevator shaft 1130 without placing undue force (e.g., bending forces) on the guide rails GR. Likewise, when the elevator cage 1410 is empty (e.g., not carrying a block 1300), the cables or ribbons 1520 are advantageously aligned with the center of gravity of the elevator cage assembly 1400 and the guide rails GR next to the elevator cage assembly 1400 to inhibit (e.g., prevent) tilting of the elevator cage 1410 or placing undue force (e.g., bending forces) on the guide rails GR during movement of the elevator cage assembly 1400 along the elevator shaft 1130. Similarly, the cables or ribbons 1520 are aligned with the center of gravity of the counterweight CW and aligned or centered with the guide rails GR next to the counterweight CW to facilitate movement of the counterweight CW without placing undue force on the guiderails GR or applying a moment on the counterweight CW.

Figure 14:
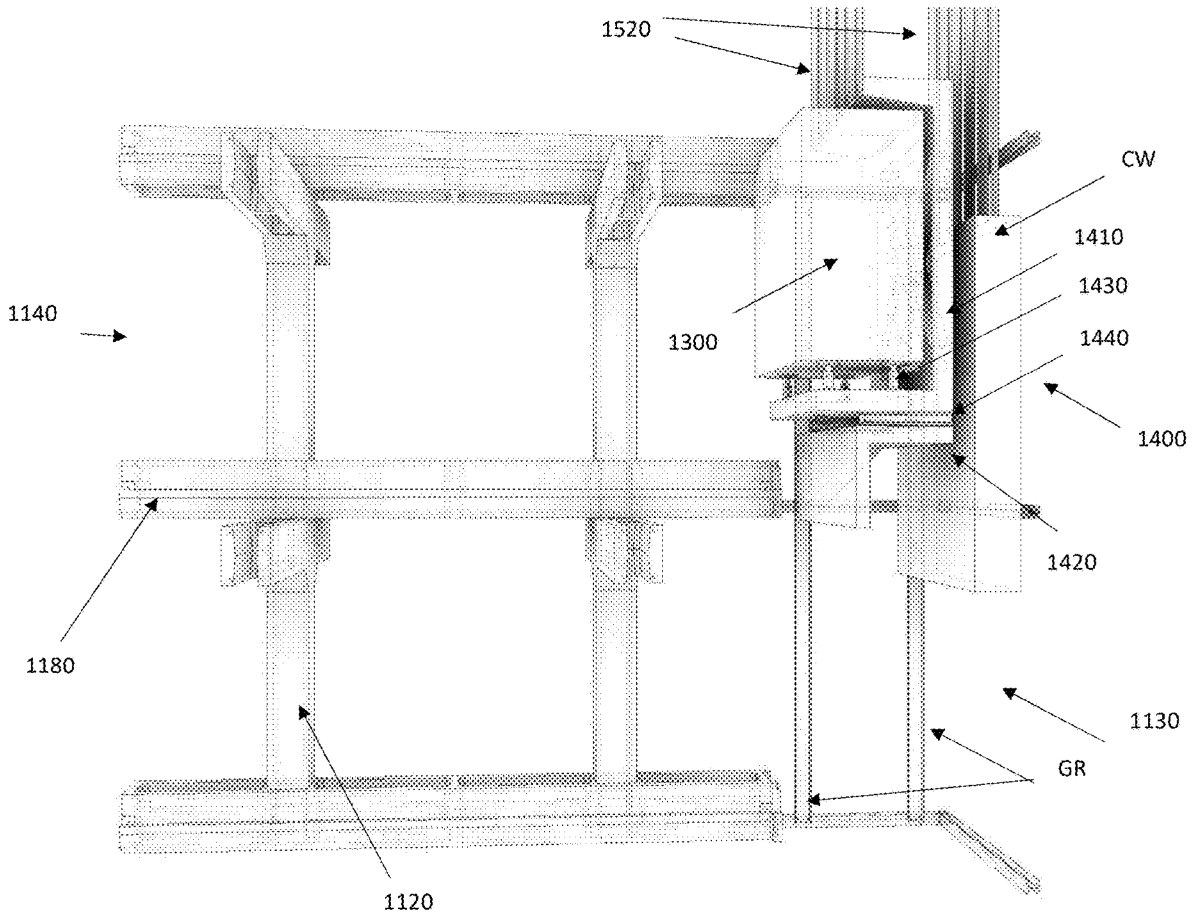
Figure 15:
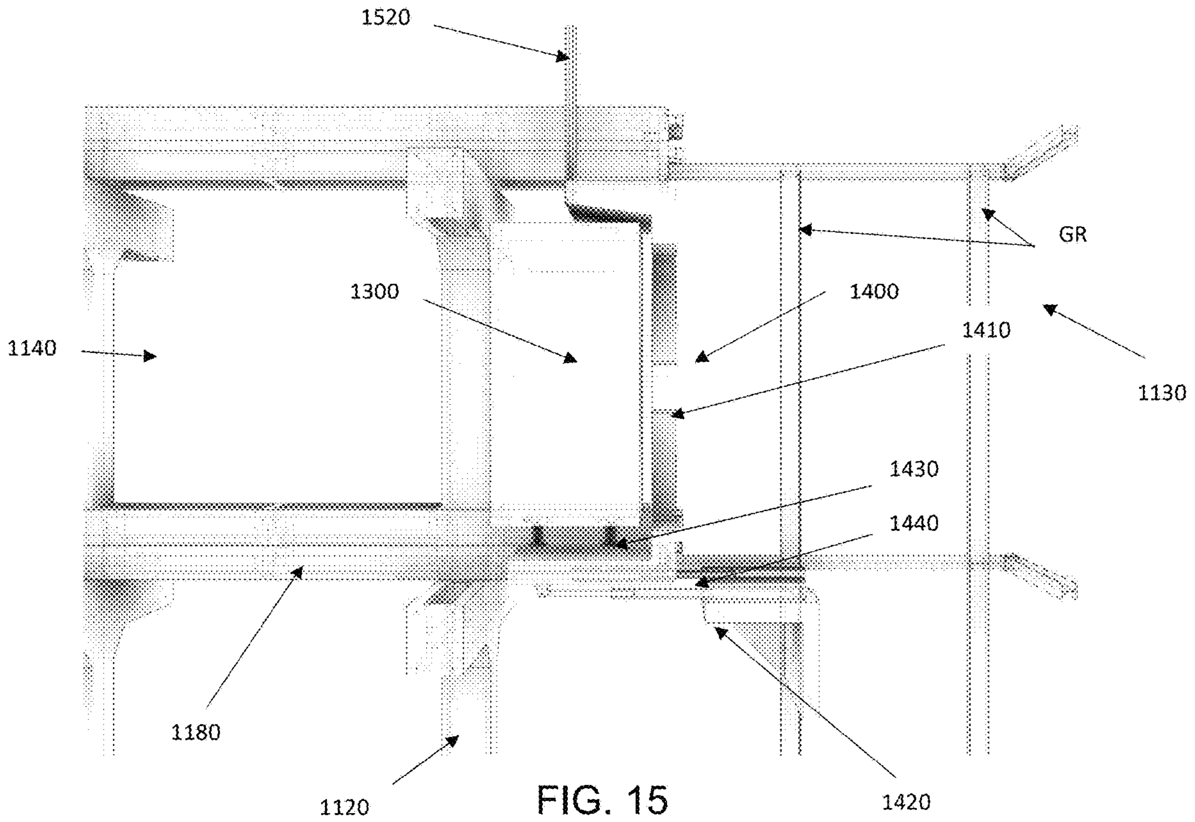
FIGS. 15-17 are partial schematic side views of the system of FIG. 1, illustrating a sequence of steps for transferring the block from an elevator cage to a row of the tower.
Figure 16:
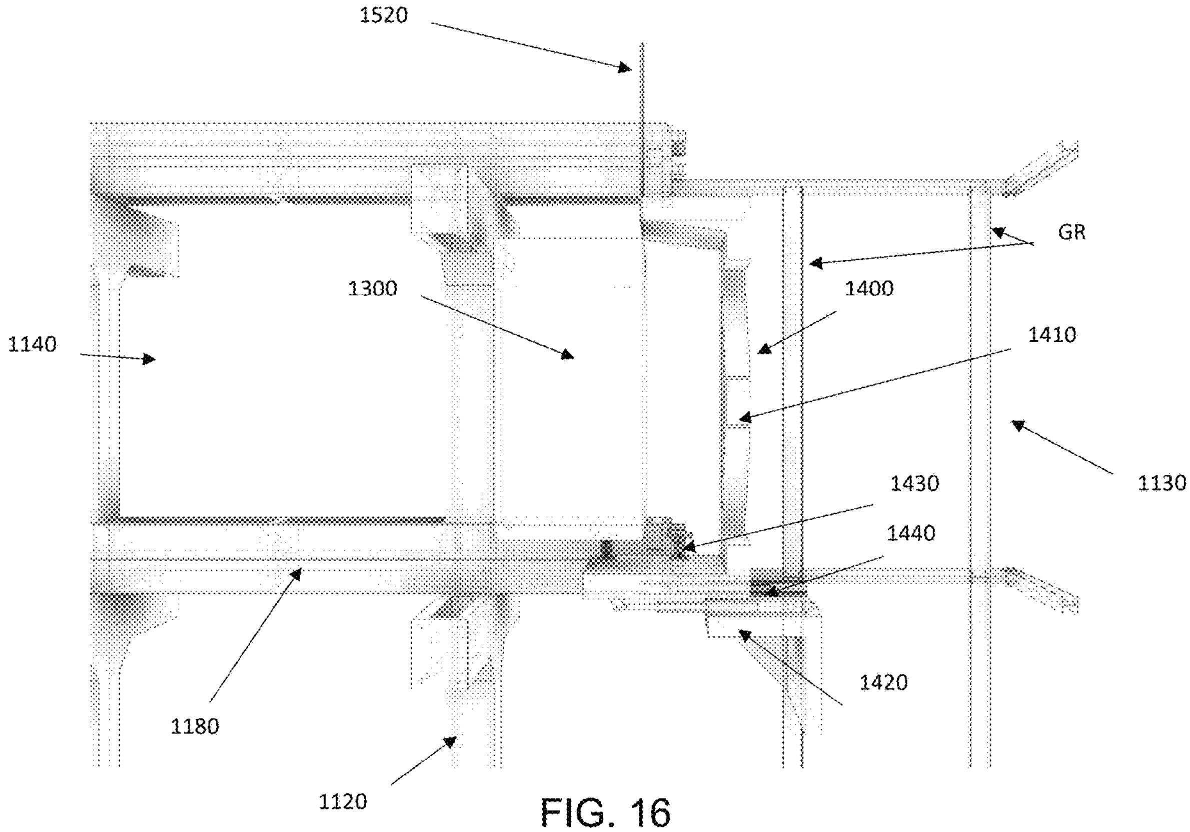
Figure 18:
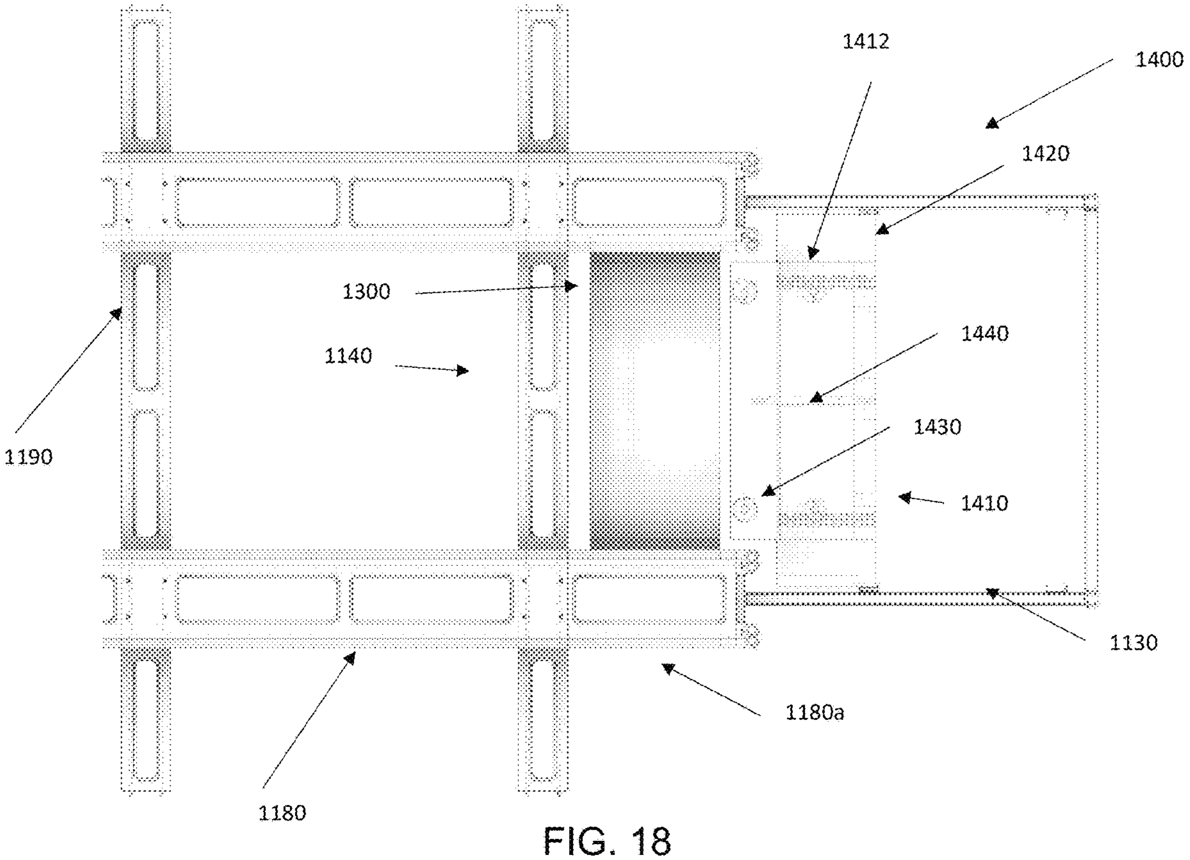
FIGS. 18-20 are partial schematic bottom views of the system of FIG. 1, illustrating a sequence of steps for transferring the block to an elevator cage for vertical movement in an elevator shaft of the system.
Figure 19:
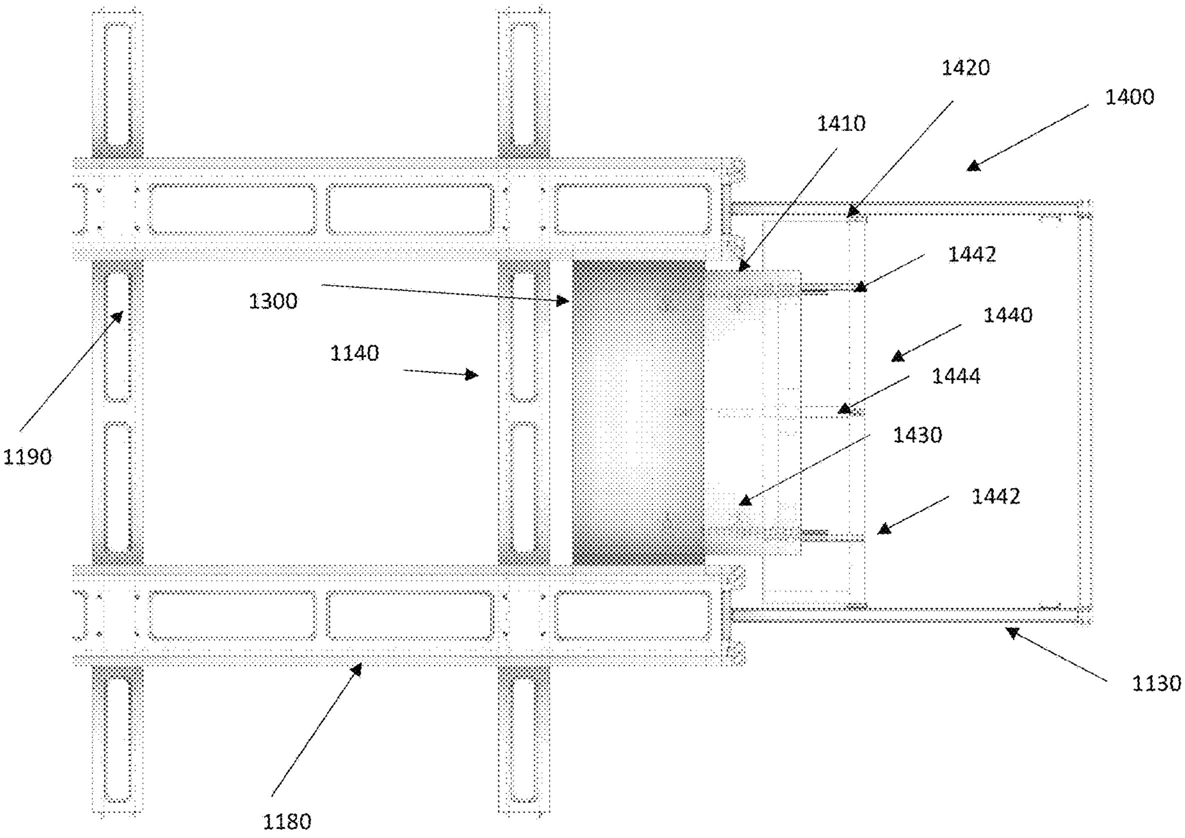
Figure 20:
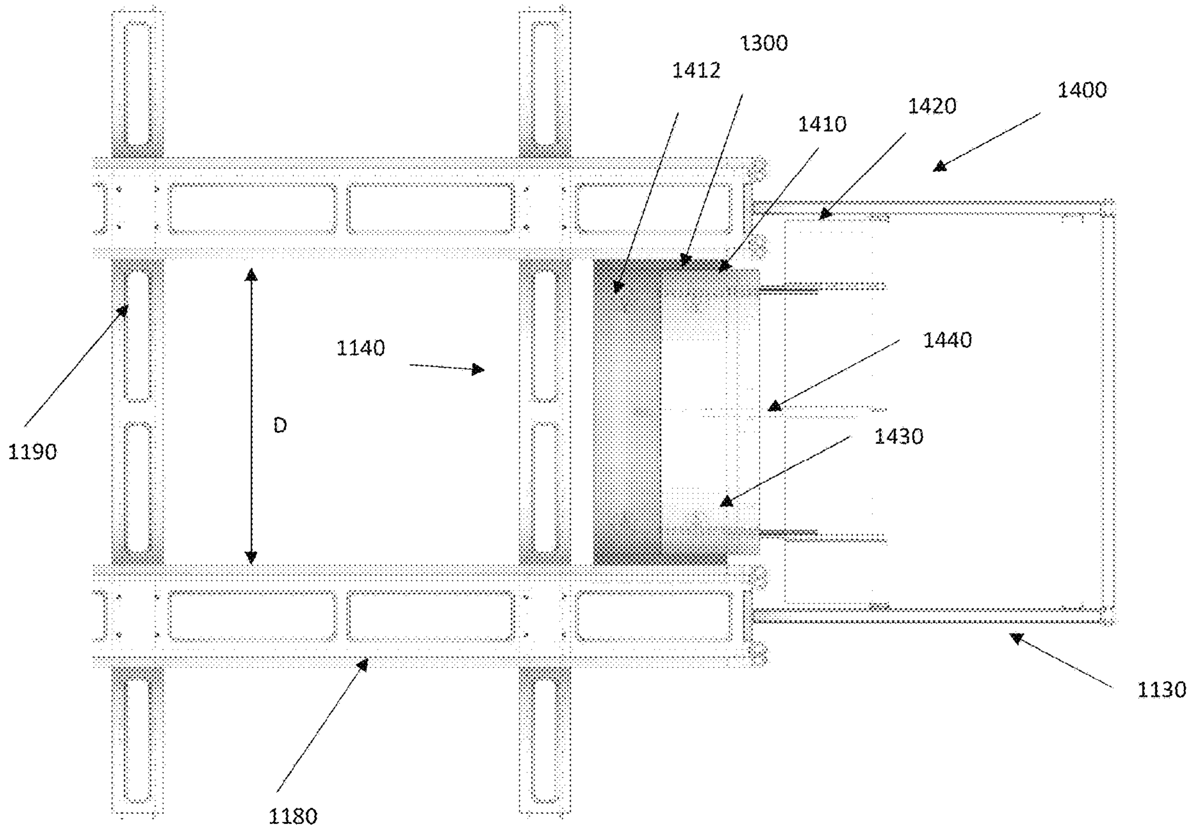
Figure 21:
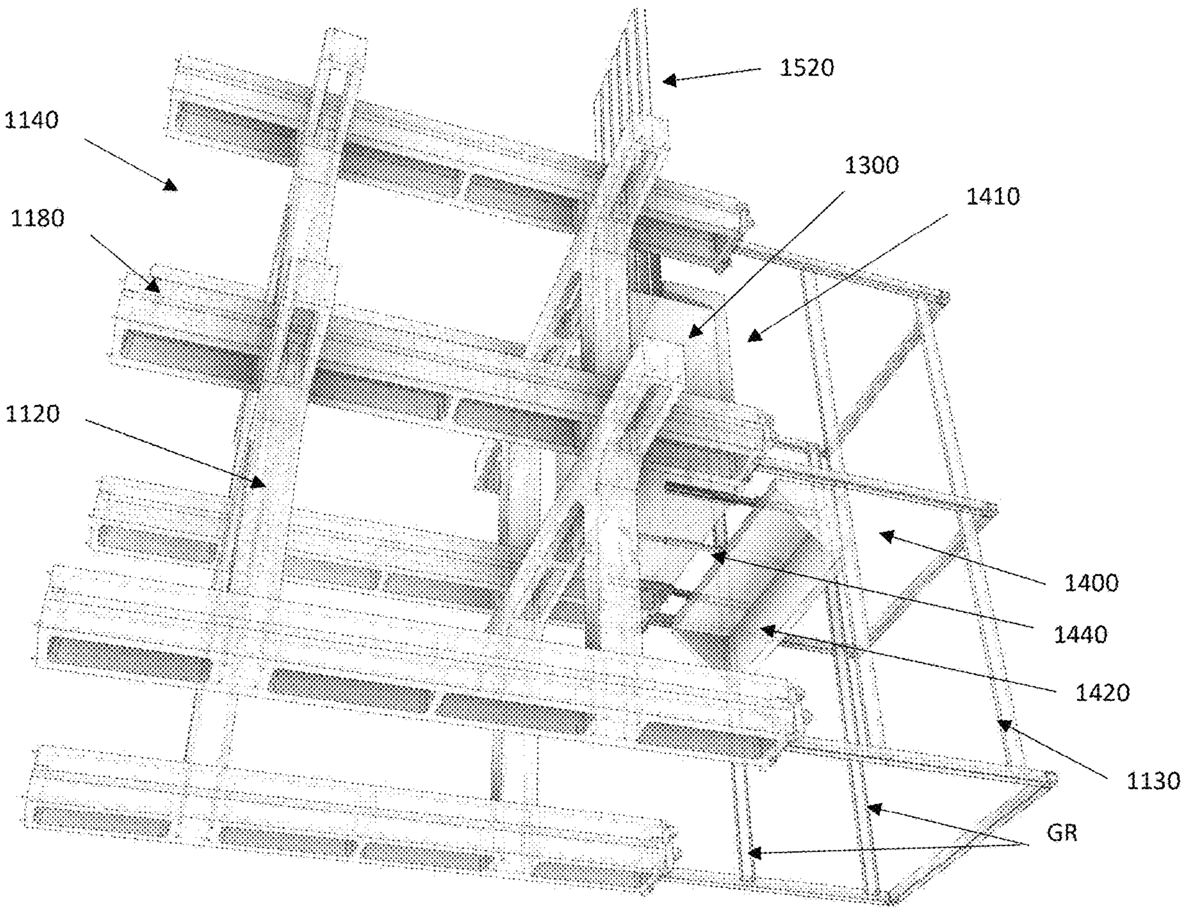
FIGS. 21-23 are partial schematic perspective views of the system of FIG. 1, illustrating a sequence of steps for transferring the block from an elevator cage to a row of the tower.
Figure 22:
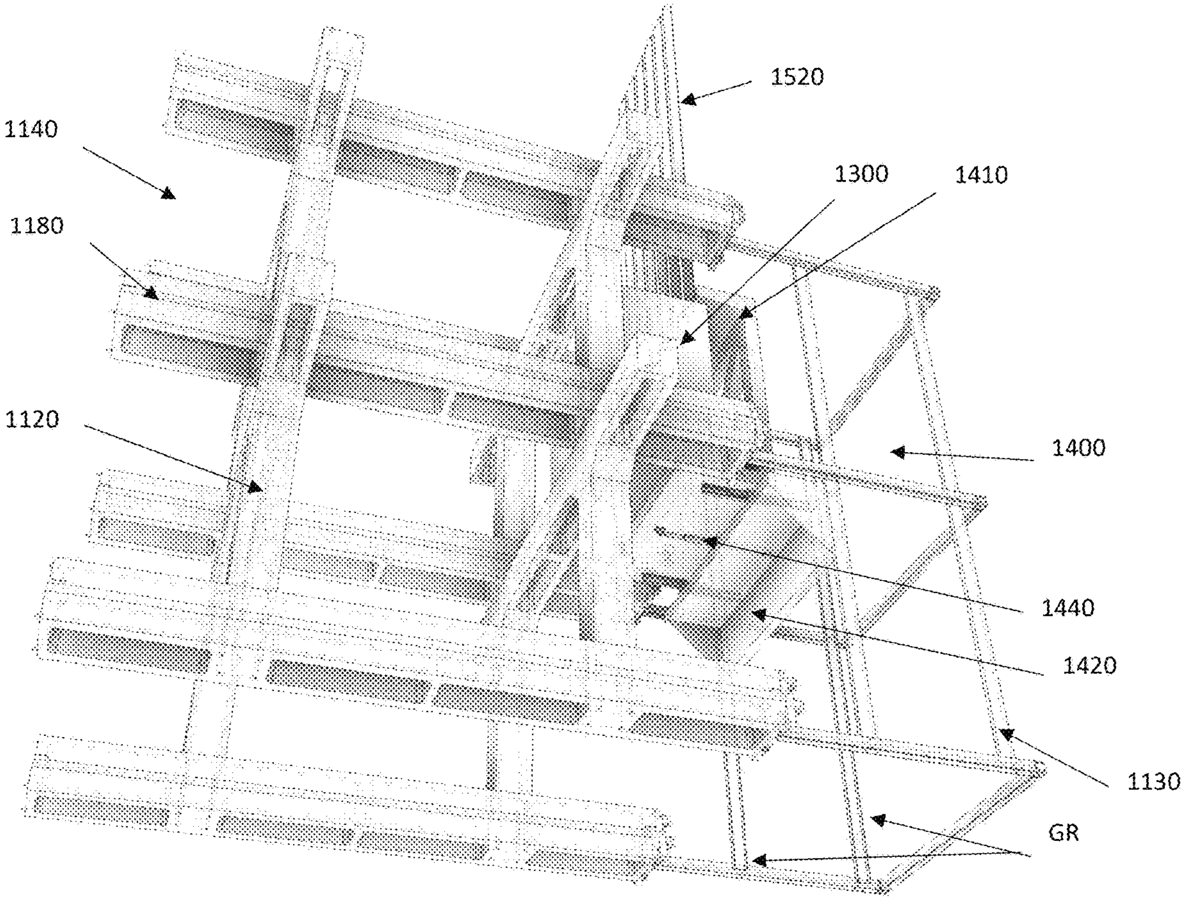
Figure 23:
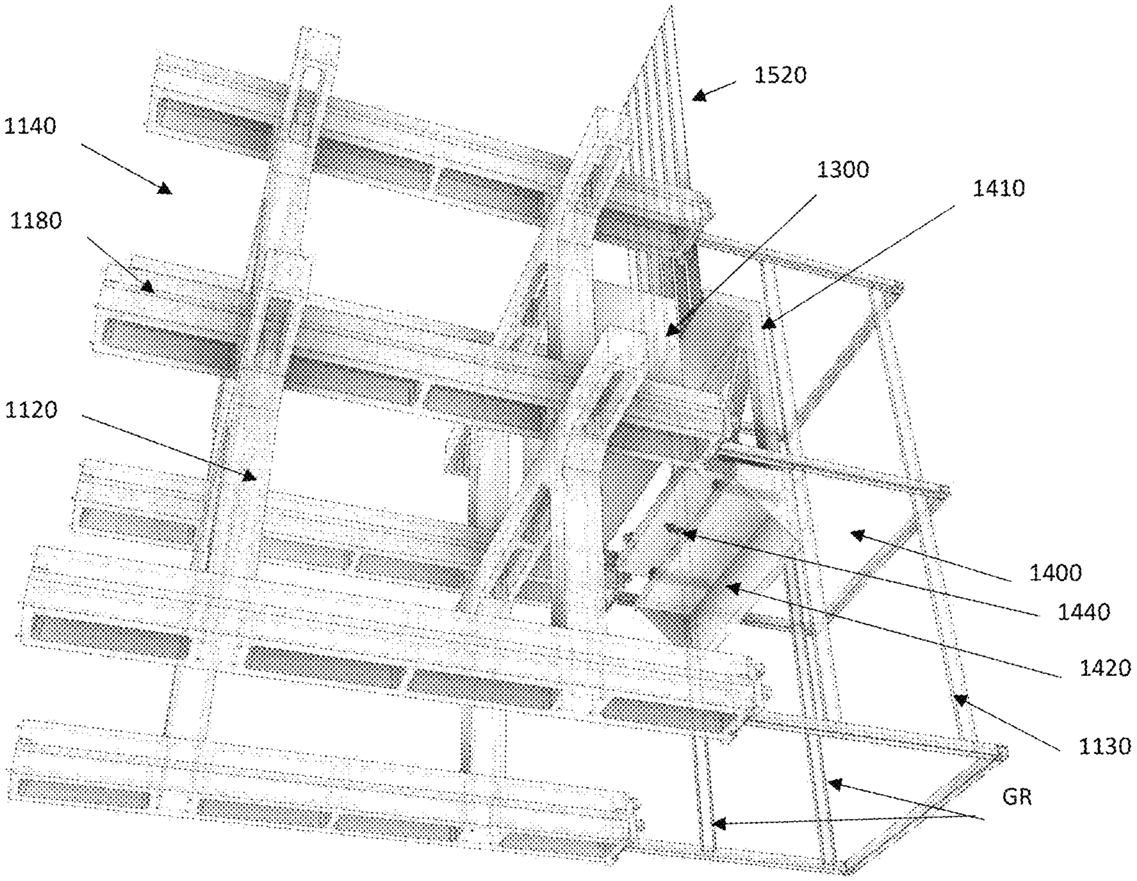

FIGS. 8-23 illustrate a sequence of an operation of the elevator cage assembly 1400 to pick-up a block 1300 from a row or floor 1140 and deliver it to a different row or floor 1140. FIGS. 8-14 show a perspective view of a sequence of operation of the elevator cage assembly 1400 to pick-up a block 1300 from a row or floor 1140 and raise it along the elevator shaft 1130 to a higher row or floor 1140. One of skill in the art will recognize that a sequence for lowering a block along the elevator shaft 1130 and delivering it to a lower row or floor 1140 would be the reverse sequence of what is shown in FIGS. 8-14. FIGS. 15-17 show a side view of a sequence of operation of the elevator case assembly 1400 to deliver a block 1300 onto the beams 1180 of a row or floor 1140. One of skill in the art will recognize that a sequence for picking up a block 1300 from the beams 1180 of a row or floor 1140 would be the reverse sequence of what is shown in FIGS. 15-17. FIGS. 18-20 show a top view of a sequence of operation of the elevator case assembly 1400 to pick-up a block 1300 from the beams 1180 of a row or floor 1140. One of skill in the art will recognize that a sequence for delivering a block 1300 onto the beams 1180 of a row or floor 1140 would be the reverse sequence of what is shown in FIGS. 18-20. FIGS. 21-23 show a bottom perspective view of a sequence of operation of the elevator case assembly 1400 to deliver a block 1300 onto the beams 1180 of a row or floor 1140. One of skill in the art will recognize that a sequence for picking up a block 1300 from the beams 1180 of a row or floor 1140 would be the reverse sequence of what is shown in FIGS. 21-23.

Figure 9:
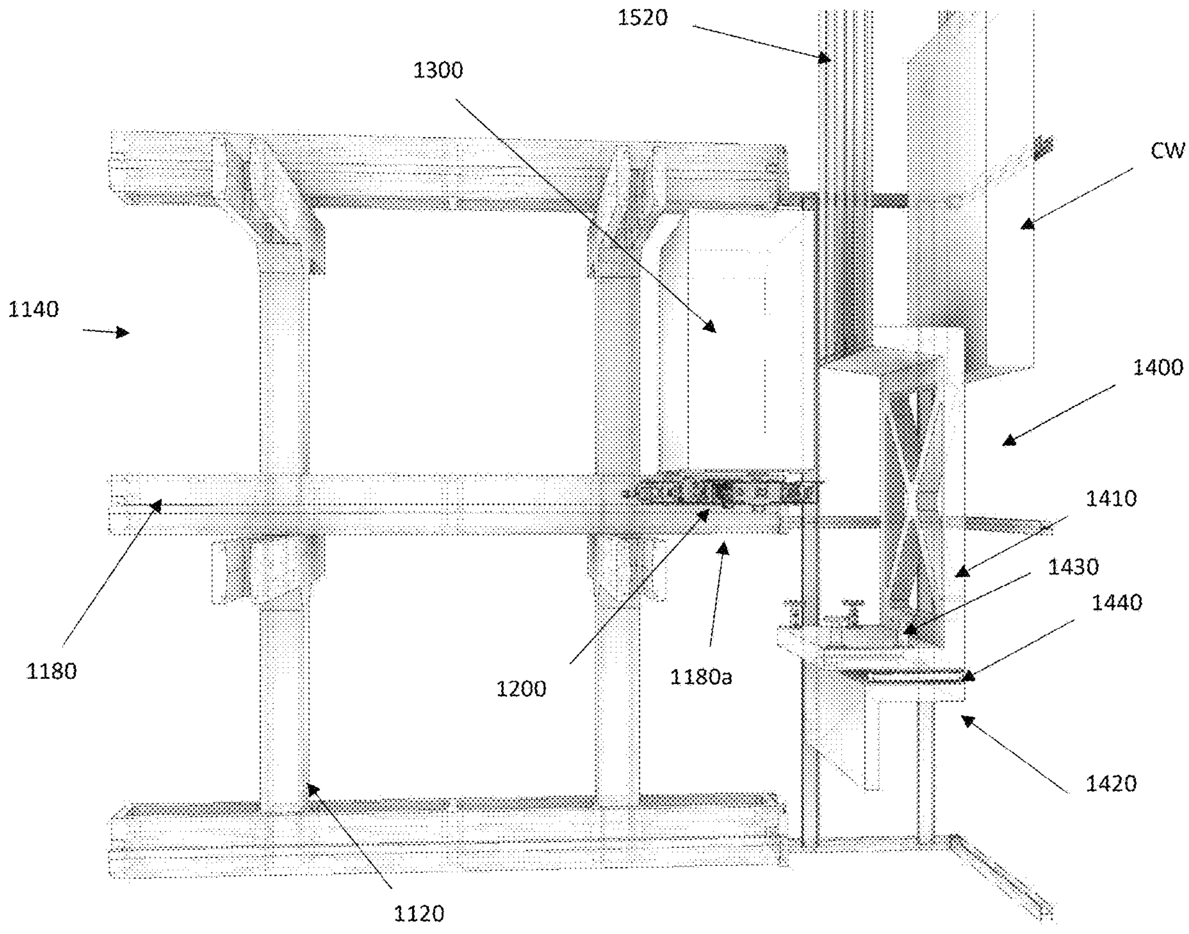
Figure 10:
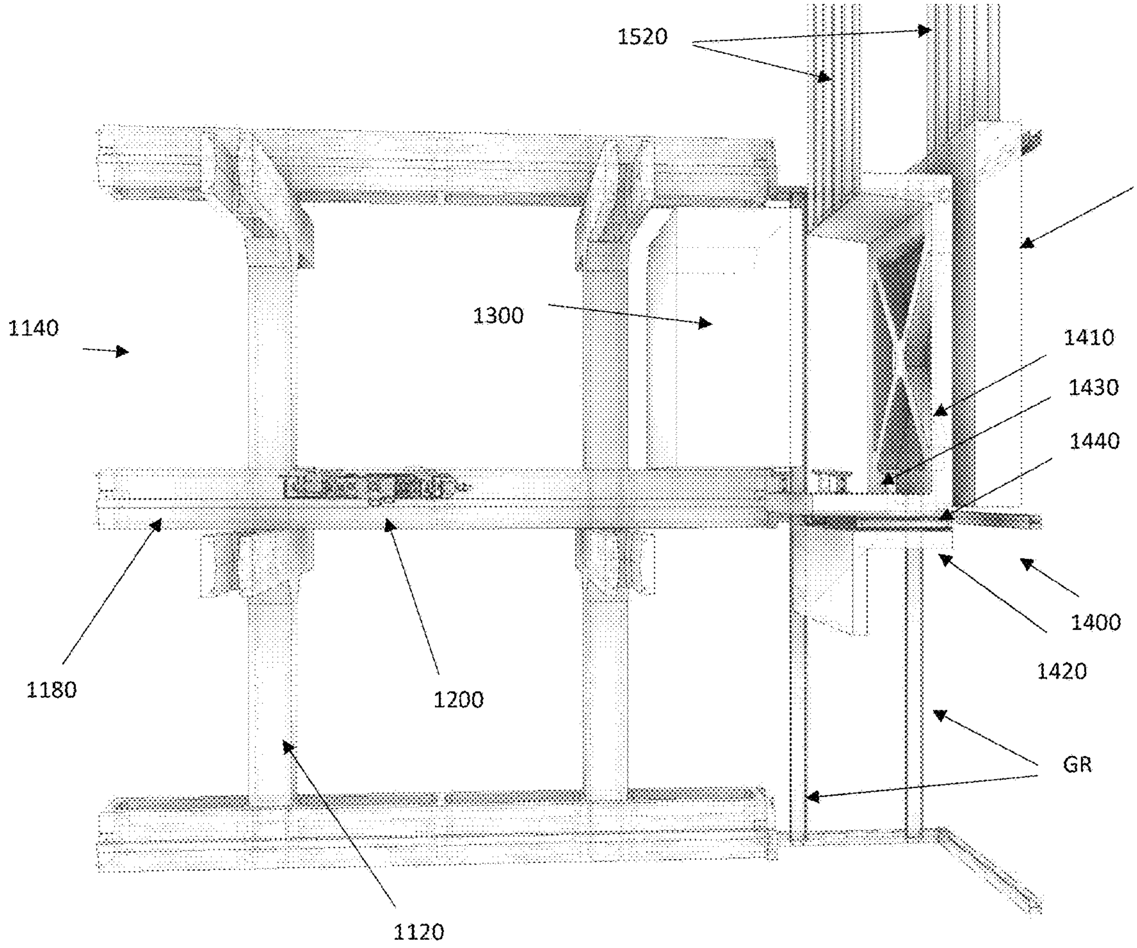

FIGS. 8-9 shows the trolley 1200 carrying a block 1300 to an end portion (e.g. cantilevered end portion) 1180*a* of the beams 1180 of a row or floor 1140 for the block 1300 to be picked-up by the elevator cage assembly 1400. Once over the end portion 1180*a* of the beams 1180, the trolley 1200 lowers the block 1300 onto the end portion 1180*a* and moves away from the block 1300 (e.g., to pick-up another block 1300 from the row or floor 1140), and the block 1300 is left supported by the end portion 1180*a* of the beams 1180, as shown in FIG. 10 and also shown in FIG. 18. The block 1300 can advantageously be delivered to the end portion 1180*a* of the beams 1180 prior to the elevator cage assembly 1400 arriving at the row or floor 1140.

With continued reference to FIG. 10, the elevator cage assembly 1400 arrives at approximately the level of the row or floor 1140. Advantageously, the elevator case assembly 1400 does not need to be exactly aligned or level with the beams 1180 of the row or floor 1140 to be able to pick up the block 1300 from the beams 1180 of the row or floor 1140, or to deliver the block 1300 onto the beams 1180 of the row or floor 1140. Additionally, the elevator cage assembly 1400 advantageously does not need to engage (e.g., lock onto) the beams 1180 of the row or floor 1140 to pick-up a block 1300 therefrom or deliver a block 1300 thereto, thereby simplifying the structure and process for moving blocks 1300 with the elevator cage assembly 1400 in the system 1000.

Figure 11:
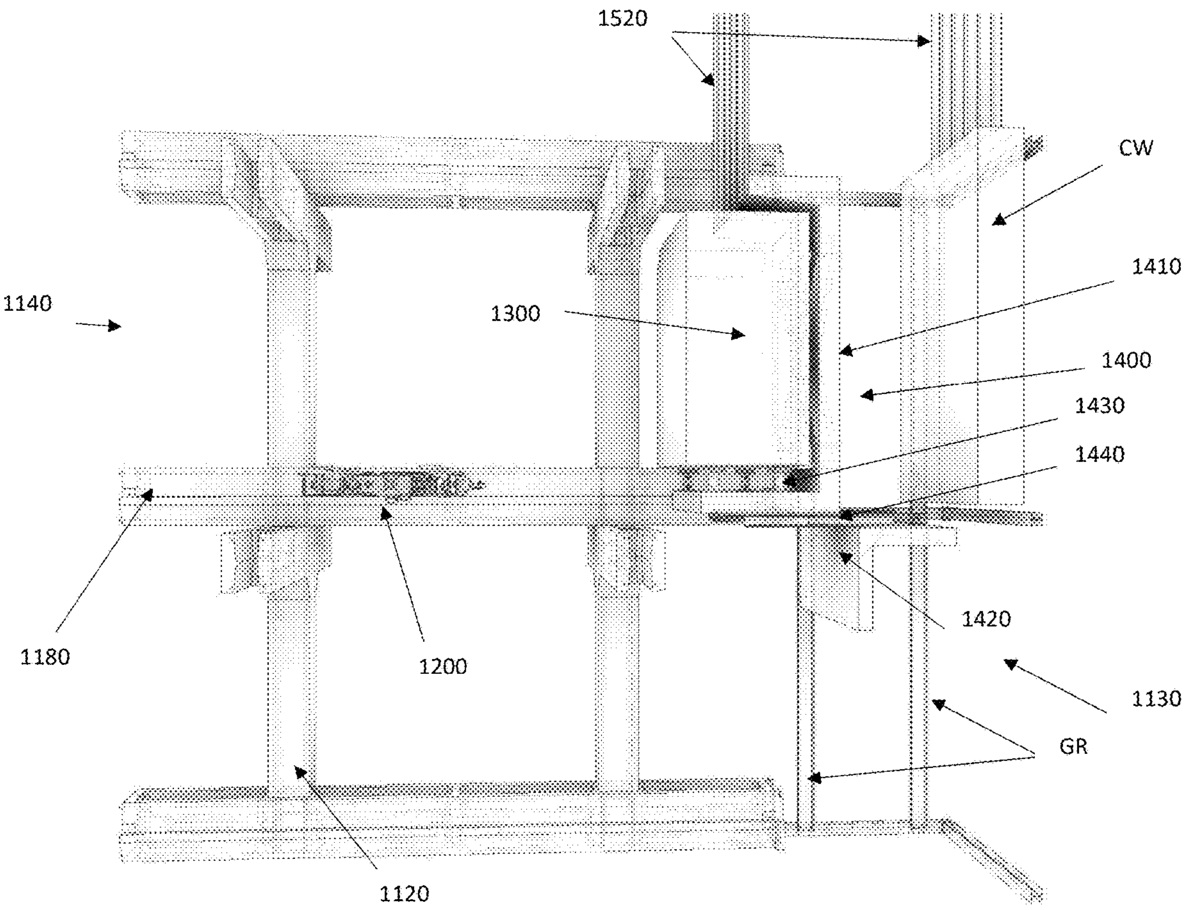

FIGS. 11-14 illustrate a sequence for picking-up a block 1300 from the beams 1180 of a row or floor 1140 with the elevator cage assembly 1400 and moving the block 1300 to a different vertical location (e.g., a different row or floor 1140). As compared with FIG. 10, FIG. 11 shows the elevator cage 1410 laterally moved relative to the base 1420 (e.g., via the sliding assembly 1440, such as via actuation of the linear actuator 1444) so that the bottom support 1412 of the elevator cage 1410 is positioned under the block 1300. Such motion of the bottom support 1412 under the block 1300 is also shown in FIGS. 18-20 and FIGS. 21-23. The elevator cage 1410 (e.g., the bottom support 1412) has a smaller width than a spacing D between the beams 1180 (see FIG. 20), allowing the elevator cage 1410 to move (unobstructed) relative to the end portion 1180*a* of the beams 1180 to position the bottom support 1412 under the block 1300. The guide rails GR support (e.g., laterally support) the base 1420 of the elevator case assembly 1400 while the elevator cage 1410 moves laterally toward the block 1300.

Figure 12:
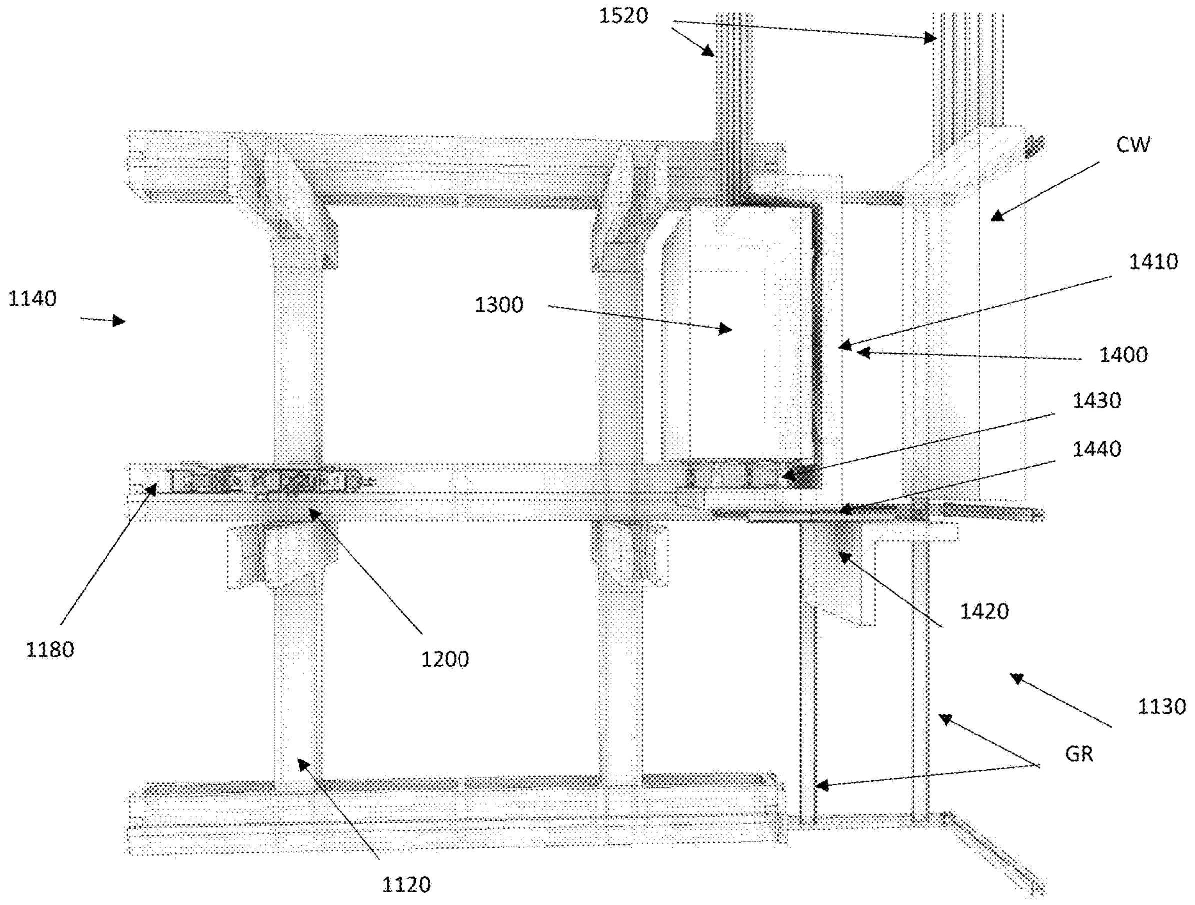

With reference to FIG. 12, the one or more supports 1430 are actuated (e.g., extended, such as via hydraulic actuation) to lift the block 1300 off beams 1180 (e.g., off the end portion 1180*a* of the beams 1180). As compared to FIG. 12, FIG. 13 shows the elevator cage 1410 moved back over the base 1420 so the block 1300 is in the elevator shaft 1130 and out of the row or floor 1140. The elevator cage assembly 1400 is then operated (e.g., via the motor 1500 (see FIG. 25, or 2500 in FIG. 29) that moves the cables or ribbons 1520) to vertically move the block 1300 to a different row or floor 1140, as shown in FIG. 14.

FIGS. 15-17 illustrate a sequence for delivering a block 1300 to a row or floor 1140 and lowering the block 1300 onto the beams 1180 of the row or floor 1140 with the elevator cage assembly 1400. Once the block 1300 has been moved by the elevator cage assembly 1400 along the elevator shaft 1130 to a desired row or floor 1140, the elevator cage 1410 is laterally moved relative to the base 1420 (e.g., via the sliding assembly 1440, such as via actuation of the linear actuator 1444 to extend the elevator cage 1410 relative to the base 1420) so that the bottom support 1412 of the elevator cage 1410 and block 1300 supported on it is moved over the beams 1180 (e.g., over the end portion 1180*a* of the beams 1180), as shown in FIG. 15. The one or more supports 1430 are actuated (e.g., retracted, lowered, such as via hydraulic actuation) to lower the block 1300 onto the beams 1180 (e.g., onto the end portion 1180*a* of the beams 1180), and the elevator cage 1410 begins to move back to a position over the base 1420 (e.g., via the sliding assembly 1440, such as via actuation of the linear actuator 1444 to retract the elevator cage 1410 relative to the base 1420), as shown in FIG. 16. The elevator cage 1410 is moved to the home position over the base 1420 (shown in FIG. 17), after which the elevator cage assembly 1400 can be operated to move to a different row or floor 1140 (e.g., to pick-up a block 1300).

Advantageously, the movement of the elevator cage 1410 to pick-up, lift and drop-off a block 1300 can be fast. In one implementation, the elevator cage 1410, when empty (e.g., not carrying a block 1300), can be moved from the home position over the base 1420 (e.g., shown in FIG. 10) to the position under the block 1300 (see FIG. 11), or from a position under the block 1300 to the home position over the base 1420, in approximately 1 to 1.5 seconds. In one implementation the one more supports 1430 can lift the block 1300 from the beams 1180, or lower the block 1300 onto the beams 1180, in approximately 3 seconds. In one implementation, the elevator cage 1410, when carrying the block 1300, can be moved from the home position over the base 1420 to the position over the beams 1180 (see FIG. 15), or from a position over the beams 1180 to the home position over the base 1420, in approximately 2 seconds. Advantageously, the movement of the elevator cage 1410 relative to the base 1420 can occur with minimal friction or loss because the elevator cage 1410 is moving a hanging weight between a position over the beams 1180 (see FIG. 12) and a position in the elevator shaft 1130 (see FIG. 13). Additionally, the system 1000 advantageously does not require coordination of the movement of the block 1300 by the trolley 1200 and the elevator cage assembly 1400. As discussed above, the trolley 1200 can be operated to move a block 1300 to the end portion 1180*a* of the beams 1180, and the elevator cage assembly 1400 can later arrive to pick up the block 1300.

Figure 24A:
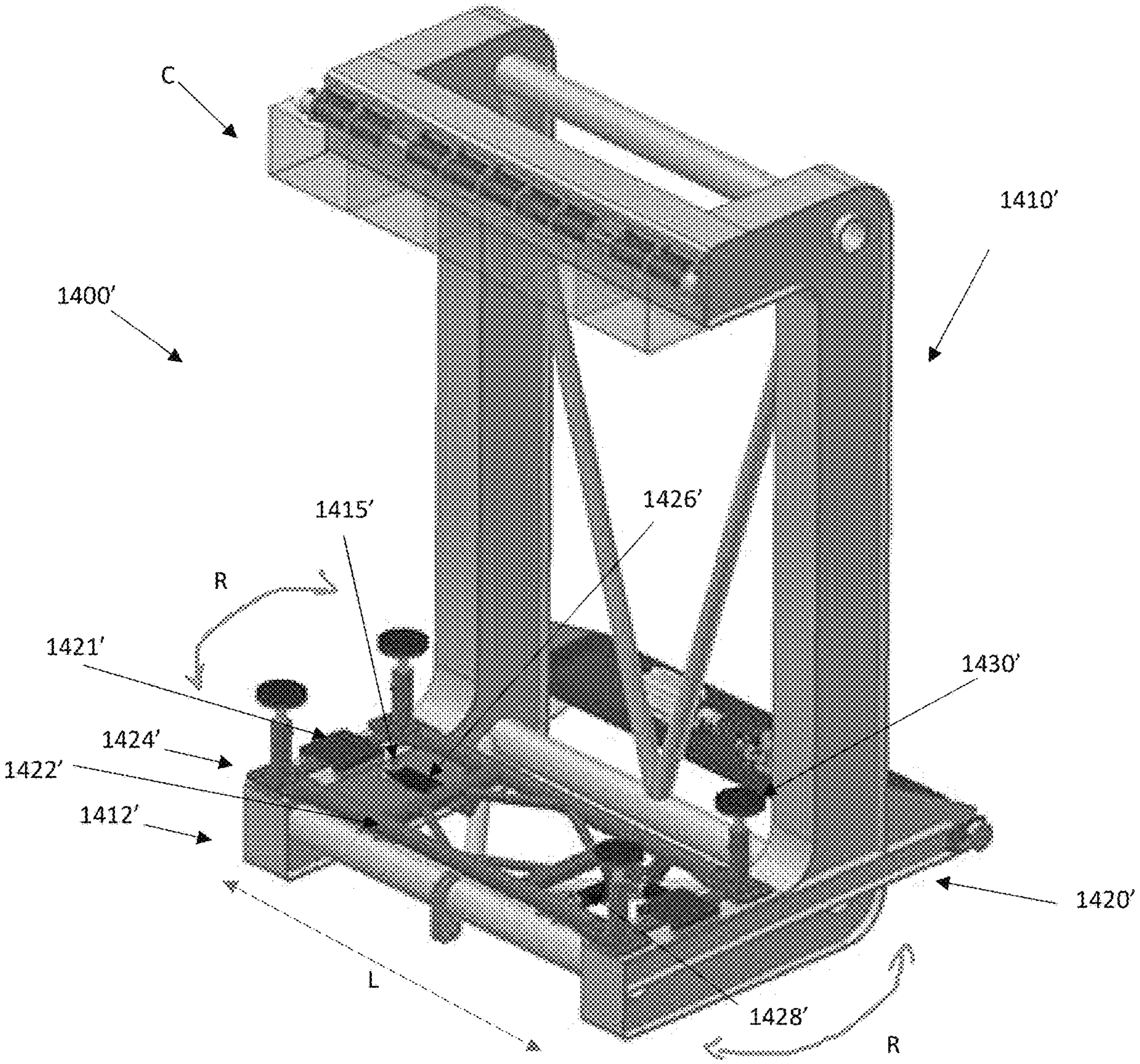
FIG. 24A is a schematic front and top perspective view of an elevator cage assembly for use in moving blocks in an energy storage and delivery system.
Figure 24B:
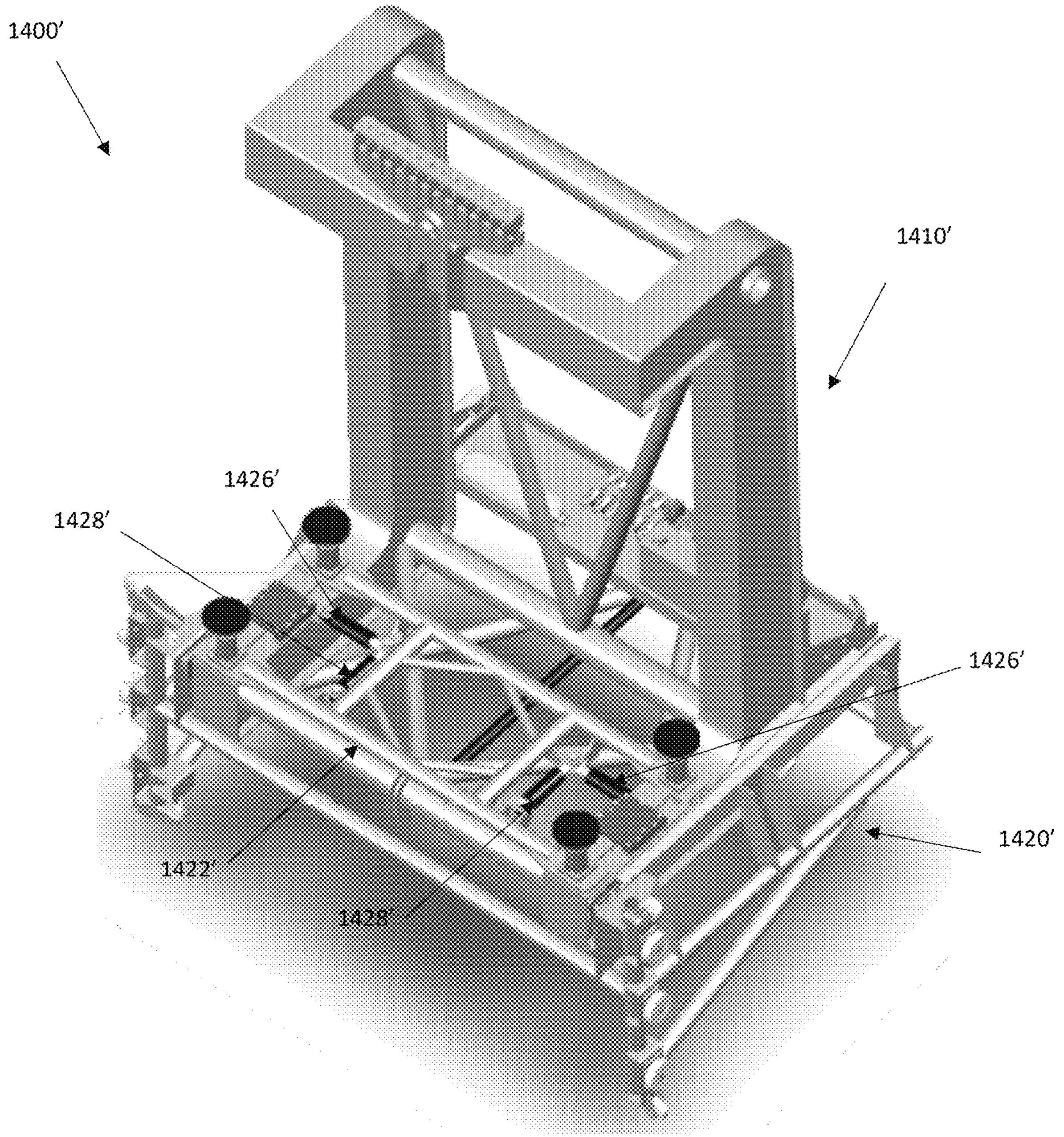
FIG. 24B is another schematic front and top perspective view of the elevator cage assembly in FIG. 24A.
Figure 24C:
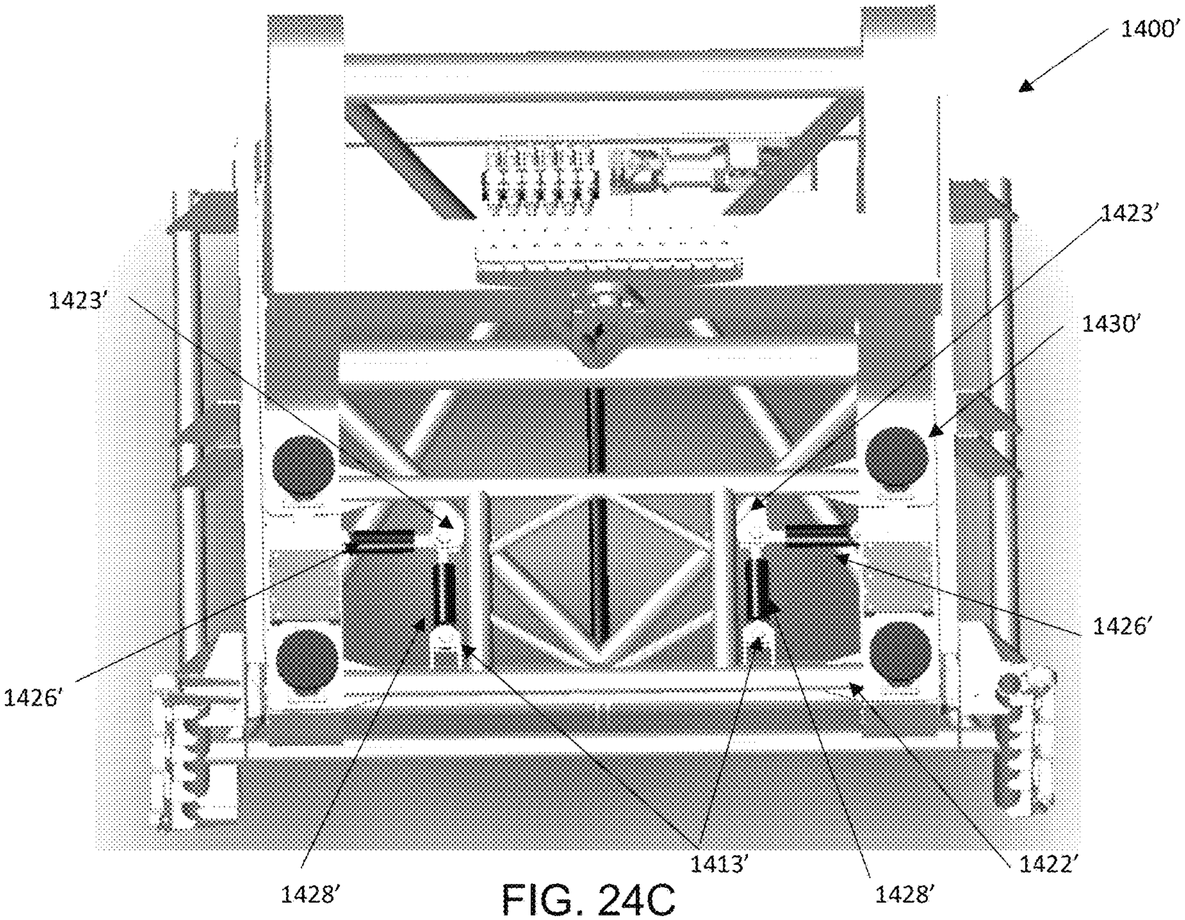
FIG. 24C is a schematic top view of the elevator cage assembly of FIG. 24A.

FIGS. 24A-24C show an elevator cage assembly 1400' for use with the energy storage and delivery system 1000, 1000', 1000" described herein. The elevator cage assembly 1400' is similar to the elevator cage assembly 1400 in FIGS. 8-23. Thus, reference numerals used to designate the various components of the elevator cage assembly 1400' are identical to those used for identifying the corresponding components of the elevator cage assembly 1400 of FIGS. 8-23, and the structure and description for the various features of the elevator cage assembly 1400 in FIGS. 8-23 are understood to also apply to the corresponding features of the elevator cage assembly 1400' in FIGS. 24A-24C, except as described below.

The elevator cage assembly 1400' differs from the elevator cage assembly 1400 in that the one or more (e.g., multiple, four) supports 1430' that receive and support the block 1300 are attached to a frame 1422' that can selectively be moved relative to the bottom support 1412' of the elevator cage 1410'. The supports 1430' can in one implementation be fixed at a set height (e.g., cannot be adjusted in height) relative to the frame 1422'. In another implementation, the supports 1430' are adjustable (e.g., manually) to adjust their height.

The frame 1422' can be disposed over one or more slide members 1424' that allow the frame 1422' to slide relative to the bottom support 1412' of the elevator cage 1410'. In one implementation, the slide members 1424' are tabs disposed under the frame 1422' at a location aligned with the supports 1430'. In one implementation, the slide members 1424' (e.g. tabs) can be made of a material (e.g., a polymer material) that facilitates the movement of the frame 1422' relative to the bottom support 1412'. The elevator cage assembly 1400' can have one or more (e.g. a pair of) braces 1421' attached to the bottom support 1412', with a portion of the frame 1422' extending between the bottom support 1412' and the braces 1421'.

The elevator cage assembly 1400' has one or more (e.g., four) pistons 1426', 1428' that couple the bottom support 1412' of the cage 1410' with the frame 1422'. As best shown in FIGS. 24B-24C, one or more (e.g., two) pistons 1426' extend in the width direction of the cage 1410' and connect between brackets 1415' attached to the bottom support 1412' and brackets 1423' attached to the frame 1422'. Additionally, one or more (e.g., two) pistons 1428' extend in the depth direction of the cage 1410' and connect between brackets 1413' attached to the bottom support 1412' and the brackets 1423' attached to the frame 1422'.

In one implementation, the pistons 1426', 1428' are hydraulically actuated pistons. In another implementation, the pistons 1426', 1428' are pneumatically actuated pistons. In still another implementation, the pistons 1426, 2418' are lead screws driven by an electric motor. The pistons 1426', 1428' can include or be proximate to inductive sensors that sense a position of the pistons 1426', 1428'.

One or more of the pistons 1426', 1428' are selectively actuated to move the frame 1422' relative to the bottom support 1412' of the elevator cage 1410'. In one example, one of the pistons 1426' can be extended and the other of the pistons 1426' can be retracted to move the frame 1422' laterally (e.g., in the widthwise direction L, shown in FIG. 24A, left or right) relative to the bottom support 1412' of the cage 1410'. In another example, one of the pistons 1428' can be extended and the other of the pistons 1428' can be retracted to rotate the frame 1422' (in direction R, shown in FIG. 24A), clockwise or counterclockwise, relative to the bottom support 1412' of the elevator cage 1410'. In another example, both of the pistons 1428' can be extended or both of the pistons 1428' can be retracted to translate the frame 1422' (in a depthwise direction), relative to the bottom support 1412' of the elevator cage 1410'. In another example, the pistons 1426' and the pistons 1428' can both be actuated to effect a lateral translation (in direction L) as well as a rotation (in direction R) of the frame 1422' relative to the bottom support 1412' of the elevator cage 1410'.

Advantageously, by selectively actuating one or more of the pistons 1426', 1428' to move the frame 1422' in the lateral direction L and/or to rotate R the frame 1422' relative to the bottom support 1412' of the elevator cage 1410', the elevator cage assembly 1400' can adjust an orientation of the block 1300 that is supported by the supports 1430' to ensure the block 1300 is centered on the elevator cage 1410' (e.g., prior to or as the elevator cage assembly 1400' lifts the block 1300, for example to a different row 1140 of the frame or tower 1100) so that the block 1300 is delivered in a centered orientation to its destination (e.g., perpendicular to the desired row 1140 of the frame or tower 1100). Accordingly, if a block 1300 has been misaligned when previously placed on a row 1140, or is misaligned when the elevator cage assembly 1400' again picks up the block 1300, the elevator cage assembly 1400' can advantageously adjust the orientation of the block 1300 to center the block 1300 relative to the elevator cage 1410' (by moving the frame 1422' in the lateral direction L and/or by rotating R the frame 1422' relative to the bottom support 1412'). In this manner, the elevator cage assembly 1400' can correct for any misalignment of a block 1300 before delivering the block 1300 to another row 1140 and thereby inhibit (e.g., prevent) the propagation of a misalignment of a block 1300 during motion of the block 1300 between rows 1140.

In one implementation, the elevator cage assembly 1400' can have a visual system including one or more cameras C (for example on an upper portion of the elevator cage 1410') that can view the orientation of the block 1300 when it is picked up by the elevator cage 1410' and determine if the block 1300 is not centered and needs to be laterally moved (e.g., in the lateral direction L) and/or rotated (in direction R) relative to the elevator cage 1410' to center the block 1300 relative to the elevator cage 1410'. The one or more cameras C can communicate with a controller (e.g., a computer controller), which can then communicate an actuation signal to one or more of the pistons 1426', 1428' to actuate the one or more of the pistons 1426', 1428' to move the frame 1422' relative to the bottom support 1412' to center the block 1300 relative to the elevator cage 1410'. Once the one or more cameras C has confirmed the block 1300 has been centered, the controller can send a control signal to the pistons 1426', 1428' to lock their position. Once the block 1300 is delivered (e.g., to a desired row 1140) and the block 1300 has been unloaded from the elevator cage 1410', the controller can communicate a control signal to the pistons 1426', 1428' to return to their original (e.g., home) position (e.g., utilizing the sensed position information provided by the induction sensors).

In one implementation, the elevator cage assembly 1400' can adjust the orientation of the block 1300 after it picks up the block 1300 but before the elevator cage assembly 1400' is lifted to a different row 1140. In another implementation, the elevator cage assembly 1400' can adjust the orientation of the block 1300 while the elevator cage assembly 1400' is in motion between rows 1140.

Figure 25:
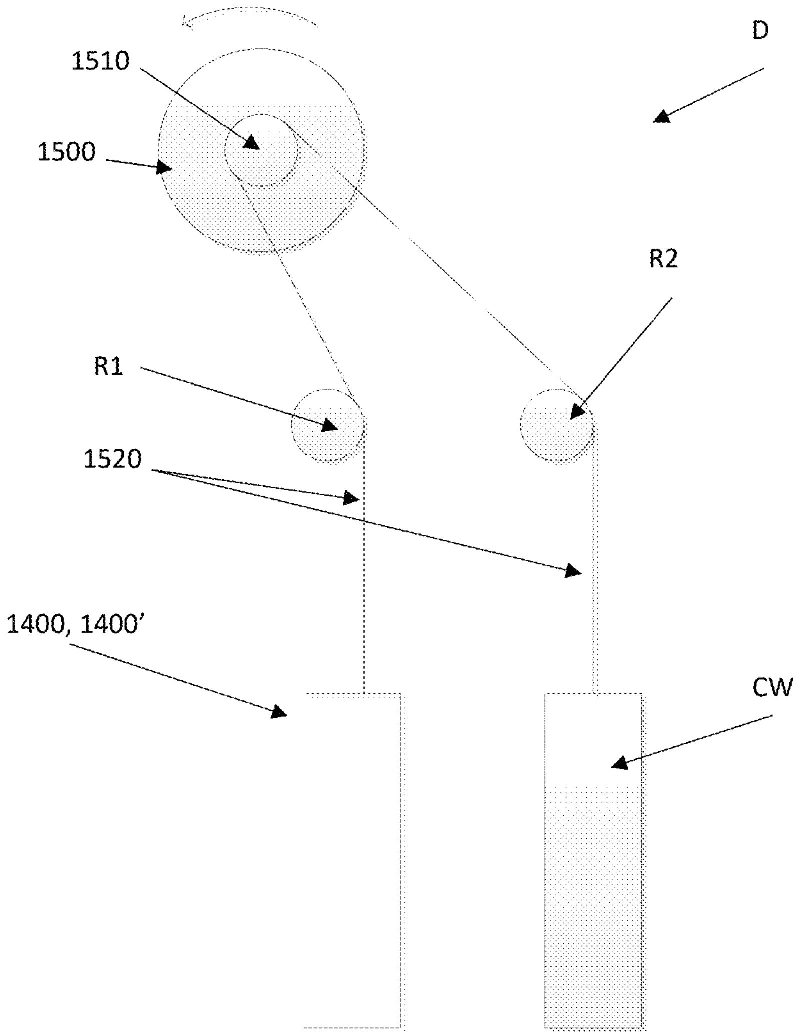
FIG. 25 is a partial schematic side view of one implementation of a lift mechanism for the elevator cage in the system of FIG. 1.
Figure 26:
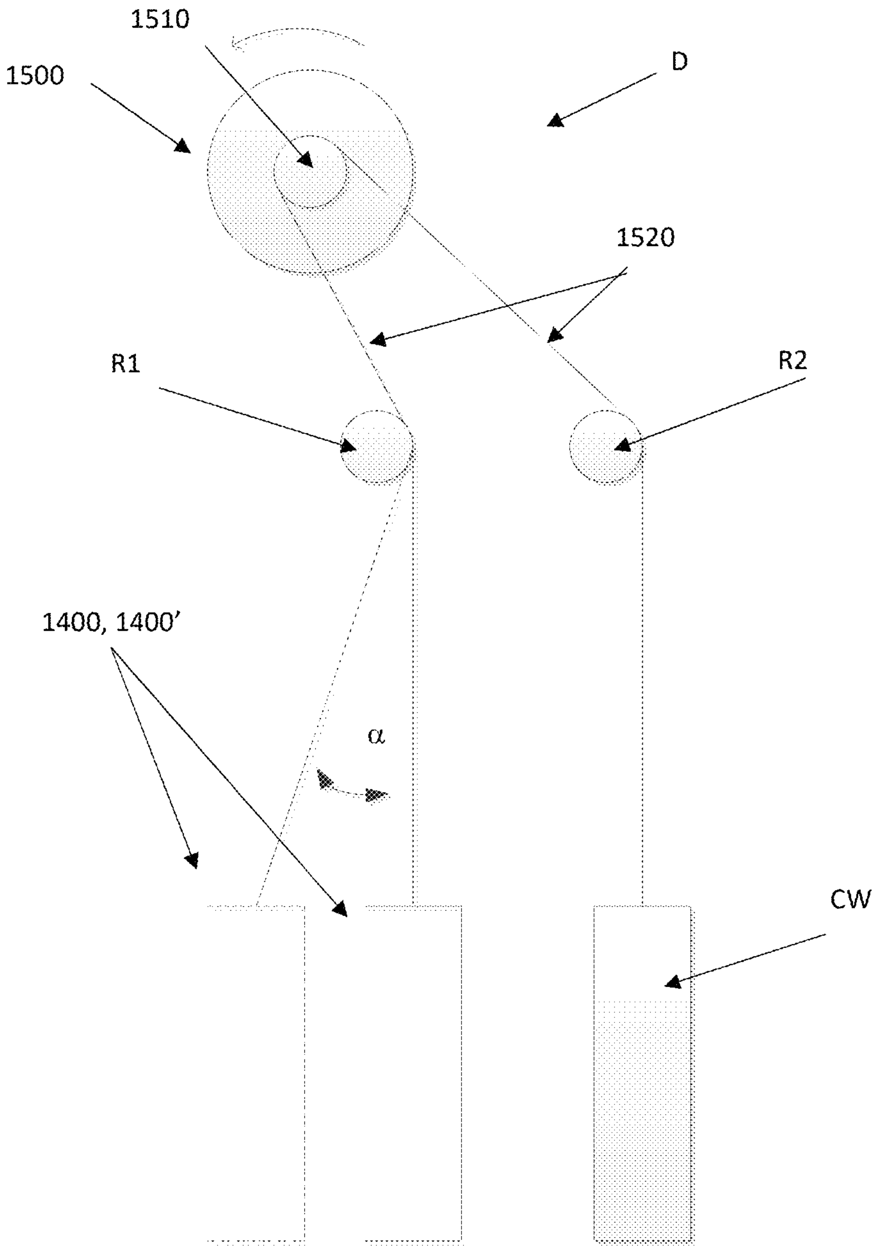
FIG. 26 is a partial schematic side view of the operation of the lift mechanism in FIG. 25.

FIGS. 25-26 show a schematic view of the lift drive system D for moving the elevator cage assembly 1400, 1400'. In one implementation, each elevator cage assembly 1400, 1400' is driven by a separate lift drive system D. In another implementation, the lift drive system D can operate two elevator cage assemblies 1400, 1400' (e.g., like the lift drive system 2000 of FIGS. 29-31 discussed further below) in separate (e.g., adjacent) elevator shafts 1130. The lift drive system D can be disposed on top of the tower 1100 of the system, such as above the elevator shaft 1130. The lift drive system D can include a motor-generator 1500 that drives (e.g., rotates a shaft 1510). The cables or ribbons (e.g., steel ribbons) 1520 extend from one end attached to the elevator cage assembly 1400, 1400', around the shaft 1510, and to the other end of the cables or ribbons 1520 that are attached to the counterweight CW. As shown in FIGS. 25-26, the cables or ribbons 1520 can extend at least partially around a roller R1 disposed vertically above the elevator cage assembly 1400, 1400' and at least partially around a roller R2 disposed vertically above the counterweight CW.

In one implementation of the lift drive system D, the motor-generator 1500 can rotate the shaft 1510 in a counterclockwise direction (as viewed in FIG. 25) to lower the elevator cage assembly 1400, 1400' (along the elevator shaft 1130, such as to a desired row or floor 1140) and raise the counterweight CW, or rotate the shaft 1510 in a clockwise direction (as viewed in FIG. 25) to raise the elevator cage assembly 1400, 1400' (along the elevator shaft 1130, such as to a desired row or floor 1140) and lower the counterweight CW. The rollers R1, R2 maintain the cables or ribbons 1520 in a vertical orientation as the elevator cage assembly 1400, 1400' and counterweight CW move along the elevator shaft 1130. This advantageously inhibits (e.g., prevents) the cables or ribbons 1520 from applying a tilting force or moment on the elevator cage assembly 1400, 1400' and counterweight CW that may cause them to swing or apply a force on the guide rails GR during motion along the elevator shafts 1130, resulting in increased efficiency and reduced energy loss (e.g., due to friction) during raising and lower of the elevator cage assembly 1400 and counterweight CW.

With reference to FIG. 26, in one implementation the roller R1 vertically above the elevator cage assembly 1400, 1400' is in a fixed location. When the elevator cage 1410 moves laterally relative to the base 1420 (as discussed above in connection with FIGS. 8-23), such as to pick-up a block 1300 from a row or floor 1140 or to deliver a block 1300 to a row or floor 1140, the cables or ribbons 1520 move from a vertical orientation to an angled orientation (at an angle $\alpha$) relative to vertical (e.g., because the cables or ribbons 1520 are coupled of the elevator cage 1410). Such angular displacement of the cables or ribbons 1520 can result in a tilting force or moment being applied by the elevator cage assembly 1400, 1400' on the guide rails GR. In one implementation, where the elevator cage assembly 1400, 1400' is at a lower elevation of the tower 1100 (e.g., rows L1-L8 in FIG. 32), such an angle and the applied force on the guide rails GR can be relatively lower, whereas such an angle ($\alpha$) and the applied force on the guide rails GR can increase as the elevator cage assembly 1400 is raised (e.g., to rows U1-U8 in FIG. 32), with the largest angle ($\alpha$) and force being at the top row of the tower 1100.

Figure 27:
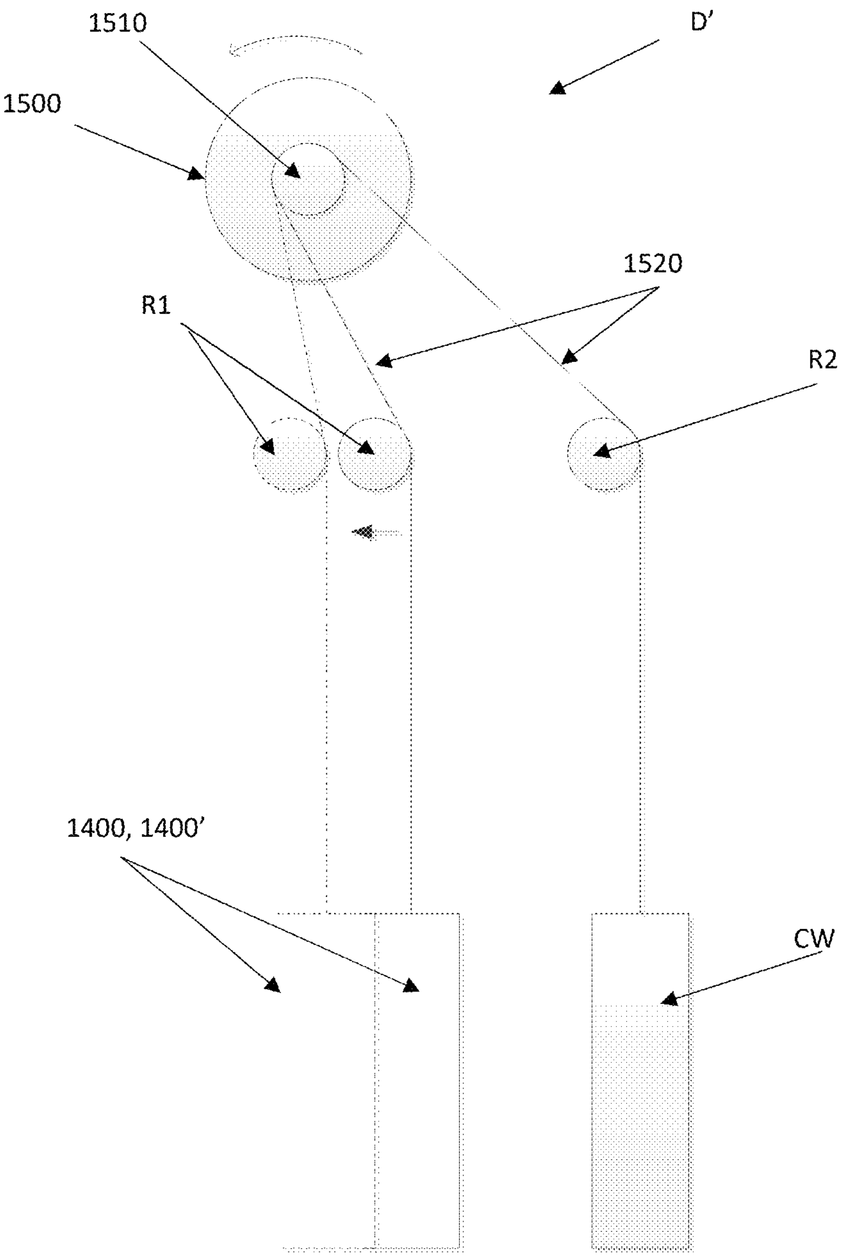
FIG. 27 is a partial schematic side view of another implementation of a lift mechanism for the elevator cage in the system of FIG. 1.

FIG. 27 shows a lift drive system D' that is similar to the lift drive system D in FIG. 25. Thus, reference numerals used to designate the various components of the lift drive system D' are identical to those used for identifying the corresponding components of the lift drive system D of FIG. 25, and the structure and description for the various features of the lift drive system D in FIG. 25 are understood to also apply to the corresponding features of the lift drive system D' in FIG. 27, except as described below.

The lift drive system D' in FIG. 27 differs from the lift drive system D in FIG. 25 in that the roller R1 disposed vertically above the elevator cage assembly 1400, 1400' has a variable position that can allow the cables or ribbons 1520 to remain substantially vertical as the elevator cage assembly 1400, 1400' moves laterally relative to the base 1420 (as discussed above in connection with FIGS. 8-23), such as to pick-up a block 1300 from a row or floor 1140 or to deliver a block 1300 to a row or floor 1140. Advantageously, this inhibits (e.g., prevents) the cables or ribbons 1520 from applying a tilting force or moment on the elevator cage assembly 1400, 1400' that may cause it to apply a force on the guide rails GR, resulting in a lower load or stress on the guide rails GR during operation of the elevator cage assembly 1400, 1400' to pick-up or deliver a block 1300.

In one implementation, the roller R1 can be movably coupled to a sliding mechanism, where an actuator (e.g., linear actuator, such as a hydraulic actuator) can move the roller R1 (horizontally as shown in FIG. 27), for example simultaneously with the movement of the elevator cage 1410 relative to the base 1420 to maintain the cables or ribbons 1520 between the elevator cage 1410 and the roller R1 substantially vertical as the elevator cage 1410 moves relative to the base 1420 of the elevator cage assembly 1400, 1400'. Optionally, the same controller that controls the movement of the elevator cage 1410 relative to the base 1420 also controls the movement of the roller R1. In one implementation, the roller R1 is actuated to move laterally (e.g., simultaneously) with movement of the elevator cage 1410 relative to the base 1420 of the elevator cage assembly 1400, 1400' irrespective of the row or floor 1140 the elevator cage assembly 1400, 1400' is at during such movement. In another implementation, the controller can actuate the roller R1 to move laterally (e.g., simultaneously) with movement of the elevator cage 1410 relative to the base 1420 of the elevator cage assembly 1400, 1400' for some, but not all, of the rows or floors 1140 of the tower 1100. For example, the controller can maintain the roller R1 in a fixed location during movement of the elevator cage 1410 relative to the base 1420, when in lower floors (e.g., rows L1-L8 in FIG. 32) of the tower 1100, while it can laterally move the roller R1 (simultaneously) with movement of the elevator cage 1410 relative to the base 1420 when in higher floors (e.g., rows U1-U3, rows U1-U5, rows U1-U8 in FIG. 31) of the tower 1100 (e.g., where the angle $\alpha$, shown in FIG. 26, between the cables or ribbons 1520 and vertical, and the applied force on the guide rails GR, can be higher).

Figure 28:
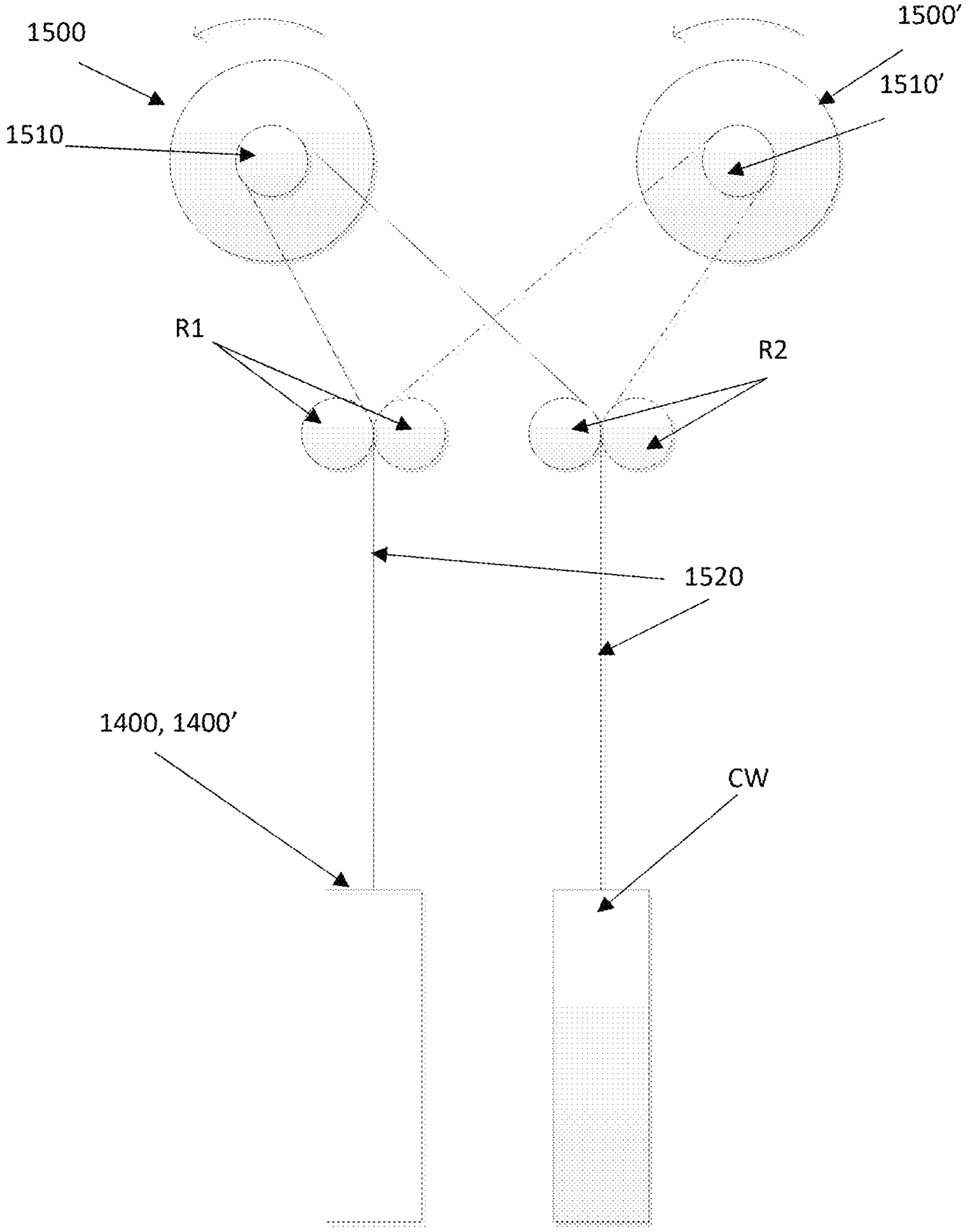
FIG. 28 is a partial schematic side view of another implementation of a lift mechanism for the elevator cage in the system of FIG. 1.

As shown in FIG. 1, the tower 1100 can have multiple modules in a depth or Y direction, each module having multiple rows or floors 1140 with elevator shafts 1130 at the two ends of the rows or floors 1140, and an elevator cage assembly 1400, 1400' can travel in each elevator shaft 1130. With reference to FIG. 28, an electric motor-generator 1500' can be disposed over another elevator shaft 1130 (e.g., into the page in FIG. 28) and operate in the same manner as the electric motor-generator 1500 to move its associated elevator cage assembly 1400, 1400' along its elevator shaft 1130 to pick-up, raise or lower, and deliver blocks 1300 to rows or floors 1140 associated with its elevator shaft 1130 (e.g., in a different module in a depth direction of the page or Y direction of the tower 1100 in FIG. 1). The electric motor-generators 1500, 1500', and their associated shafts 1510, 1510', can be offset laterally (as shown in FIG. 28), for example, to allow the lift drive systems D to fit over the elevator shafts 1130 (e.g., without interfering with each other). The cables or ribbons 1520 that are moved by the electric motor generator 1500' and are attached to their respective elevator cage assembly 1400 and counterweight CV can extend at least partially around their associated rollers R1, R2, which can be aligned (in the depth direction in FIG. 27 or Y direction in FIG. 1) with the rollers R1, R2 associated with the electric motor-generator 1500. In one implementation, the rollers R1, R2 can be offset in the depth direction (e.g., Y direction in FIG. 1) so that the cables or ribbons 1520 are aligned in the depth direction between the rollers R1, R2 and their respective elevator cage assembly 1400, 1400' and counterweight CW, the elevator cage assemblies 1400, 1400' are aligned (e.g., in the depth direction) and the counterweights CW are aligned (in the depth direction).

Figure 29:
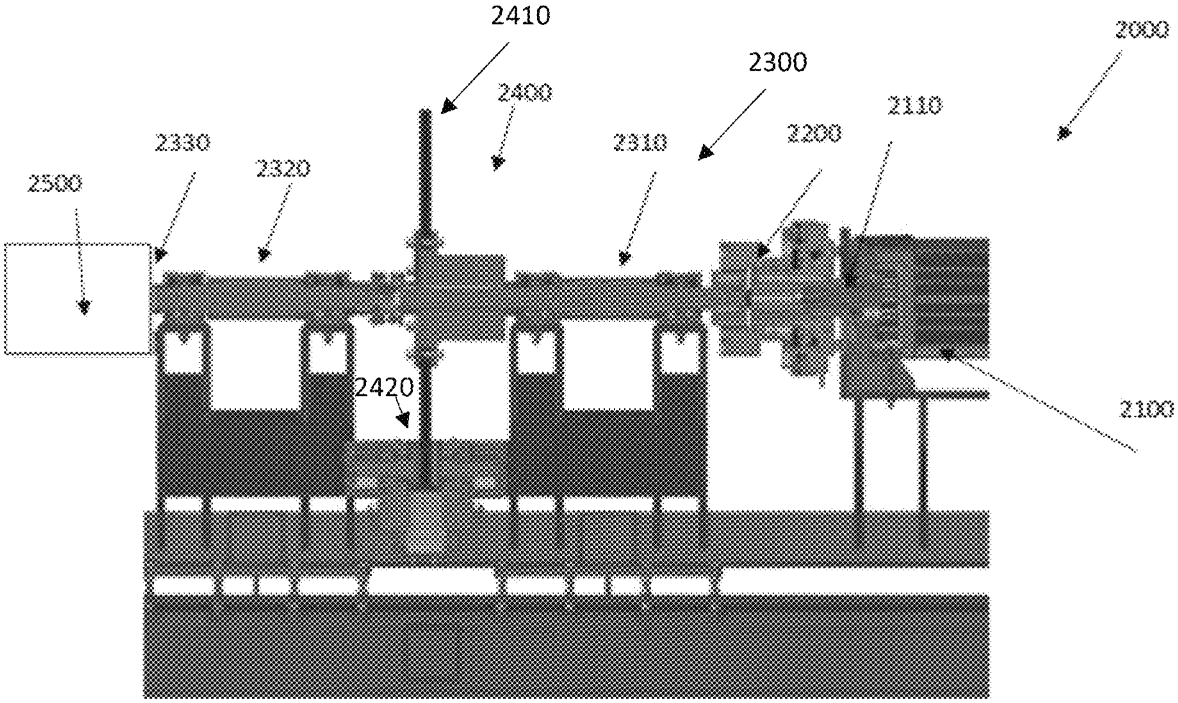
FIG. 29 is a schematic side view of a portion of a lift drive system

FIG. 29 shows a portion of a lift drive system 2000 for use in the tower 1100 of system 1000 in FIG. 1. The system 2000 includes an electric motor 2100 (e.g., similar to the electric motor-generator 1500) with an output shaft 2110 attached to a clutch 2200. A shaft 2300 is coupled to an opposite end of the clutch 2200, so that the clutch 2200 is between the motor 2100 and the shaft 2300. The shaft 2300 has a first portion 2310 and a second portion 2320. A brake assembly 2400 is at least partially disposed between the first and second portions 2310, 2320 of the shaft 2300. The brake assembly 2400 includes a brake disc 2410 mounted about the shaft 2300 between the first and second portions 2310, 2320, and a brake pad mechanism 2420 disposed on both sides of the disc 2410 and operable to selectively engage the disc 2410 to frictionally engage the disc 2410 to inhibit (e.g., prevent) rotation of the disc 2410 and therefore rotation of the shaft 2300 and to selectively disengage from the disc 2410 to permit rotation of the disc 2410 and therefore the shaft 2300 unimpeded. An end 2330 of the shaft 2300 can be coupled to an electric motor 2500 (e.g. electric motor-generator), further described below. In one implementation, the electric motor 2500 can be a 50 kW motor and can be an asynchronous motor. In one implementation, the electric motor 2100 can be an 800 kW to 1000 kW motor and can be a synchronous motor. Additional details of the lift drive system 2000 can be found in U.S. Provisional Application No. 63/203,070, filed Jul. 7, 2021, which is incorporated herein by reference.

Figure 30:
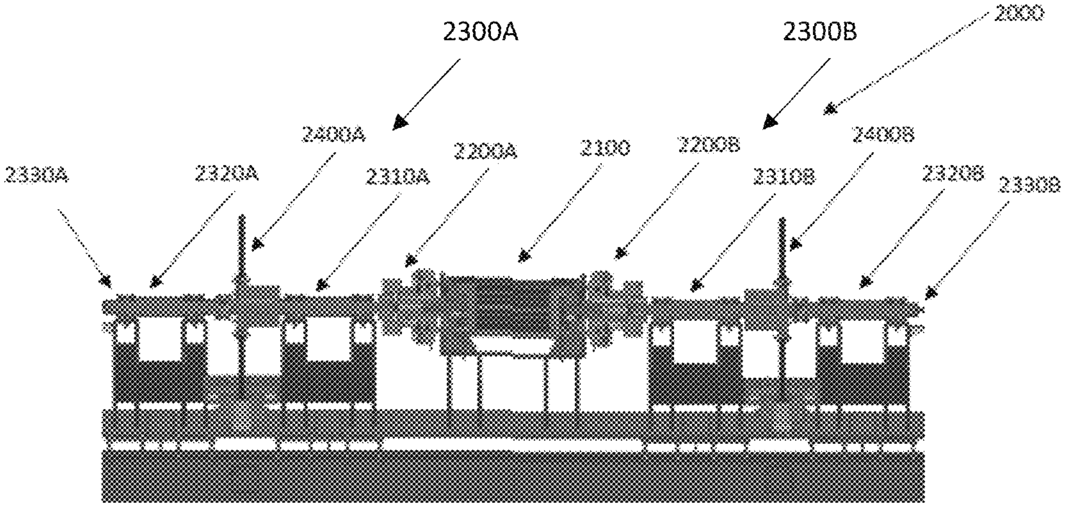
FIG. 30 is a schematic side view of a portion of a lift drive system.
Figure 31:
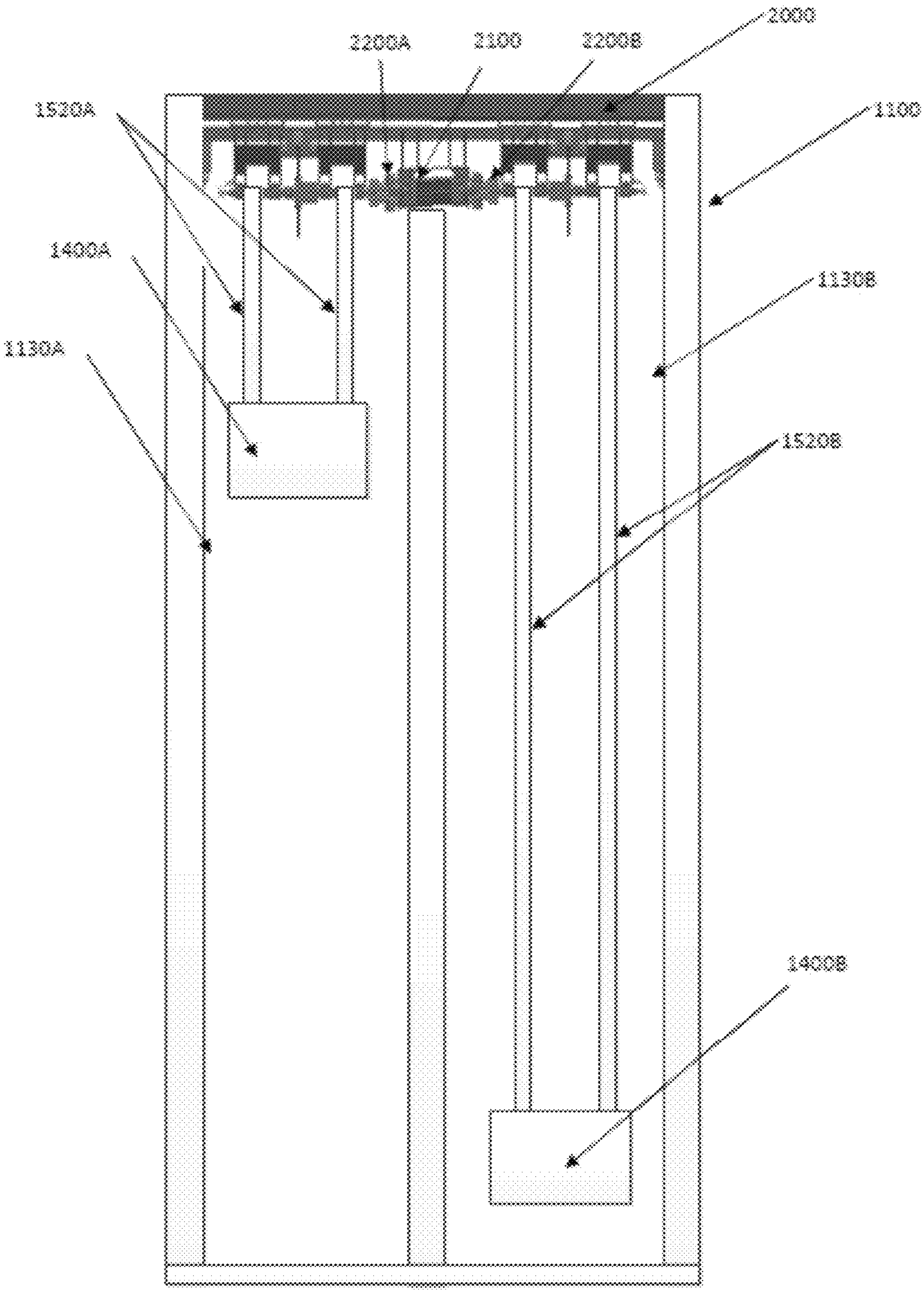
FIG. 31 is a schematic side view of a lift drive system on a tower that is operable to lift blocks in adjacent elevator shafts

FIG. 30 shows an implementation of the lift drive system 2000 and FIG. 31 shows the lift drive system 2000 of FIG. 30 on top of the tower or frame 1100 (e.g., in the Y or depth direction of the tower 1100, as shown in FIG. 1) over two adjacent elevator shafts 1130A, 1130B. As discussed above in connection with FIG. 28, the lift drive system 2000 for two other adjacent elevator shafts (e.g., adjacent to the left of elevator shaft 1130A or to the right of elevator shaft 1130B) can be laterally offset (e.g., into or out of the page in FIG. 31) relative to the lift drive system 2000 shown in FIG. 31.

With reference to FIG. 30, an electric motor 2100 has two output shafts (not shown) that couple to two clutches 2200A, 2200B on opposite sides of the motor 2100, which couple to shafts 2300A, 2300B that have first shaft portions 2310A, 2310B and second shaft portions 2320A, 2320B, with brake assembly 2400A, 2400B interposed between the first shaft portions 2310A, 2310B and second shaft portions 2320A, 2320B. The shafts 2300A, 2300B have end portions 2330A, 2330B. Though not shown, electric motors similar to electric motor 2500 (e.g., electric motor-generator) can be operably coupled with each of the end portions 2330A, 2330B.

With reference to FIG. 31, cables or ribbons (e.g., steel ribbons) 1520A can extend at least partially about the first and second portions 2310A, 2320A and operably couple to an elevator cage assembly 1400A (e.g., similar to the elevator cage assembly 1400 discussed above) that travels within an elevator shaft 1130A of the frame or tower 1100. Cables or ribbons (e.g., steel ribbons) 1520B can extend at least partially about the first and second portions 2310B, 2320B and operably couple to an elevator cage assembly 1400B (e.g., similar to the elevator cage assembly 1400 discussed above) that travels within an elevator shaft 1130B of the frame or tower 1100. Though not shown, the portions of the cables or ribbons 1520A, 1520B that extend over and first shaft portions 2310A, 2310B and second shaft portions 2320A, 2320B connect to counterweights, in a similar manner as they connect to the counterweight CW in FIGS. 1 and 8-23. Though FIG. 31 shows the lift drive system 2000 disposed on a top of the tower 1100, in another implementation the lift drive system can be disposed on a bottom of the tower 1100 and the cables or steel ribbons extend upward therefrom and over pulleys to redirect the cables or ribbons to the elevator cage assembly and/or counterweight.

With reference to FIGS. 30-31, in operation, the electric motor 2100 can be connected to the electrical grid and constantly operated on grid power. The shafts 2110 of the motor 2100 rotate only in one direction. FIG. 31 shows the elevator cage assembly 1400B in a lower elevation of the tower 1100 and the elevator cage assembly 1400A in a higher elevation of the tower 1100. The elevator cage assembly 1400A and 1400B can be similar (e.g., identical) to the elevator cage assembly 1400 or 1400' described above. The elevator cage assembly 1400B is maintained in the lower elevation (e.g., to pick up a block 1300 to move to a higher elevation) by disengaging the clutch 2200B from the motor 2100 and engaging the brake 2400B to maintain the elevator cage assembly 1400B in a vertical position. Once the elevator cage assembly 1400B is ready to be lifted, the clutch 2200B is gradually engaged and the brake 2400B gradually disengaged, until the clutch 2200B is fully engaged (e.g., open), allowing the rotation of the shaft 2110 of the motor 2100 to rotate the shaft 2300B to lift the elevator cage assembly 1400B (e.g., by having the cables or ribbons 1520B pulled up and over the first and second portions 2310B, 2320B. As the elevator cage assembly 1400B is raised, the counterweight (not shown) that is operatively coupled to the other side of the cables or ribbons 1520B is lowered. Once the elevator cage assembly 1400B reaches the desired higher elevation of the tower 1100, the clutch 2200B is disengaged and the brake 2400B engaged, allowing the elevator cage assembly 1400B to lower the block 1300 onto the beams 1180 of a row or floor 1140 (as discussed above). Once the elevator cage assembly 1400B is empty (and the elevator cage 1410 in the home position over the base 1420) and is ready to be lowered, it can be lowered in the same manner described below for lowering the elevator cage assembly 1400A.

With continued reference to FIG. 31, while the elevator cage assembly 1400B is ready to be raised, the elevator cage assembly 1400A is at the higher elevation ready to be lowered. At this higher location, the clutch 2200A has been disengaged and the brake 2400A engaged to allow the elevator cage assembly 1400A to lower the block 1300 onto the beams 1180 of a row or floor 1140 (as discussed above). Once the elevator cage assembly 1400A is empty (and the elevator cage 1410 in the home position over the base 1420), the brake 2400A is disengaged and the clutch 2200A remains disengaged, and the motor 2100 attached to the end 2330A of the shaft 2300A rotates the shaft 2300A in the opposite direction to quickly lower the elevator cage assembly 1400A to the lower elevation to pick up another block 1300. The motor 2100 can optionally operate with a variable frequency drive to accurately position the elevator cage assembly 1400A when lowered. Once the elevator cage assembly 1400A has picked up the block 1300 and is ready to be raised, it can be raised in the same manner described above for raising the elevator cage assembly 1400B.

In the manner described above, one of the clutches 2200A, 2200B is always engaged and the other of the clutches 2200B, 2200A is always disengaged, and one of the elevator cage assemblies 1400A, 1400B is being raised while the other of the elevator cage assemblies 1400B, 1400A is being lowered. Therefore, power continuity is achieved by releasing one clutch (e.g., once a block 1300 has been raised and its elevator cage assembly is ready to be lowered) and engaging another clutch (e.g., once a block 1300 has been loaded onto an elevator cage assembly and ready to be raised). Advantageously, the motor 2100 constantly operates on electrical grid power and does not utilize gear boxes or power electronics, thereby making the lift system 2000 less complex and less costly. Additionally, while the motor 2100 is constantly operating on electrical grid power, when it is not lifting a load the cost of electricity is relatively small.

To lower blocks 1300 from the higher elevation to the lower elevation of the tower 1100 to generate and deliver electricity (e.g., based on the force or kinetic energy of the block 1300 being lowered), a modification of the process described above for lowering the elevator cage assembly 1400A is used. The circuitry of the asynchronous motor 2500 is opened, and the brake 2400A is released and the motor 2500 allowed to spin in the opposite direction and generated electricity can be transferred to the electrical grid. Once the elevator cage assembly 1400A reaches the lower elevation, the brake 2400A is engaged. The block 1300 can then be transferred to the row or floor 1140 as discussed above and the elevator cage assembly 1400A raised to pick-up another block 1300. The same approach can be used to generate electricity with the elevator cage assembly 1400B when it is at a higher elevation, carrying a block 1300 and ready to be lowered.

Figure 32:
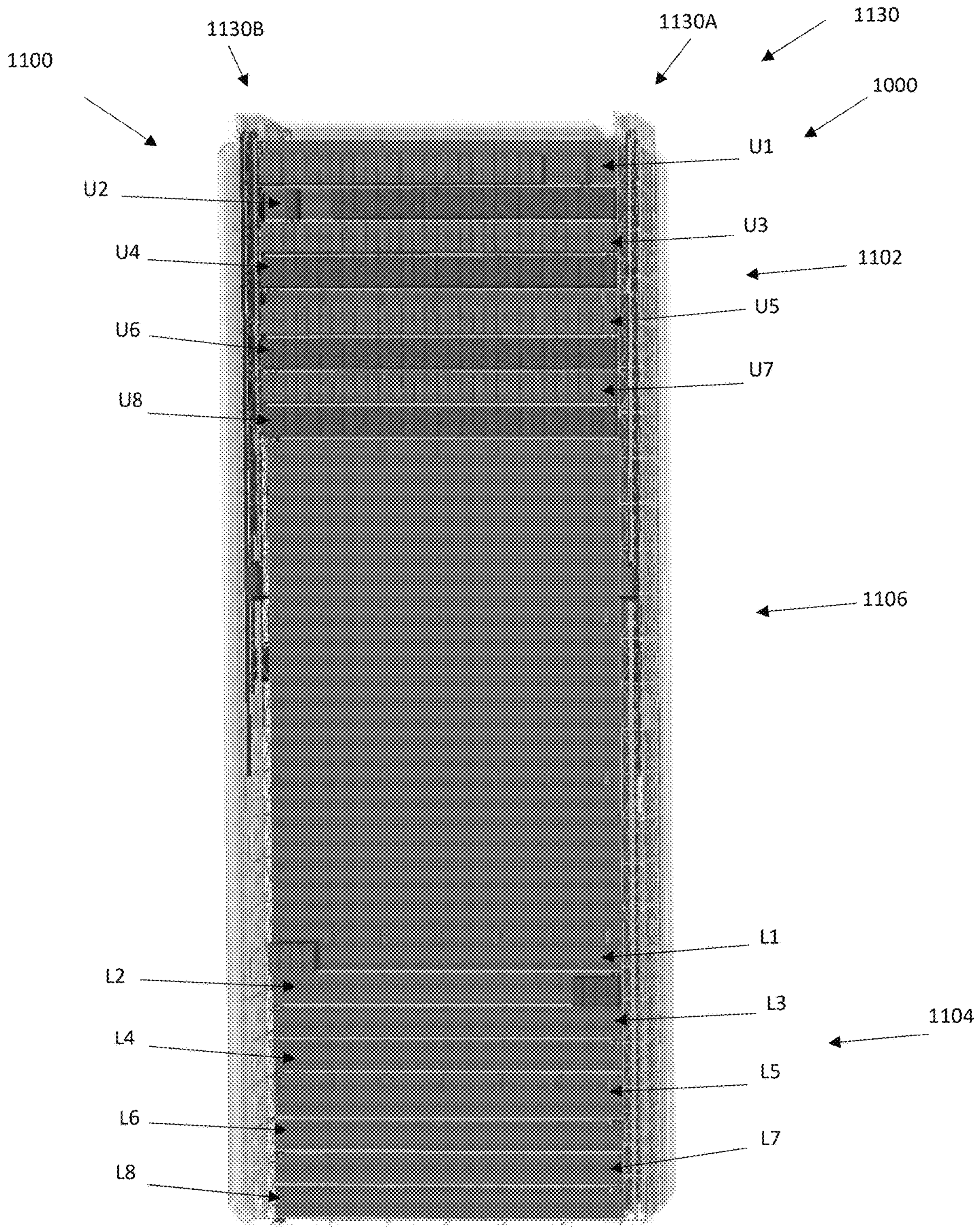
FIG. 32 is a schematic end view of the system in FIG. 1 illustrating the arrangement of blocks in the tower and movement of blocks from an upper portion of the tower to a lower portion of the tower to generate electricity.

FIG. 32 is a schematic end view of the energy storage and delivery system or module 1000 illustrating the arrangement of blocks 1300 in the frame or tower 1100 and movement of blocks 1300 between rows 1140 in the upper section 1102 and rows 1140 of the lower section 1104 of the frame or tower 1100 to store energy or generate electricity. One of skill in the art will recognize that process described below can be implemented in the energy storage system 1000' in FIG. 3 and the energy storage system 1000" in FIG. 4, so that the description below also applies to the systems 1000', 1000" in FIGS. 3-4. Ballast weights or blocks 1300 are moved from the rows or floors 1140 in the upper section 1102 to corresponding rows or floors 1140 in the lower section 1104 to generate electricity (e.g., via the motor-generator 1500 in FIG. 25 or 2500 in FIG. 29), for example for delivery to the electrical grid or for use of by the intermediate section 1106 (e.g., to power a data center or power lights for vertical farming). Ballast weights or blocks 1300 are moved from the rows or floors 1140 in the lower section 1104 to corresponding rows or floors 1140 in the upper section 1102 to store electrical energy as potential energy of the blocks 1300.

Ballast weights or blocks 1300 can be disposed in rows 1140 in the upper section 1102 of the tower or frame 1100 (e.g., in rows U1 to U8). Blocks 1300 in each row 1140 in the upper section 1102 can be moved horizontally (in the X direction) by a trolley 1200 in each row U1-U8 to the elevator shafts 1130A, 1130B to be lowered by its associated elevator cage assembly 1400, 1400' vertically (in the Z direction) to a corresponding row 1140 (e.g., rows L1 to L8) in the lower section 1104. The blocks 1300 delivered to the rows L1 to L8 are moved horizontally by a trolley 1200 in each of the rows L1-L8. The blocks 1300 can be lowered by the elevator cage assembly 1400, 1400' via the elevator shafts 1130A, 1130B at the ends of the rows 1140, for example via a sequence of movements described above in connection with FIGS. 8-23. The elevator cage assembly 1400, 1400' and fixed elevator shafts 1130A, 1130B at the ends of the rows 1140 provide for efficient, fast and guided movement of the blocks 1300 between the upper section 1102 and the lower section 1104. During operation of the energy storage and delivery system 1000, motion of the elevator cage assembly 1400 in the right elevator shaft 1130A is interleaved with the motion of the elevator cage assembly 1400, 1400' in the left elevator shaft 1130B as discussed below. Though the system 1000 in FIG. 32 shows eight rows U1-U8 in the upper section 1102 and eight rows L1-L8 in the lower section 1104 that support blocks 1300, one of skill in the art will recognize that the number of rows 1140 can vary and the same process described herein for moving blocks 1300 from a row 1140 in the upper section 1102 to a corresponding row 1140 in a lower section 1104, and how the blocks 1300 are distributed, applies irrespective of the total number of rows 1140 in the upper section 1102 and in the lower section 1104.

With reference to FIG. 32, every block 1300 removed from a row 1140 in the upper section 1102 is advantageously replaced by another block 1300 in the lower section 1104 so that the average foundation load and/or average distribution of load on the ground (e.g., foundation) of the frame or tower 1100 remains substantially constant (e.g., constant). In one implementation, every block removed from a row 1140 in the upper section 1102 is advantageously replaced by another block 1300 in a row 1140 of the lower section 1104 in the same column 1120 location, such that the load remains the same in said column 1120. For example, where the upper section 1102 has eight rows U1-U8 filled with blocks 1300 and the lower section 1104 has eight rows L1-L8 to which blocks 1300 can be moved from the upper section 1102, there are eight blocks 1300 in any one column 1120. During operation of the system 1000, each column 1120 maintains the same number of blocks 1300 (e.g., eight blocks), advantageously maintaining the frame or tower 1100 under a balanced load (e.g., every column 1120 maintains substantially the same load). Therefore, the load on the foundation (or ground) of the frame or tower 1100 does not change during operation of the system 1000, so the foundation is advantageously not stressed (e.g., cyclically) or experience differential settlement by the movement of the blocks 1300 between the rows or floors 1140 in the upper section 1102 and the rows or floors 1140 in the lower section 1104.

With continued reference to FIG. 32, the blocks 1300 in row U1 in the upper section 1102 can be lowered to the row L1 in the lower section 1104 to generate electricity. Similarly, blocks 1300 in row U2 can be lowered to row L2, blocks 1300 in row U3 can be lowered to row L3, blocks 1300 in row U4 can be lowered to row L4, blocks 1300 in row U5 can be lowered to row L5, blocks 1300 in row U6 can be lowered to row L6, blocks 1300 in row U7 can be lowered to row L7, and blocks 1300 in row U8 can be lowered to row L8. The blocks in any row 1140 in the upper section 1102 travels the same vertical distance to the corresponding row 1140 in the lower section 1104, such that each block 1300 experiences the same vertical jump. As shown in FIG. 32, blocks 1300 in a subset of the rows 1140 (e.g., row U1, U3, U5 and U7) are lowered via one elevator shaft 1130A and the rest of the rows 1140 (e.g., row U2, U4, U6 and U8) are lowered via the other elevator shaft 1130B. As discussed above, the intermediate section 1106 remains free of blocks and can be used for other purposes.

Blocks 1300 can be moved simultaneously between the upper section 1102 and lower section 1104 via the elevator shafts 1130A, 1130B. For example, a block 1300 can be lowered from row U1 to row L1 via elevator shaft 1130A and transferred to a trolley 1200 (e.g., in a reverse sequence to that described above for FIGS. 8-14), which can move the block 1300 horizontally toward the opposite end of the row L1 from the location on row U1 from which the block 1300 was taken. Substantially simultaneously, a block 1300 can be lowered from row U2 to row L2 via the elevator shaft 1130B and transferred to a trolley 1200 (e.g., in a reverse sequence to that described above for FIGS. 8-14), which can move the block 1300 horizontally toward the opposite end of the row L2 from the location on row U2 from which the block 1300 was taken. As discussed above, this advantageously allows the average foundation load and/or average distribution of load on the ground (e.g., foundation) of the frame or tower 1100 remains substantially constant.

Advantageously, the elevator cage assembly 1400 moves fast between the rows U1-U8 in the upper section 1102 and the rows L1-L8 in the lower section 1104 of the frame or tower 1100 (e.g., because the cost of the power used to move the blocks 1300 decreases with the speed the blocks 1300 are moved by the elevator cage assembly 1400). Because the elevator cage assembly 1400 moves much faster than the trolley 1200, in one implementation the elevator cage assembly 1400 does not return to the same row 1140 in the upper section 1102 until it after it has moved a block 1300 from the rest of the rows 1140 in the upper section 1102 that service the associated elevator shaft 1130A, 1130B to their corresponding rows 1140 in the lower section 1104.

Figure 33A:
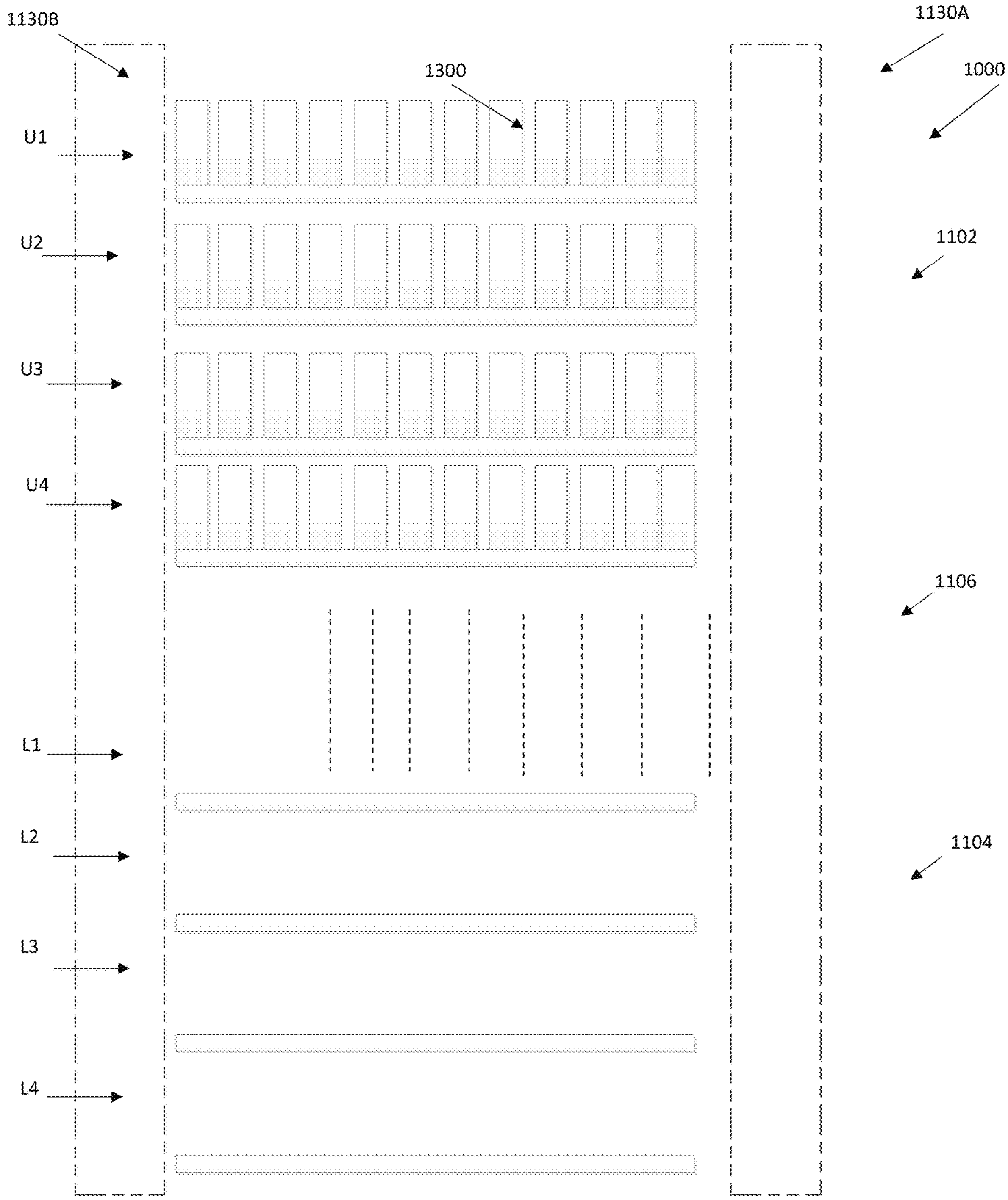
FIGS. 33A-33D are schematic end views of the system in FIG. 1 illustrating the movement of blocks from an upper portion of the tower to a lower portion of the tower to generate electricity.
Figure 33B:
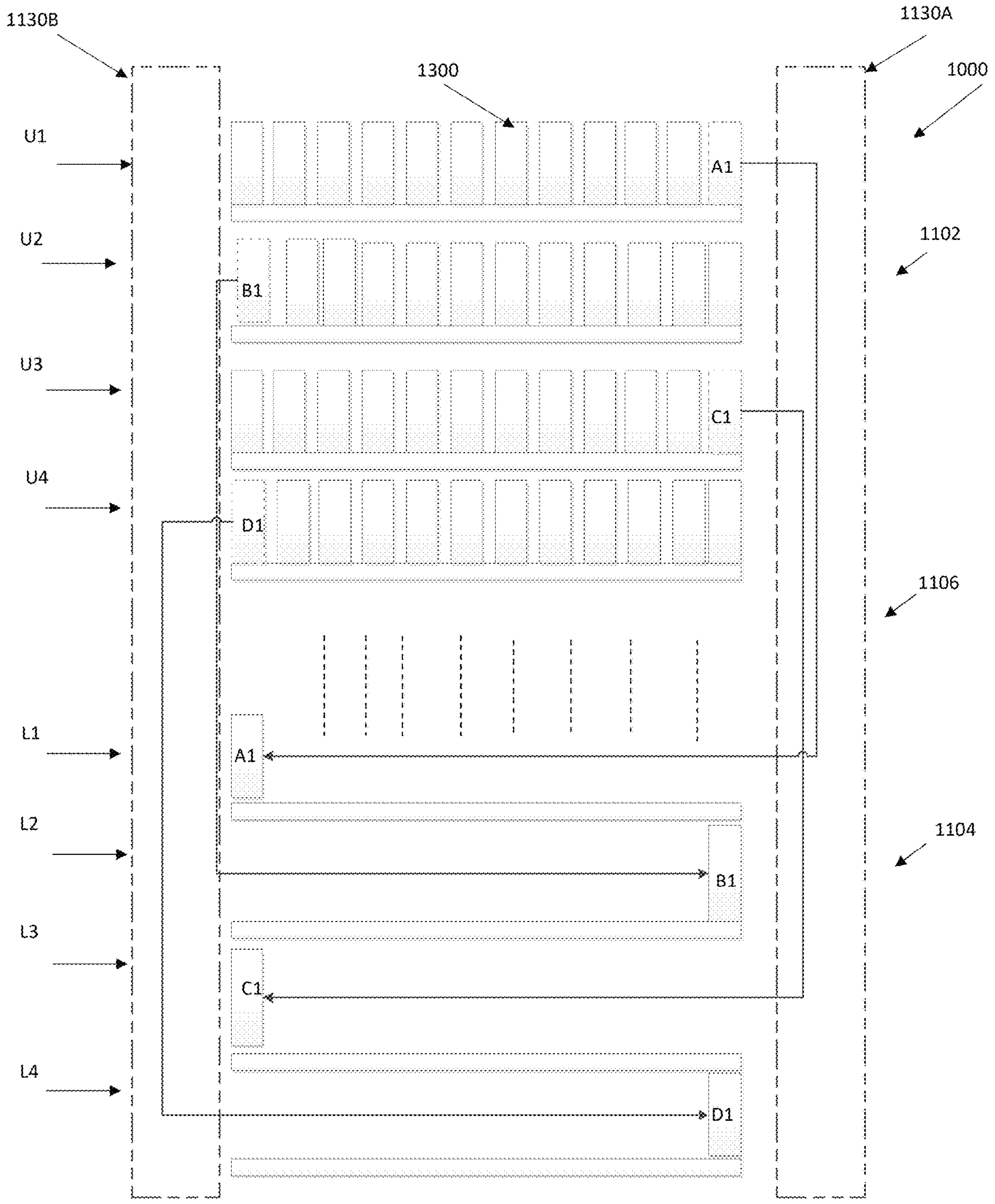
Figure 33C:
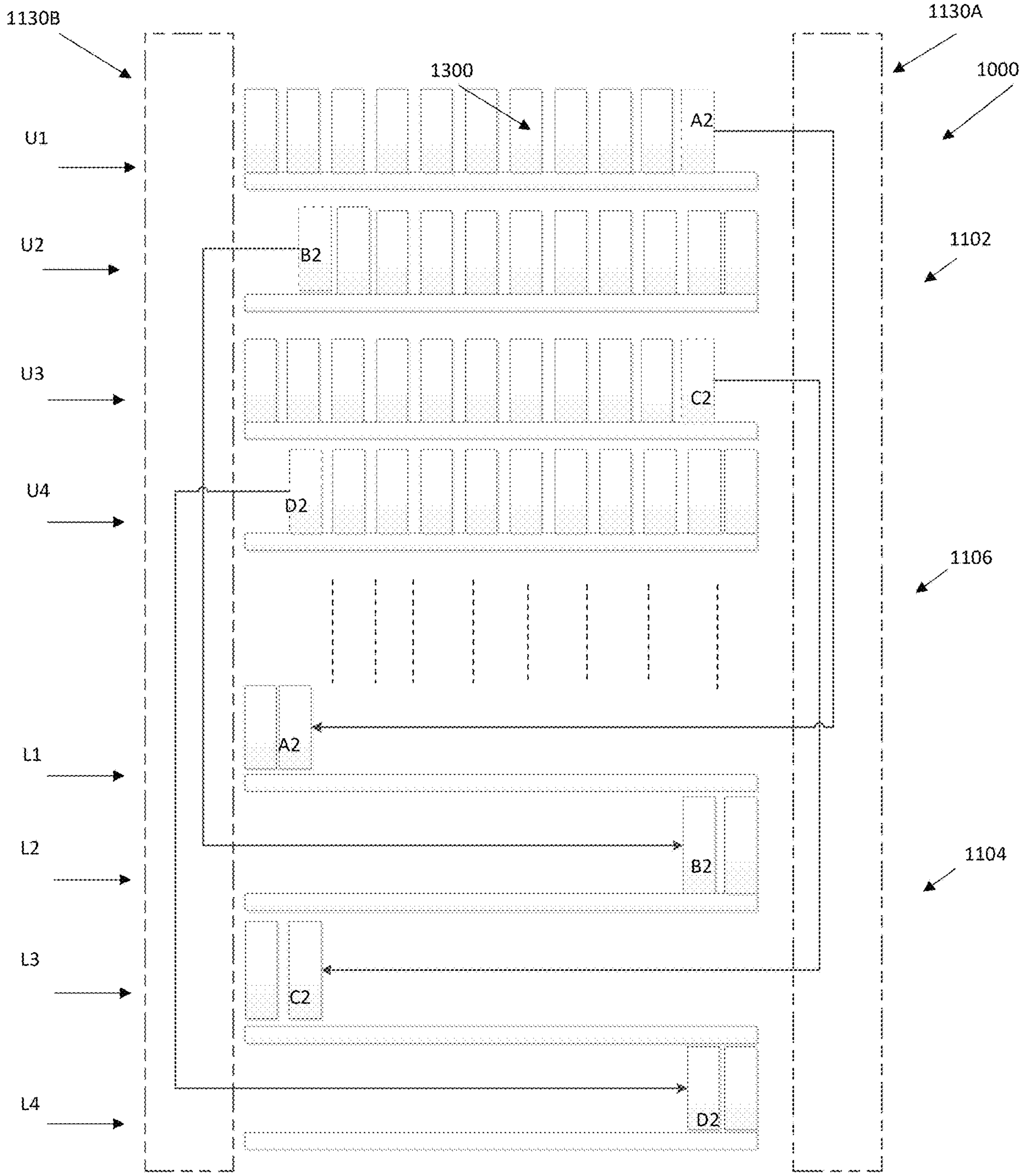
Figure 33D:
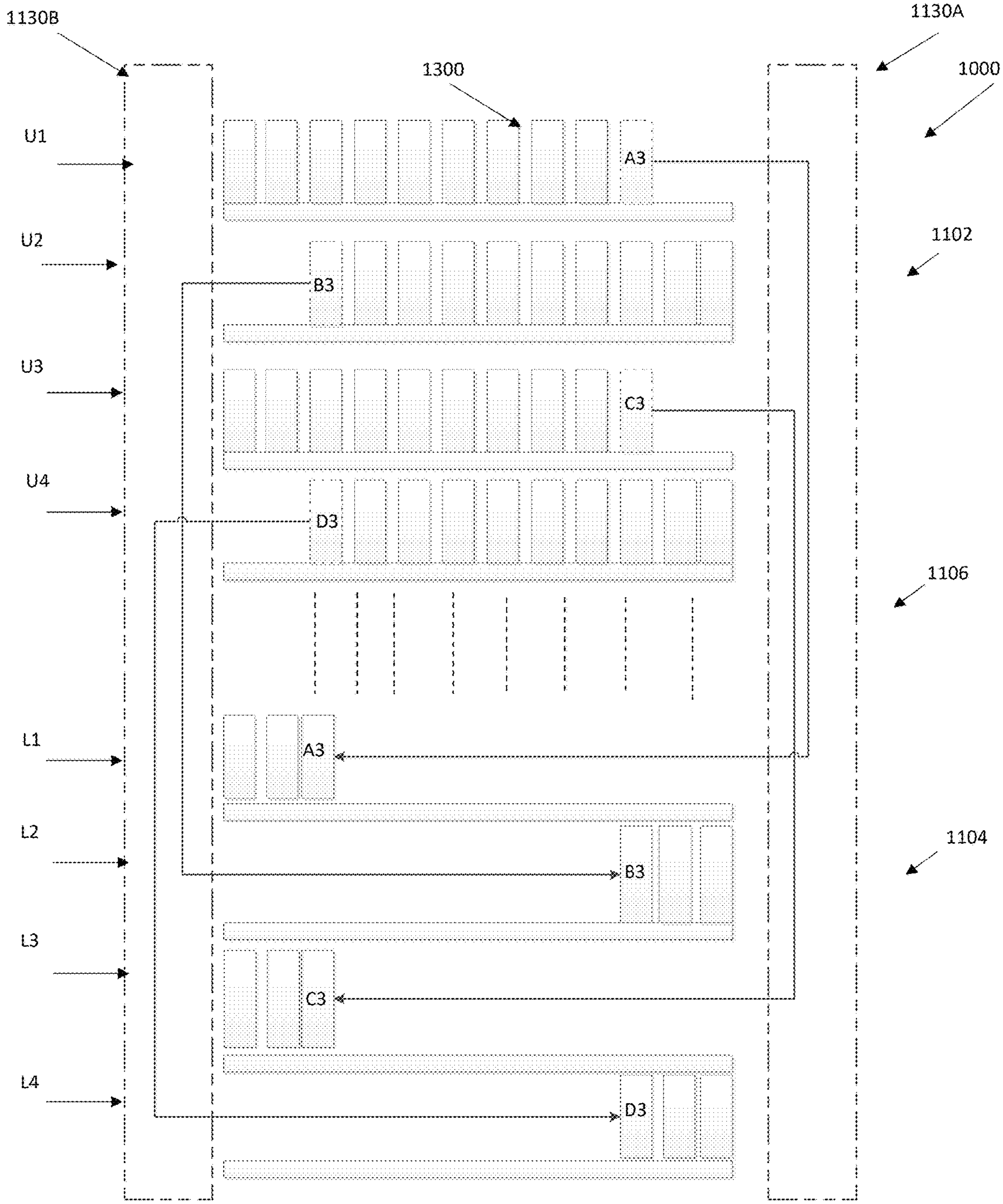

FIGS. 33A-33D illustrate a process for moving the blocks 1300 from the upper section 1102 to the lower section 1104 via the elevator shafts 1130A, 1130B (e.g., with the elevator cage assembly 1400) to generate electricity. As shown in FIG. 33B, block A1 is moved via the elevator shaft 1130A from one end of row U1 to row L1 and moved to the opposite end of row L1. Similarly, block B1 is moved via the elevator shaft 1130B from one end of row U2 to row L2 and moved to the opposite end of row L2. Once block A1 has been delivered to row L1 as described above, the elevator cage in elevator shaft 1130A returns to the next row U3 in the upper section 1102 and moves block C1 via the elevator shaft 1130A to its corresponding row L3 in the lower section 1104, and moves the block C1 to the opposite end of the row L3. Similarly, once block B1 has been delivered to row L2 as described above, the elevator cage in elevator shaft 1130B returns to the next row U4 in the upper section 1102 and moves block D1 via the elevator shaft 1130B to its corresponding row L4 in the lower section 1104, and moves the block D1 to the opposite end of the row L4. The process can continue in this fashion for the remaining rows in the upper section 1102 (e.g., for rows U5 to U8 in FIG. 31). With continued reference to FIGS. 33B, once a block 1300 has been lowered from each row (e.g., U1-U4) in the upper section 1102 to its corresponding row (e.g., L1-L4) in the lower section 1104, the elevator cage assembly 1400, 1400' in the respective elevator shafts 1130A, 1130B again perform the same steps described above to move the next block (e.g., A2-D2) in the rows (U1-U4) in the upper section 1102 to their corresponding rows (L1-L4) in the lower section, as shown in FIG. 33C. Similarly, once the second block 1300 has been lowered from each row (e.g., U1-U4) in the upper section 1102 to its corresponding row (e.g., L1-L4) in the lower section 1104, the elevator cage assemblies 1400, 1400' in the respective elevator shafts 1130A, 1130B again perform the same steps described above to move the next block (e.g., A3-D3) in the rows (U1-U4) in the upper section 1102 to their corresponding rows (L1-L4) in the lower section, as shown in FIG. 33D and so on. Because the elevator cage assembly 1400, 1400' travels much faster vertically along the elevator shafts 1130A, 1130B than the trolley(s) 1200 travel horizontally along the rows 1140 (e.g., U1-U4 and/or L1-L4), the sequence described above advantageously gives the trolley 1200 sufficient time to travel along the row 1140 to pick-up another block 1300 and move it proximate the elevator shaft 1130A, 1130B by the time the elevator cage assembly 1400, 1400' travels to the same row, thereby allowing the system 1000 to operate efficiently. The process described above advantageously allows the load on the foundation (e.g., average load) and/or the distribution of load (e.g., average load) on the ground (e.g., foundation) of the frame or tower 1100 remains substantially constant.

The block 1300 can optionally weigh between approximately 20 tons and 50 tons, such as approximately 30 tons (e.g., 30 metric tons). However, in other examples, the block 1300 can weigh other suitable amounts.

The block 1300 can include a ballast mass (e.g., load-bearing filler material), for example enclosed in the shell. In one example, the ballast mass is of a different material than the material of the shell. For example, the ballast mass or load-bearing filler material can be soil, coal, fly ash, debris, demolition material, gravel, building waste and/or recycled material mixed with and/or pressed with low-grade or inexpensive concrete, as discussed below. This advantageously reduces the cost of manufacturing the block 1300 and provides a mechanism for dispensing of material (e.g., demolition material, building waste, debris, etc.) that would otherwise be sent to a landfill. In another example, the ballast mass and shell are of the same material (e.g., define a monolithic or single mass without any boundaries or seams). Advantageously, the block 1300 can be manufactured with materials available near the location of the system 1000, 1000', 1000". Optionally, the block 1300 can be reinforced (e.g., with steel), such as with one or more reinforcement layers of mesh steel or rebar (e.g., structural steel).

The block 1300 can optionally be made at least in part of concrete (e.g., the shell of the block 1300 can be made of concrete). Advantageously, because concrete has a higher density than water, the volume of the block 1300 can store more potential energy than a corresponding volume of water. In one example, at least a portion of the block 1300 can be made of low grade concrete (e.g., having a compression strength lower than 10 MPa, such as 3-8 MPa).

The energy storage and delivery system 1000, 1000', 1000" is operable to convert electrical energy or electricity into potential energy for storage by lifting (e.g., vertically lifting) the blocks 1300 from a lower elevation to a higher elevation, and to convert potential energy into electrical energy or electricity by moving (e.g., vertically moving, vertically lowering) one or more of the blocks 1300 from a higher elevation to a lower elevation via gravity.

The electric motor-generator 1500 (see FIG. 25, or 2500 in FIG. 29) can operate the elevator cage assembly 1400, 1400', to lift (e.g., vertically lift) one or more of the blocks 1300 from a lower elevation and place the blocks 1300 at a higher elevation Each of the blocks 1300 at the higher elevation stores an amount of potential energy corresponding to (e.g., proportional to) its mass and height differential between the lower elevation and the higher elevation of the block 1300 (e.g., potential energy=mass×gravity×height above reference surface, such as ground level). The heavier the blocks 1300 and the higher they are raised, the more potential energy can be stored.

To convert the stored potential energy to electricity, the elevator cage assembly 1400 can move one or more of the blocks 1300 from a higher elevation to a lower elevation (e.g., vertically lower at least partially under the force of gravity) to drive the electric motor-generator 1500 in FIG. 25 (or 2500 in FIG. 29) via one or more cables or steel ribbons to generate electricity, which can be delivered to a power grid to which the motor-generator 1500 (or 2500 in FIG. 29) is electrically connected. Power in the form of electricity is generated each time a block 1300 is lowered.

Figure 34:
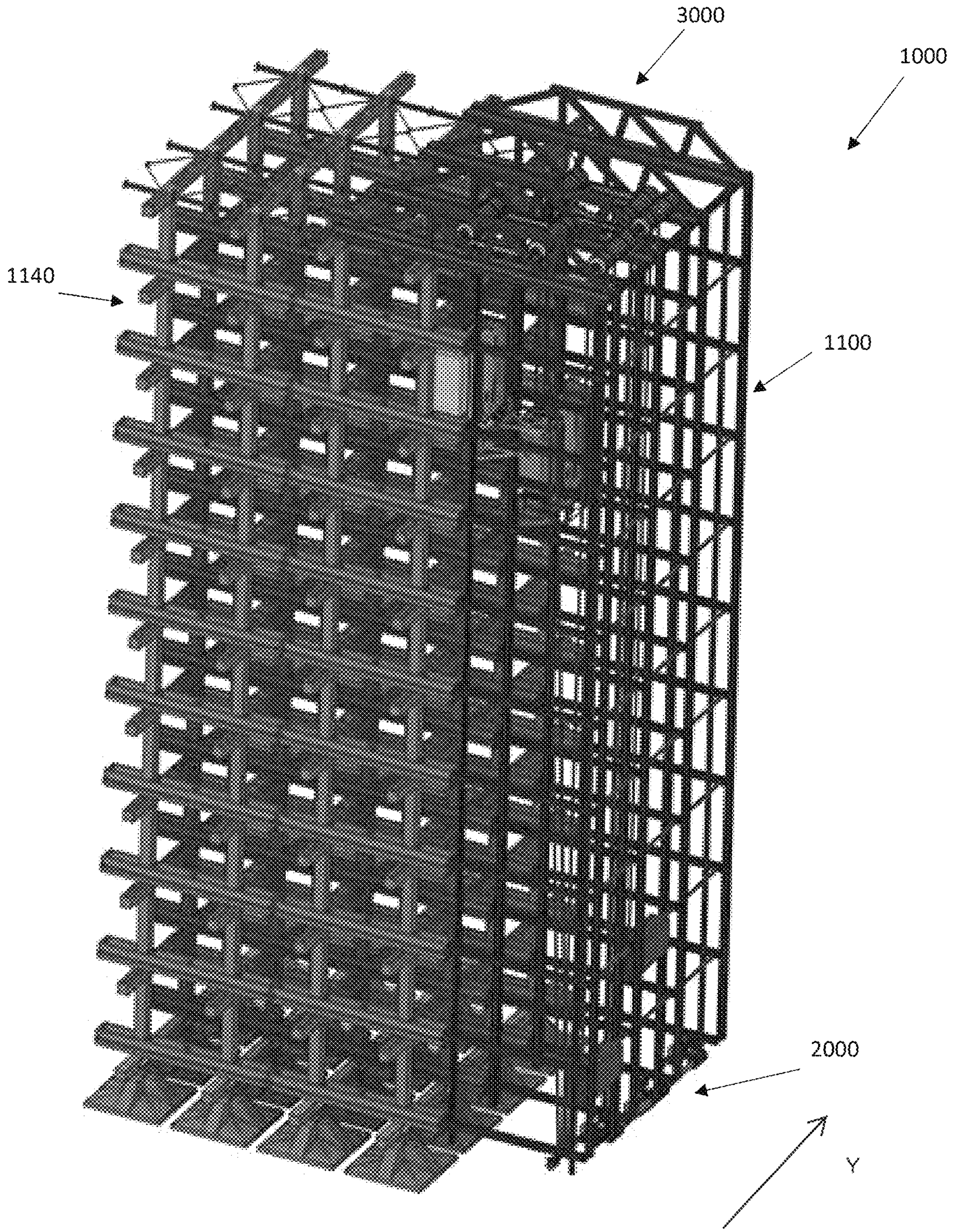
FIG. 34 is a schematic perspective view of an energy storage and delivery system for storing energy and generating electricity.
Figure 35:
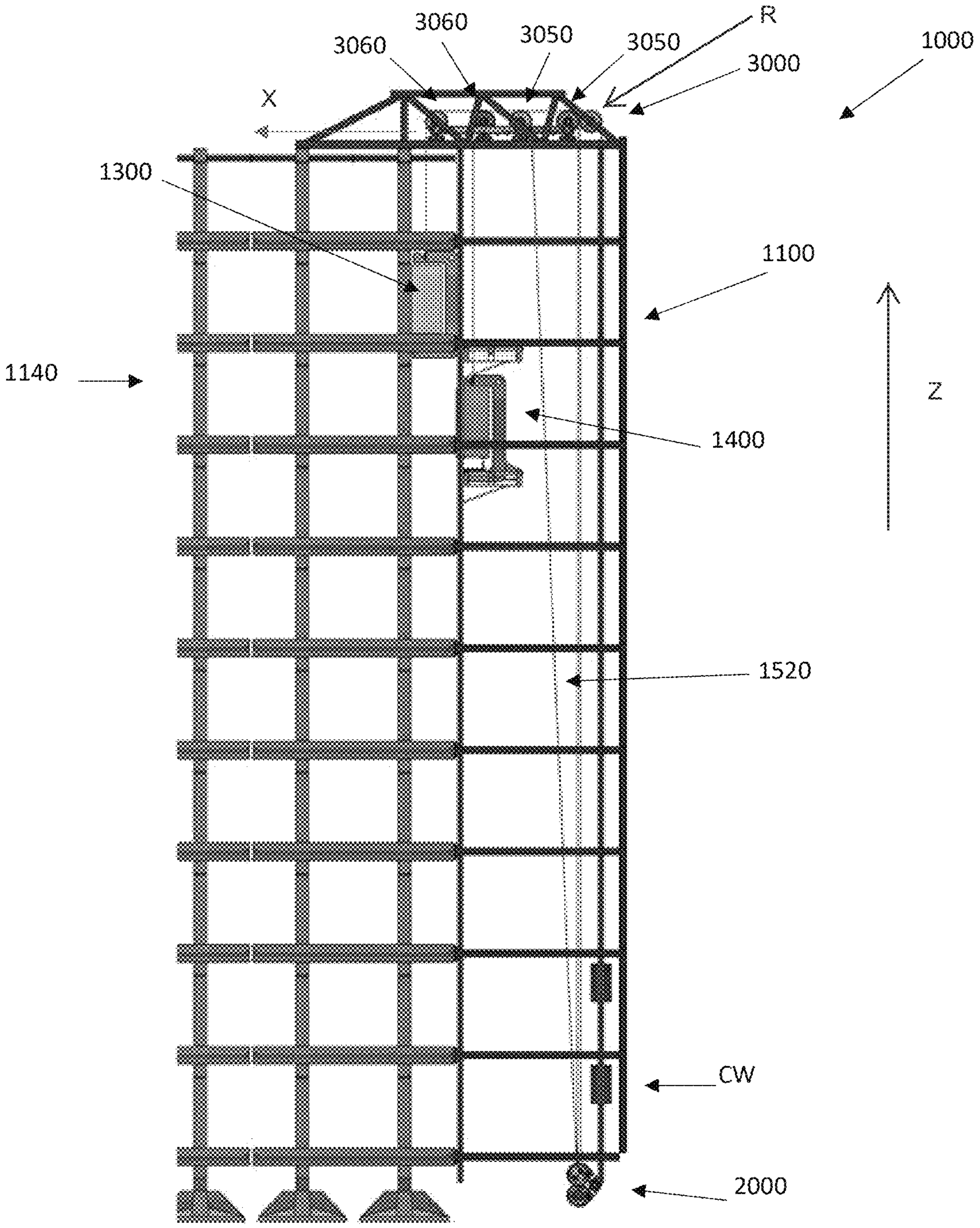
FIG. 35 is a schematic side view of the energy storage and delivery system of FIG. 34.

FIGS. 34-35 show another implementation of the energy storage and delivery system 1000 for moving blocks 1300 (e.g., in a Z or vertical direction) between different rows or floors 1140 with the elevator cage assembly 1400, 1400'. In the illustrated implementation, a trolley 3000 is disposed on top of the frame or tower 1100 and moves laterally (e.g., in an X or horizontal direction), as further discussed below. The elevator cage assembly 1400, 1400' is connected to one or more cables or ribbons 1520 that extend from the elevator cage assembly 1400, 1400', over rollers 3050, 3060 of the trolley 3000 and toward the lift drive system 2000. The cable(s) or ribbon(s) 1520 extend over one or more rollers or pulleys of the lift drive system 2000 toward and over a roller R at the top of the tower 1100 and then extend down to the counterweight CW. As discussed above, the elevator cage assembly 1400, 1400' can have an elevator cage 1410, 1410' that moves laterally relative to the base 1420, 1420' (e.g., to pick up a block 1300 from a floor 1140 or deliver a block 1300 to a floor 1140). The elevator cage assembly 1400, 1400' moves up and down along the tower 1100 via a lift drive system 2000 (see FIGS. 29-30) that moves (e.g., translates) the cable(s) or ribbon(s) 1520 (e.g., to cause the raising of the elevator cage assembly 1400, 1400' and the lowering of the counterweight CW or to cause the lowering of the elevator cage assembly 1400, 1400' and the raising of the counterweight CW). As discussed previously, and as shown in FIG. 34, the tower 1100 can have multiple modules in the Y or depth direction, each module having an elevator cage assembly 1400, 1400' that moves blocks 1300 between the floors 1140 of that module, and each module having a trolley 3000 over which one or more cables or ribbons 1520 extend and connect to the lift drive system 2000 and the counterweight CW associated with the elevator cage assembly 1400, 1400'. FIG. 35 shows two elevator cage assemblies 1400, 1400' in different modules, each connected to a separate associated counterweight CW, with their associated cable(s) or ribbon(s) 1520 extending over a separate associated trolley 3000 and toward the lift drive system 2000.

Figure 36A:
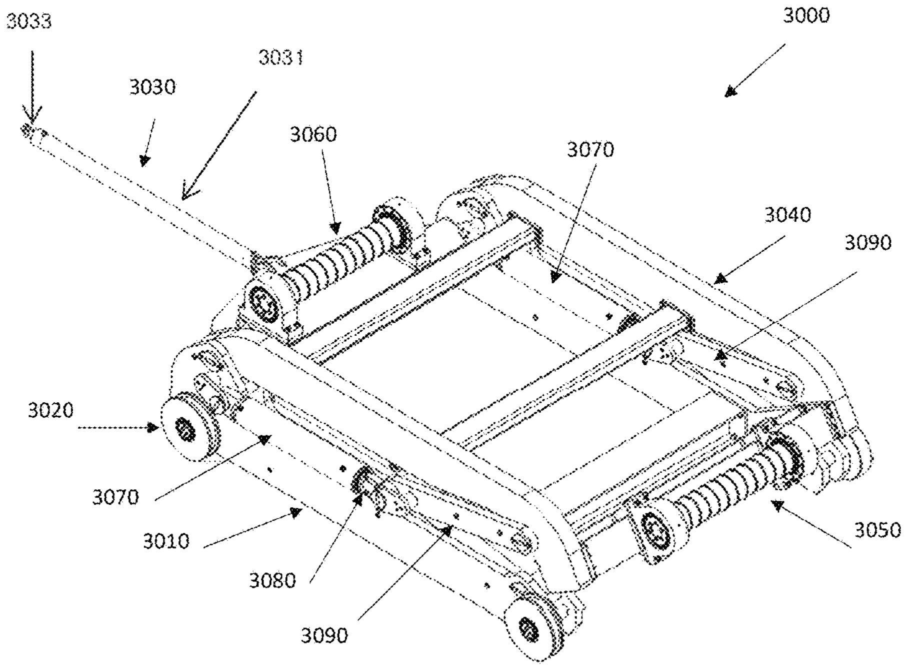
FIG. 36A is a schematic perspective view of a trolley for use in the energy storage and delivery system of FIGS. 34-35, the trolley in a first operating position.
Figure 36B:
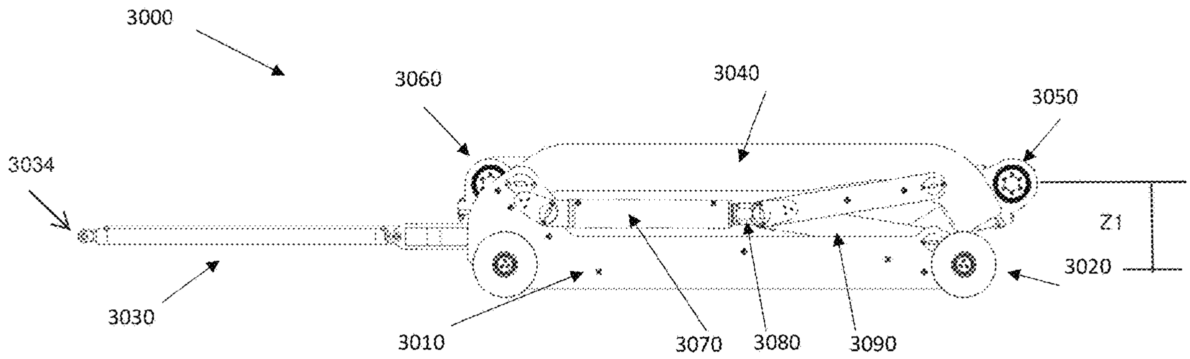
FIG. 36B is a schematic side view of the trolley in FIG. 36A.
Figure 36C:
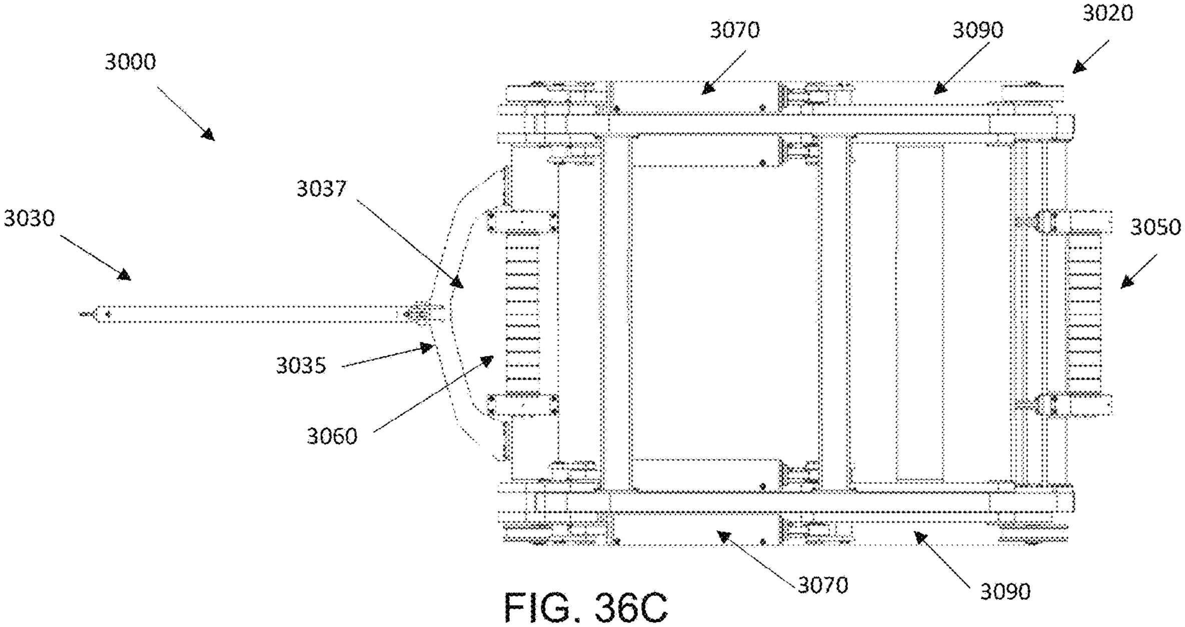
FIG. 36C is a top view of the trolley in FIG. 36A.
Figure 37A:
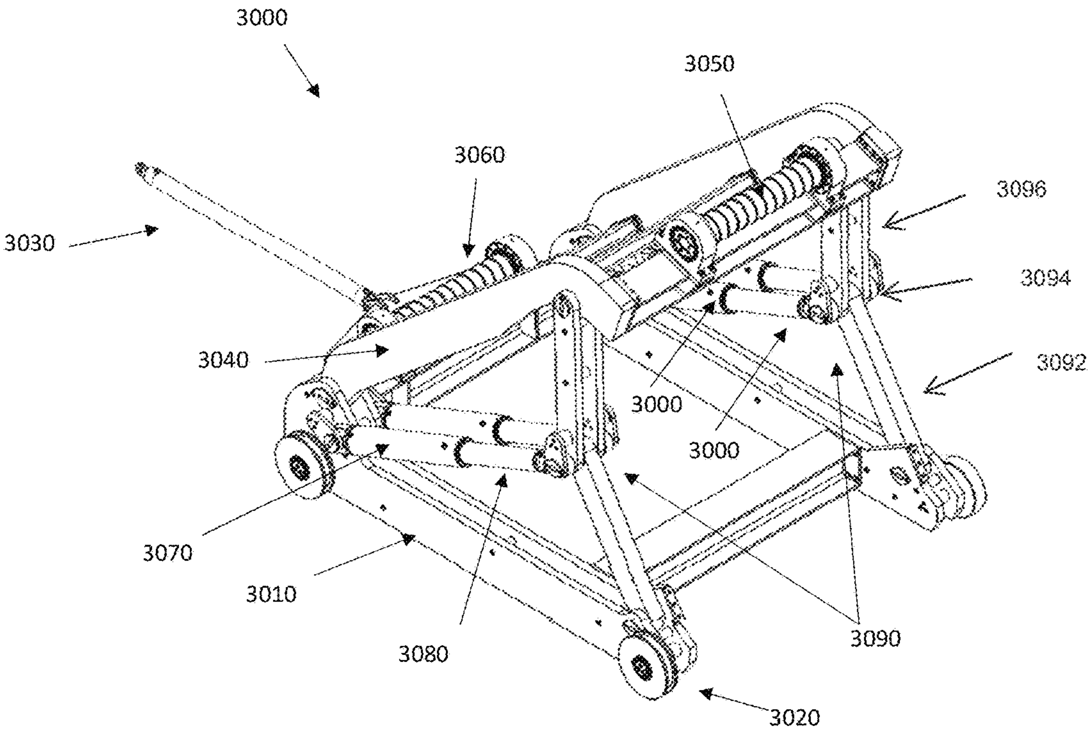
FIG. 37A is a schematic perspective view of a trolley for use in the energy storage and delivery system of FIGS. 34-35, the trolley in a second operating position.
Figure 37B:
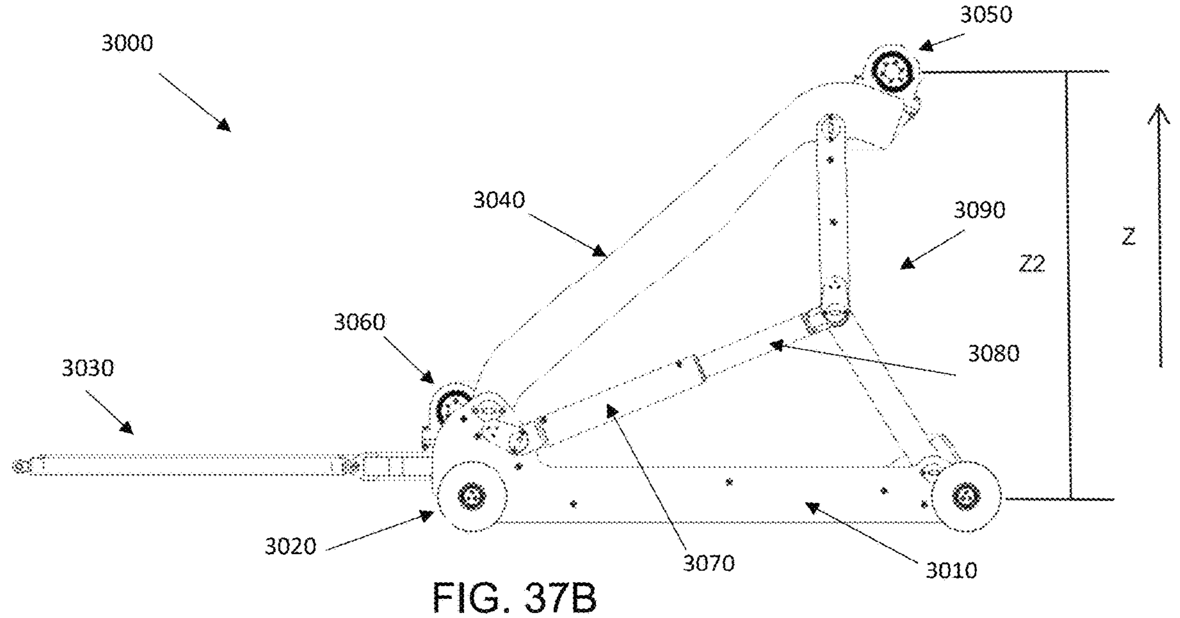
FIG. 37B is a schematic side view of the trolley in FIG. 37A.
Figure 37C:
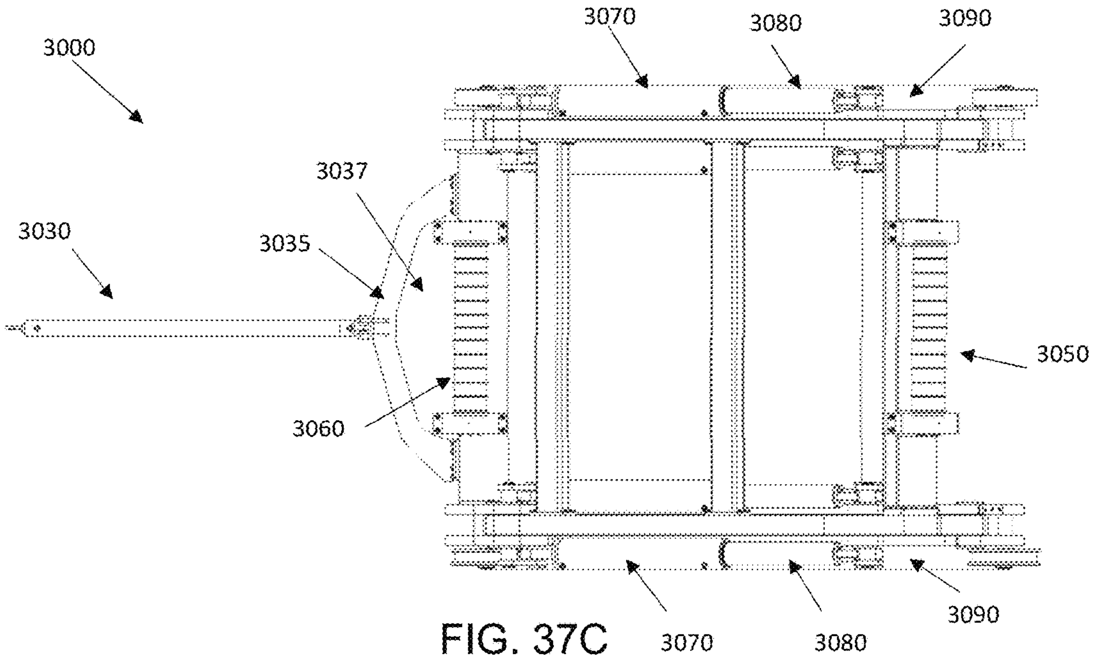
FIG. 37C is a top view of the trolley in FIG. 37A.

FIGS. 36A-37C show different views of the trolley 3000, with FIGS. 36A-36C showing the trolley 3000 in a first position (e.g., a collapsed position, a compact position) and FIGS. 37A-37C showing the trolley 3000 in a second position (e.g., an extended position, an expanded position).

The trolley 3000 has a base 3010 and one or more (e.g. four) wheels 3020 attached to the base 3010 that allow the trolley 3000 to move over the top of the frame or tower 1100. For example, the wheels 3020 can engage rails on top of the frame or tower 1100, allowing the trolley 3000 to move laterally along the X direction (see FIG. 35). The trolley 3000 also has a piston-cylinder assembly 3030 that couples to the base 3010 via a yoke 3035. The piston-cylinder assembly 3030 can be a hydraulic assembly that allows a piston 3033 to move within a cylinder 3031 of the piston-cylinder assembly 3030 to move base 3010 and therefore the trolley 3000 along the top of the tower 1100.

The piston 3033 can move relative to the cylinder 3031 between an extended position where the piston is extended outside the cylinder 3031 and a retracted position where the piston 3033 is disposed in the cylinder 3031. As discussed above, the piston-cylinder assembly 3030 can be a hydraulic system, so delivering a hydraulic fluid into the cylinder 3031 on one side of a head of the piston 3033 can cause the piston 3033 to move relative to the cylinder 3031 in one direction, and delivering the hydraulic fluid into the cylinder 3031 on another side of a head of the piston 3033 can cause the piston 3033 to move relative to the cylinder 3031 in an opposite direction.

In one implementation an end 3034 (see FIG. 36B) of the piston 3033 can be fixed (e.g., in a fixed location), so that when the piston 3033 moves relative to the cylinder 3031 toward the extended position, the base 3010 moves away from the end 3034 (e.g., toward the right in FIG. 36B), and when the piston 3033 moves relative to the cylinder 3031 toward the retracted position, the base 3010 moves toward the end 3034 (e.g., toward the left and to the position shown in FIG. 36B). Therefore, the trolley 3000 can be moved along the X direction (see FIG. 35) so that the cable(s) or ribbon(s) 1520 between the trolley 3000 and its associated elevator cage assembly 1400, 1400' advantageously remains substantially vertical, whether the elevator cage 1410, 1410' is extended relative to the base 1420, 1420' to pick-up or drop-off a block 1300 or whether the elevator cage 1410, 1410' is retracted relative to the base 1420, 1420' and the elevator cage assembly 1400, 1400' is ready to lift or lower the block 1300 (e.g., to a different floor 1140). Maintaining the cable(s) or ribbon(s) 1520 between the trolley 3000 and its associated elevator cage assembly 1400, 1400' substantially vertical advantageously reduces forces, torques and/or stresses on the elevator cage assembly 1400, 1400' and cable(s) or ribbon(s) 1520 attached thereto that may inhibit (e.g., prevent) wear and tear on these components, reducing the maintenance needs on them.

The trolley 3000 also includes a frame 3040 (e.g., a lever frame) that is pivotally coupled to the base 3010 at one end of the frame 3040. A rear roller 3050 is coupled to the frame 3040 and a front roller 3060 is coupled to the base 3010. The cable(s) or ribbon(s) 1520 extend over the rear roller 3050 and the front roller 3060 and through an opening 3037 between the yoke 3035 and the base 3010 toward the elevator cage assembly 1400, 1400'.

The trolley 3000 has one or more cylinders 3070 and one or more pistons 3080 that move within the one or more cylinders 3070. The one or more cylinders 3070 are coupled to the base 3010 at one end, with the one or more pistons 3080 extending out of an opposite end of the one or more cylinders 3070. The one or more cylinders 3070 and one or more pistons 3080 provide a piston-cylinder assembly (e.g., a hydraulic piston-cylinder assembly). The portion of the one or more pistons 3080 that extends out of the corresponding one or more cylinders 3070 couple to a lever arm 3090 that couples to a rear portion of the frame 3040 and a rear portion of the base 3010 (e.g., via brackets). The lever arm 3090 can be a scissor-type lever arm, with a pair of members that connect to each other at a pivot joint 3094 (see FIG. 37A), where the lever arm 3090 can move between a collapsed configuration (see FIGS. 36A-36C) and an extended configuration (see FIGS. 37A-37C). The one or more pistons 3080 couples to the lever arm 3090 at the pivot joint 3094 (best shown in FIGS. 36B and 37B).

As best shown in FIG. 37A, in one implementation the one or more cylinders 3070 are four cylinders 3070, two on one side of the trolley 3000 and two on an opposite side of the trolley 3000, and the one or more pistons 3080 are four pistons 3080, each associated with one of the four cylinders 3070. The lever arm 3090 has a first arm 3092 that extends between the base 3010 and the pivot joint 3094 and a second arm 3096 that extends between the frame 3040 and the pivot joint 3094. In one implementation, the second arm 3096 can have a slot or opening (or include two spaced apart rods) that allow the first arm 3092 to nest within the slot or opening (or between the two spaced apart rods) of the second arm 3096.

With reference to FIGS. 36B and 37B, in the collapsed or compact position (see FIG. 36B), the frame 3040 is adjacent the base 3010 so that the rear roller 3050 is closer to the base 3010 (e.g., so the one or more cylinders 3070 extend generally horizontally, the first arm 3092 is nested relative to the second arm 3096, and so the rear roller 3050 is in the minimum vertical or Z1 position relative to the base 3010). In the extended or expanded position (see FIG. 37B), the frame 3040 extends at an angle (e.g., acute angle) relative to the base 3010 so that the rear roller 3050 is father apart from the base 3010 (e.g., so the one or more cylinders 3070 extend at an angle, the first arm 3092 is extended relative to the second arm 3096, and so that the rear roller 3050 is in the maximum vertical or Z2 position relative to the base 3010).

In one implementation, the difference between the maximum vertical or Z2 position of the rear roller 3050 and the minimum vertical or Z1 position of the rear roller 3050 is at least as much as the elongation amount of the cable(s) or ribbon(s) 1520 that extend over the rear roller 3050 and front roller 3060 when the elevator cage assembly 1400, 1400' is carrying a load (e.g., carrying a block 1300). In one implementation, the cable(s) or ribbon(s) 1520 can elongate or stretch about 1% to about 1.5% when the elevator cage assembly 1400, 1400' is carrying a block 1300. For example, if the cable(s) or ribbon(s) 1520 have a length of 100 m between the counterweight CW and the elevator cage assembly 1400, 1400', the cable(s) or ribbon(s) 1520 can elongate or stretch 1 m to 1.5 m when the elevator cage assembly 1400, 1400' is carrying a block 1300. Therefore, when the trolley 3000 is in the extended or expanded position (see FIGS. 37A-37C), the vertical distance (e.g. Z2) between the base 3010 and the rear roller 3050 can be at least about 1 m (e.g., 1.01 m) if the cable(s) or ribbon(s) have an elongation or stretch of 1% of its length or about 1.5 m (e.g., 1.51 m) if the cable(s) or ribbon(s) have an elongation or stretch of 1.5% of its length.

Advantageously, by actuating the one or more pistons 3080 to move relative to the one or more cylinders 3070 to move the trolley 3000 to the extended or expanded position (see FIG. 37B), the trolley 3000 can account for the elongation or stretching of the cable(s) or ribbon(s) 1520 and therefore facilitate the lifting of a block 1300 by the elevator cage assembly 1400, 1400' without wasting the energy expended to account for the elongation of the cable(s) or ribbons 1520. In one implementation, the trolley 3000 can be moved to the extended or expanded position (see FIG. 37B), as further discussed below, before the elevator cage 1410, 1410' picks-up the block 1300. For example, the elevator cage 1410, 1410' can be moved into position under the block 1300 (e.g., by extending the elevator cage 1410, 1410' relative to the base 1420, 1420') and the trolley 3000 then moved to the extended or expanded position (see FIG. 37B). This causes the rear roller 3050 to be moved vertically to the Z2 position to take up the elongation of the cable(s) or ribbon(s) 1520, which allows the one or more supports 1430, 1430' of the elevator cage 1410, 1410' to engage and lift the block 1300 (e.g., about 1 cm) off the floor 1140. The trolley 3000 remains in the extended or expanded position while the elevator cage assembly 1400, 1400' moves the block 1300 (e.g., to another floor 1140) and once the block 1300 is over the desired floor 1140 (e.g., by extending the elevator cage 1410, 1410' relative to the base 1420, 1420'), the trolley 3000 can be moved to the collapsed or compact position (see FIG. 36B), allowing the elevator cage 1410, 1410' to lower the block 1300 onto the floor 1140 and the cable(s) or ribbon(s) 1520 to move to the unstretched or unelongated position. The trolley 3000 can remain in the collapsed or compact position while it is empty (e.g., while it does not carry a block 1300) and travels to another floor 1140 to pick-up another block 1300, at which point the trolley 3000 can be moved to the extended or expanded position prior to picking up the block as described above. Advantageously, the operation of the trolley 3000 between the collapsed and extended positions allows all the hydraulics for lifting the block 1300 to be associated with the trolley 3000 rather than the elevator cage assembly 1400, 1400', which simplifies the operation and complexity of the elevator cage assembly 1400, 1400'. For example, operation of the trolley 3000 as discussed above to lift the block 1300 allows the elevator cage assembly 1400, 1400' to be free of hydraulics (e.g., the one or more supports 1430, 1430' are not hydraulically actuated and instead are at a fixed mechanical height).

Figure 38:
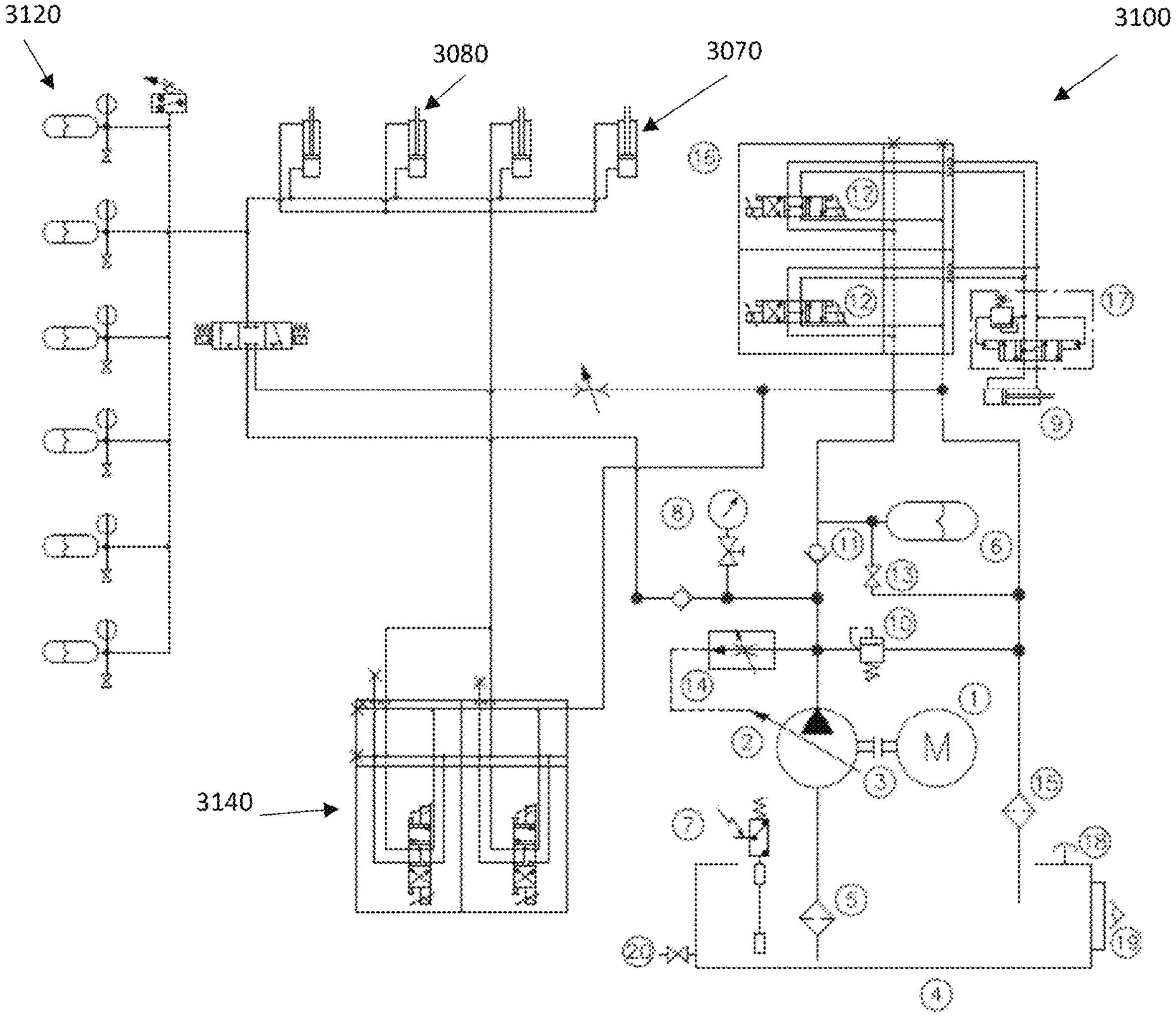
FIG. 38 is a schematic view of a hydraulic circuit for the operation of the trolley of FIGS. 36A-37C.
Figure 39:
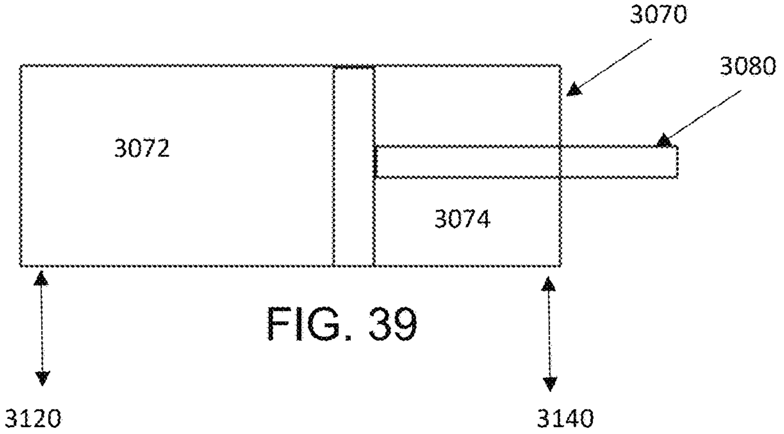
FIG. 39 is a schematic view of a hydraulic piston and cylinder used in the trolley of FIGS. 36A-37C.

FIG. 38 shows a schematic diagram of a hydraulic circuit 3100 (e.g., hydraulic system) used to operate the trolley 3000, for example between the first position (e.g., collapsed position, compact position) shown in FIGS. 36A-36C and the second position (e.g., extended position, expanded position shown in FIGS. 37A-37C). FIG. 39 shows a schematic view of one of the one or more cylinders 3070 and its associated piston 3080 that moves relative to the cylinder 3070. The lever arm 3090 would connect to the end of the piston 3080 shown in FIG. 39. The cylinder 3070 has a first chamber 3072 on one side of the head of the piston 3080 and has a second chamber 3074 on an opposite side of the head of the piston 3080. One or more accumulators 3120 (e.g., multiple hydraulic accumulators) of the hydraulic circuit 3100 are in fluid communication (e.g., via a hydraulic line and connector) to the first chamber 3072 of each of the one or more cylinders 3070. The one or more accumulators 3120 are selectively actuatable to allow flow of hydraulic fluid from the one or more accumulators 3120 to the first chamber 3072 of the one or more cylinders 3070 to move the trolley 3000 toward the second position (e.g. expanded position, extended position) by increasing the pressure in the first chamber 3072 that drives the piston 3080 out of the cylinder 3070 (e.g., toward the right in FIG. 39), which in turn moves the lever arm 3090 to the extended position (see FIG. 37B).

One or more valves 3140 of the hydraulic circuit 3100 (e.g., proportional valves) are in fluid communication (e.g., via a hydraulic line and connector) to the second chamber 3074 of the one or more cylinders 3070. The hydraulic circuit 3100 has an electric motor 1 that drives a pump 2 to pump hydraulic fluid through the hydraulic circuit 3100. The one or more valves 3140 (e.g., proportional valves) are selectively actuatable to allow hydraulic fluid to flow into the second chamber 3074 of each of the one or more cylinders 3070 to move the trolley 3000 toward the first position (e.g. collapsed position, compact position) by increasing the pressure in the second chamber 3074 that drives the piston 3080 into the cylinder 3070 (e.g., toward the left in FIG. 39), which moves the lever arm 3090 to the collapsed or compact position (see FIG. 36B).

With continue reference to FIGS. 38-39, the trolley 3000 motion between the extended position (see FIG. 37B) an the collapsed position (see FIG. 36B) advantageously allows the recovery of a significant portion (e.g. most) of the energy expended in taking up the elongation or stretching of the cable(s) or ribbon(s) 1520, allowing such energy to not be wasted. During use, while the trolley 3000 is in the collapsed or compact position (see FIG. 36B), the first chamber 3072 is at maximum pressure (e.g., 200 bar) due to the pressure of the one or more accumulators 3120 that are in fluid communication with the first chamber 3072, and there is zero force being applied on the lever arm 3090 because the lever arm 3090 is in the collapsed state. To move the trolley 3000 from the collapsed or compact position (see FIG. 36B) to the extended or expanded position (see FIG. 37B), the one or more valves 3140 (e.g., proportional valves) are opened to allow fluid flow out of the second chamber 3074, allowing the pressure in the first chamber 3072 (e.g., from the one or more accumulators 3120) to push the piston 3080 out of the cylinder 3070 and apply a force on the pivot joint 3094 to extend the lever arm 3090 to the extended position (see FIG. 37B). In the extended position (see FIG. 37B), the lever arm 3090 is applying maximum force on the frame 3040 to lift the rear roller 3050 (and therefore the cable(s) or ribbon(s) 1520 thereon) and the pressure in the first chamber 3072 (from the one or more accumulators 3120) has decreased (e.g., to a minimum pressure).

To move the trolley 3000 from the extended or expanded position (see FIG. 37B) to the collapsed or compact position (see FIG. 36B), the one or more valves 3140 are actuated to flow an amount of hydraulic fluid into the second chamber 3074 to apply a force on the head of the piston 3080 to move it into the one or more cylinders 3070. Advantageously, the one or more valves 3140 only need to supply a small amount of hydraulic fluid into the second chamber 3074 so that the pressure in the second chamber 3074 applies an amount of energy to account for the losses during operation of the trolley 3000 and overcomes the pressure in the first chamber 3072. As the piston 3080 moves into the cylinder 3070, the weight on the lever arm 3090 from the cable(s) or ribbon(s) carrying a load (e.g., the block 1300 carried by the elevator cage assembly 1400, 1400') applies a vertical force that causes the lever arm 3090 to move to the collapsed or compact configuration, which pushes the piston 3080 into the cylinder 3070, increasing the pressure in the first chamber 3072, which is transferred to the one or more accumulators 3120 to charge the accumulators. Therefore, the introduction of a small amount of hydraulic fluid by the one or more valves 3140 into the second chamber 3074 results in the flow of a lot more hydraulic fluid from the first chamber 3072 into the one or more accumulators 3120 to charge the accumulators 3120. Once the trolley 3000 is to be moved to the extended or expanded position, the one or more valves 3140 can again be operated to allow flow out of the second chamber 3074 in the manner described above.

Advantageously, the trolley 3000 provides a lifting mechanism actuatable to lift the block 1300. The trolley 3000 also provides an elastic energy recovery system for recovering a portion of the energy associated with the elongation or stretching of the cable(s) or ribbon(s) 1520.

Figure 40:
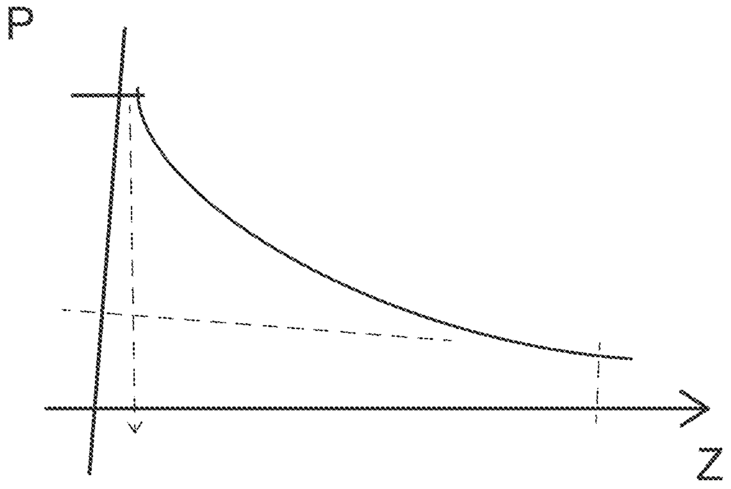
FIG. 40 is a graph of pressure in an accumulator of the hydraulic circuit in FIG. 38 versus displacement in a vertical (Z) direction of a ribbon or cable of the system in FIGS. 34-35.

FIG. 40 shows a schematic graph of pressure (P) of the accumulator relative to vertical position (Z) of the rear roller 3050 of the trolley 3000. When the trolley 3000 is in the collapsed or compact position (see FIG. 36B), the pressure (P) of the accumulator (e.g., one or more accumulators 3120) is at a maximum. As the trolley 3000 moves to the extended or expanded position (e.g., to position Z2), the pressure (P) decreases to a lower (e.g., minimum) pressure.

Figure 41:
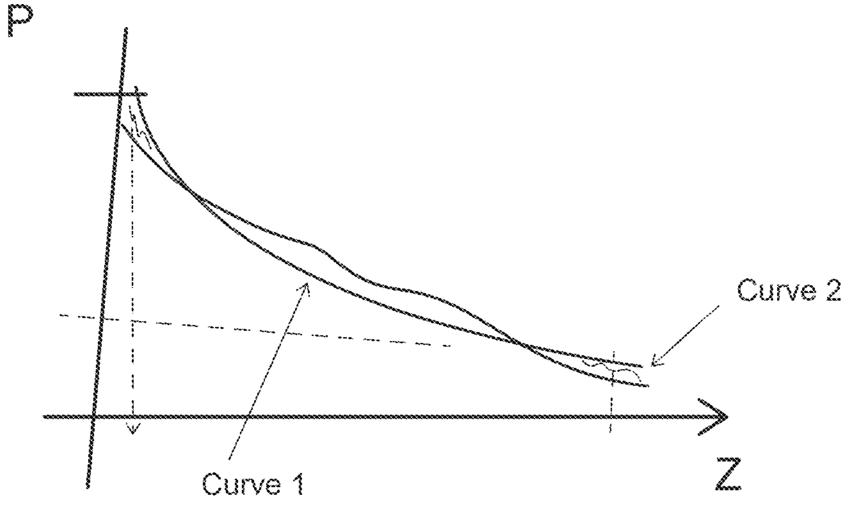
FIG. 41 is a graph of pressure in an accumulator of the hydraulic circuit in FIG. 38 and actual pressure in the cylinder of the trolley versus displacement in a vertical (Z) direction of a ribbon or cable of the system in FIGS. 34-35.

FIG. 41 shows a schematic graph of the pressure (P) of the accumulator (curve 1) relative to the vertical position (Z) of the rear roller 3050 of the trolley 3000, as well as the pressure in the first chamber 3072 of the cylinder 3070 (curve 2). The difference in pressure between the accumulator (curve 1) and the pressure in the first chamber 3072 (curve 2) when the pressure (P) is at a minimum (e.g., when the trolley 3000 is in the extended position) is the loss that the one or more valves 3140 accounts for by supplying hydraulic fluid to the second chamber 3074 to start moving the trolley 3000 to the collapsed or compact position.

Advantageously, the energy storage and delivery system 1000, 1000', 1000" can, for example, store electricity generated from solar power as potential energy in the raised blocks 1300 during daytime hours when solar power is available, and can convert the potential energy in the blocks 1300 into electricity during nighttime hours when solar energy is not available by lowering one or more blocks 1300 and deliver the converted electricity to the power grid.

Described herein are examples of an energy storage and delivery system (e.g., the energy storage and delivery system 1000, 1000', 1000") operable to convert electrical energy or electricity into potential energy for storage, and to convert potential energy into electrical energy or electricity, for example, for delivery to an electrical grid. Advantageously, the energy storage system requires little to no maintenance, and can operate decades (e.g., 30-50 years) with substantially no reduction in energy storage capacity.

In some implementations, the energy storage system described herein can store approximately 10 megawatts-hour (MWh) or more of energy (e.g., between 10 MWh and 100 MWh, such as 15 MWh, 20 MWh, 30 MWh, 50 MWh, 80 MWh, 90 MWh) and deliver approximately 10 MWh or more of energy (e.g., between 10 MWh and 100 MWh, such as 15 MWh, 20 MWh, 30 MWh, 50 MWh, 80 MWh, 90 MWh) to the electrical grid. The energy storage system described herein can deliver energy each hour (e.g., 1 MW up to 6 MW or more). However, in other implementations the energy storage and delivery system described herein can have other suitable energy storage and delivery capacities (e.g., 1 MWh, 3 MWh, 5 MWh, etc.). In one implementation, the energy storage and delivery system can optionally power approximately 1000 homes or more for a day.

The energy storage and delivery system described herein can advantageously be connected to a renewable energy (e.g., green energy) power generation system, such as, for example, a solar power energy system, a wind energy power system (e.g., wind turbines), etc. Advantageously, during operation of the renewable energy power generation system (e.g., operation of the solar energy system during daylight hours, operation of the wind power system during windy conditions), the energy storage and delivery system captures the electricity generated by the renewable energy power generation system. The energy storage and delivery system can later deliver the stored electricity to the electrical grid when the renewable energy power generation system is not operable (e.g., at night time, during windless conditions). Accordingly, the energy storage and delivery system operates like a battery for the renewable energy power generation system and can deliver off-hours electricity from a renewable energy power generation system to the electrical grid.

In implementations described above, the energy storage and delivery system 1000, 1000', 1000" lifts blocks 1300 to store electrical energy as potential energy and lowers blocks 1300 to generate electricity. In one implementation, the elevator cage assembly 1400 can be operated with excess power from an electricity grid. The amount of energy recovered by the energy storage system 1000, 1000', 1000" for every unit of energy used to lift the blocks 1300 can optionally be 80-90%.

Additional Embodiments

In embodiments of the present invention, an energy storage system, a method of operating the same, and elevator cage assembly or trolley for use in the same, may be in accordance with any of the following clauses:

Clause 1: An energy storage and delivery system, comprising:

- one or more modules, each module comprising
  - a plurality of blocks, and
  - a frame having a vertical height above a foundation defined by a plurality of rows that extend horizontally, the frame including
    - an upper section having a first set of rows, each of the first set of rows configured to receive and support a plurality of blocks thereon,
    - a lower section having a second set of rows, each of the second set of rows configured to receive and support a plurality of blocks thereon,
    - an intermediate section between the upper section and the lower section that is free of blocks,
    - a pair of elevator shafts disposed on opposite ends of the plurality of rows, and
    - an elevator cage assembly movably disposed in each of the pair of elevator shafts and operatively coupled to an electric motor-generator, the elevator cage assembly sized to receive and support one or more blocks therein,
- wherein the elevator cage assembly in each of the pair of elevator shafts is operable to move one or more blocks from alternating rows of the second set of rows to corresponding alternating rows of the first set of rows to store and amount of electrical energy corresponding to a potential energy amount of said blocks, and wherein the elevator cage assembly in each of the pair of elevator shafts is operable to move one or more blocks from alternating rows of the first set of rows to corresponding alternating rows of the second set of rows under a force of gravity to generate an amount of electricity, the elevator cage assembly moving said blocks between each of the second set of rows and each of the corresponding first set of rows along a same vertical distance.

Clause 2: The system of clause 1, wherein the intermediate section is configured to house one or more vertical farming units.

Clause 3: The system of any preceding clause, wherein the elevator cage assembly in each of the pair or elevator shafts is operable to move the blocks between the first set of rows and the second set of rows so that the average distribution of load on the foundation of the module remains substantially constant.

Clause 4: The system of any preceding clause, wherein the frame includes a plurality of columns defined by one or more pillars that support beams thereon, each pair of beams defining a row in the first and second set of rows that extends orthogonal to the columns, the beams configured to support the blocks on a top surface thereof, each beams having a longitudinal channel below the top surface.

Clause 5: The system of clause 4, further comprising a plurality of cross-members that extend between the columns and provide diagonal bracing therebetween along a length of the rows.

Clause 6: The system of clause 4, wherein each row in one or both of the first set of rows and the second set of rows includes a trolley movably coupled between the pair of beams that define the row, the trolley configured to extend between the channels of the pair of beams that define the row and travel below the blocks disposed on the pair of beams that define the row, the trolley operable to lift a block above the pair of beams and to move said block horizontally along the row.

Clause 7: The system of clause 6, wherein the trolley comprises wheel assemblies that extend within the channel of the pair of beams, a frame that extends between the pair of beams, and support pistons operable to lift the block above the pair of beams for horizontal movement of the block along the row and operable to lower the block onto the pair of beams to fix a position of the block on the row.

Clause 8: The system of clause 6, wherein the elevator cage assembly comprises an elevator cage movably coupled to a base, the elevator cage configured to move laterally relative to the base to facilitate positioning of a bottom support of the elevator cage under a block to pick up the block.

Clause 9: The system of clause 8, wherein the elevator cage picks-up the block from a row by actuating one or more support members movably coupled to the bottom support of the elevator cage to lift the block off the pair of beams of the row.

Clause 10: The system of clause 8, wherein the elevator cage assembly comprises a sliding mechanism interposed between the base and the elevator cage that includes a linear actuator actuatable to move the elevator cage laterally relative to the base of the elevator cage assembly.

Clause 11: The system of any preceding clause, wherein the one or more modules are four modules in a square arrangement in plan view so that the rows of each module extend orthogonal to the rows in adjacent modules to thereby provide the four modules with automatic bracing against wind and seismic forces.

Clause 12: The system of any preceding clause, wherein the one or more modules are two modules arranged in-line so that the rows of each module are substantially aligned.

Clause 13: An energy storage and delivery system, comprising:

a plurality of blocks, and a frame having a vertical height above a foundation defined by a plurality of rows that extend horizontally, the frame including an upper section having a first set of rows, each of the first set of rows configured to receive and support a plurality of blocks thereon, a lower section having a second set of rows, each of the second set of rows configured to receive and support a plurality of blocks thereon, an intermediate section between the upper section and the lower section that is free of blocks, a pair of elevator shafts disposed on opposite ends of the plurality of rows;

a trolley movably coupled to each row in one or both of the first set of rows and the second set of rows, the trolley operable to travel beneath the blocks in the row and configured to lift a block for movement of said block horizontally along the row; and an elevator cage assembly movably disposed in each of the pair of elevator shafts and operatively coupled to an electric motor-generator, the elevator cage assembly sized to hold and support the block therein while moving along the elevator shaft, the elevator cage assembly comprising an elevator cage movably coupled to a base via a sliding mechanism, the sliding mechanism comprising a linear actuator selectively actuatable to laterally displace the elevator cage relative to the base of the elevator cage assembly, wherein the elevator cage assembly in each of the pair of elevator shafts is operable to move one or more blocks from alternating rows of the second set of rows to corresponding alternating rows of the first set of rows to store and amount of electrical energy corresponding to a potential energy amount of said blocks, and wherein the elevator cage assembly in each of the pair of elevator shafts is operable to move one or more of the blocks from alternating rows of the first set of rows to corresponding alternating rows of the second set of rows under a force of gravity to generate an amount of electricity, the elevator cage assembly moving said blocks between each of the second set of rows and each of the corresponding first set of rows along a same vertical distance.

Clause 14: The system of clause 13, wherein the intermediate section is configured to house one or more vertical farming units.

Clause 15: The system of any of clauses 13-14, wherein the elevator cage in each of the pair or elevator shafts is operable to move the blocks between the first set of rows and the second set of rows so that the average distribution of load on the foundation of the module remains substantially constant.

Clause 16: The system of any of clauses 13-15, wherein each row in one or both of the first set of rows and the second set of rows is defined by a pair of beams, the trolley movably coupled between the pair of beams.

Clause 17: A method for storing and generating electricity via an energy storage and delivery system of any preceding clause, comprising:

operating a pair of elevator cage assemblies on opposite ends of a plurality of rows of a frame to move a plurality of blocks between a first set of rows in an upper section of the frame and a corresponding second set of rows in a lower section of the frame disposed below an intermediate section of the frame that is free of the blocks, wherein operating each of the pair of elevator cage assemblies includes positioning the elevator cage assembly at or near a row, moving an elevator cage laterally in a first direction relative to a base of the elevator cage assembly to position a bottom support of the elevator cage under a block on the row, actuating one or more movable supports coupled to the bottom support to lift the block off the row, moving the elevator cage laterally in a second direction opposite the first direction relative to the base of the elevator cage assembly to position the elevator cage over the base, and moving the elevator cage assembly vertically along its associated elevator shaft, the elevator cage assemblies moving said blocks between each of the second set of rows and each of the corresponding first set of rows by an equal vertical distance.

Clause 18: The method of clause 17, wherein moving the one or more blocks from alternating rows of the second set of rows to corresponding alternating rows of the first set of rows or moving the one or more blocks from alternating rows of the first set of rows to corresponding alternating rows of the second set of rows includes positioning the blocks so that the average distribution of load on a foundation of the frame remains substantially constant.

Clause 19: The method of any of clauses 17-18, wherein moving the one or more blocks from alternating rows of the second set of rows to corresponding alternating rows of the first set of rows includes sequentially moving a block from each of the alternating rows of the second set of rows to the corresponding alternating rows of the first set of rows before returning to a first of the alternating rows of the second set of rows.

Clause 20: The method of any of clauses 17-19, wherein moving the one or more blocks from alternating rows of the first set of rows to corresponding alternating rows of the second set of rows includes sequentially moving a block from each of the alternating rows of the first set of rows to the corresponding alternating rows of the second set of rows before returning to a first of the alternating rows of the first set of rows.

Clause 21: The method of any of clauses 17-20, wherein moving the one or more blocks from alternating rows of the second set of rows to corresponding alternating rows of the first set of rows includes simultaneously moving a block from each of the alternating rows of the second set of rows to the corresponding alternating rows of the first set of rows.

Clause 22: The method of any of clauses 17-21, wherein moving the one or more blocks from alternating rows of the first set of rows to corresponding alternating rows of the second set of rows includes simultaneously moving a block from each of the alternating rows of the first set of rows to the corresponding alternating rows of the second set of rows.

Clause 23: The method of any of clauses 17-22, wherein moving the one or more of the plurality blocks from alternating rows of the second set of rows to corresponding alternating rows of the first set of rows includes horizontally moving the one or more blocks along the one or more rows of the second set of rows with a trolley that travels under the blocks and selectively lifts the blocks above beams of the rows to deliver the one or more blocks to an end portion of the row.

Clause 24: The method of clause 23, wherein moving an elevator cage laterally in a first direction relative to a base of the elevator cage assembly to position a bottom support of the elevator cage under a block on the row comprises actuating a linear actuator of a sliding mechanism interposed between the base and the elevator cage of the elevator cage assembly to laterally move the elevator cage relative to the base.

Clause 25: A method for storing and generating electricity with an energy storage and delivery system of any preceding claim, comprising:

horizontally moving one or more blocks along a row of a first set of rows in an upper section of a frame with a trolley toward an end portion of the row; and operating an elevator cage assembly to vertically move the one or more blocks to a row of a second set of rows of the frame under a force of gravity to generate an amount of electricity via an electric motor-generator electrically coupled to the elevator cages, wherein operating the elevator cage assembly includes positioning the elevator cage assembly at or near the row, moving an elevator cage laterally in a first direction relative to a base of the elevator cage assembly to position a bottom support of the elevator cage under a block at the end portion of the row, actuating one or more movable supports coupled to the bottom support to lift the block off the row, moving the elevator cage laterally in a second direction opposite the first direction relative to the base of the elevator cage assembly to position the elevator cage over the base, and moving the elevator cage assembly vertically along its associated elevator shaft.

Clause 26: The method of clause 25, wherein operating the elevator cage assembly further comprises vertically moving the block to a desired row, generally aligning the elevator cage assembly with the row, moving an elevator cage laterally in the first direction relative to the base of the elevator cage assembly to position the block over the end portion of the row, actuating one or more movable supports coupled to the bottom support to lower the block onto the end portion of the row, moving the elevator cage laterally in a second direction opposite the first direction relative to the base of the elevator cage assembly to position the elevator cage over the base, and moving the elevator cage assembly vertically along its associated elevator shaft.

Clause 27: An elevator cage assembly for use in an energy storage and delivery system of any preceding claim to move blocks between a lower elevation of a tower and a higher elevation of a tower to store energy and to move blocks between the higher elevation of the tower and the lower elevation of the tower under force of gravity to generate electricity, the elevator cage assembly comprising:

an elevator cage comprising a top support coupleable to one or more cables or ribbons, a rear support attached to the top support and a bottom support attached to the rear support, the elevator cage having a C shaped side profile;

a base disposed below the elevator cage; and a sliding mechanism interposed between the elevator cage and the base and actuatable to laterally displace the elevator cage relative to the base.

Clause 28: The elevator cage of clause 27, wherein the sliding mechanism comprises a linear actuator actuatable to laterally displace the elevator cage relative to the base.

Clause 29: The elevator cage of any of clauses 27-28, wherein the bottom support comprises one or more support members actuatable to extend to different heights relative to the bottom support, the one or more support members configured to support a block thereon.

Clause 30: An elevator cage assembly for use in an energy storage and delivery system of any preceding claim to move blocks between a lower elevation of a tower and a higher elevation of a tower to store energy and to move blocks between the higher elevation of the tower and the lower elevation of the tower under force of gravity to generate electricity, the elevator cage assembly comprising:

an elevator cage comprising a top support coupleable to one or more cables or ribbons, a rear support attached to the top support and a bottom support attached to the rear support, the elevator cage having a C shaped side profile;

a base disposed below the elevator cage;

a sliding mechanism interposed between the elevator cage and the base and actuatable to laterally displace the elevator cage relative to the base;

a frame movably coupled to a bottom support of the elevator cage; and' a plurality of pistons coupled between the frame and the bottom support of the elevator cage, one or more of the pistons being selective actuatable to laterally move the frame and/or to rotate the frame relative to the elevator cage to adjust an orientation of a block supported by the frame to center the block relative to the elevator cage.

Clause 31: The elevator cage assembly of clause 30, wherein the sliding mechanism comprises a linear actuator actuatable to laterally displace the elevator cage relative to the base.

Clause 32: The elevator cage assembly of any of clauses 30-31, further comprising one or more support members attached to the frame and configured to support a block thereon.

Clause 33: The elevator cage assembly of any of clauses 30-32, wherein the plurality of pistons include a pair of pistons configured to move the frame laterally in a widthwise direction of the elevator cage.

Clause 34: The elevator cage assembly of any of clauses 30-33, wherein the plurality of pistons include a pair of pistons configured to move the frame in a depthwise direction of the elevator cage.

Clause 35: The elevator cage assembly of any of clauses 30-34, wherein actuation of one or more of the pistons moves the frame in one or more of a widthwise direction of the elevator cage, a depthwise direction of the elevator cage, and a clockwise or counterclockwise rotation direction relative to the elevator cage.

Clause 36: The elevator cage assembly of any of clauses 30-35, wherein the pistons communicate with one or more position sensors.

Clause 37: The elevator cage assembly of any of clauses 30-36, further comprising one or more cameras mounted on the elevator cage and configured to visualize an orientation of a block carried by the elevator cage, the one or more cameras configured to communicate information associated with the orientation of the block to a controller, the controller configured to selectively actuate one or more of the pistons to move the frame relative to the bottom support of the elevator cage to center the block relative to the elevator cage.

Clause 38: The elevator cage assembly of any of clauses 30-37, wherein the pistons are hydraulic pistons.

Clause 39: An energy storage and delivery system, comprising:

a plurality of blocks;

a frame having a vertical height above a foundation defined by a plurality of rows that extend horizontally, the frame including an elevator shaft;

an elevator cage assembly movable along the elevator shaft and operatively coupled to an electric motor-generator, the elevator cage assembly sized to hold and support the block therein while moving along the elevator shaft, the elevator cage assembly comprising an elevator cage movably coupled to a base via a sliding mechanism, the sliding mechanism comprising a linear actuator selectively actuatable to laterally displace the elevator cage relative to the base of the elevator cage assembly a trolley movably coupled to a top of the frame and comprising a base, a frame pivotally coupled to the base, a front roller coupled to a front portion of the base, a rear roller coupled to a rear portion of the frame, and a piston-cylinder assembly actuatable to move the frame relative to the base between a compact position of the trolley where the frame is adjacent the base so that the rear roller is at a first vertical position and an extended position of the trolley where a rear portion of the frame is spaced from the base so that the rear roller is at a second vertical position; and a ribbon that couples to the elevator cage assembly, extends over the front roller and the rear roller of the trolley and extends to the electric motor-generator, wherein actuation of the piston-cylinder assembly to move the trolley to the extended position lifts the block with the elevator cage assembly by an amount greater than an elongation of the ribbon, and wherein actuation of the piston-cylinder assembly to move the trolley to the compact position lowers the block and releases the elongation of the ribbon.

Clause 40: The system of clause 39, further comprising a hydraulic accumulator in fluid communication with the piston-cylinder assembly, wherein actuation of the piston-cylinder assembly to move the trolley to the compact position charges the hydraulic accumulator.

Clause 41: The system of any of clauses 39-40, further comprising a lever arm connected to the base and to the frame and actuatable by the piston of the piston-cylinder assembly to move between a collapsed configuration with the trolley is in the compact position and an extended configuration when the trolley is in the extended position.

Clause 42: A trolley for an energy storage and delivery system to move blocks with an elevator cage between floors of a tower, comprising:

a base;

a frame pivotally coupled to the base;

a front roller coupled to a front portion of the base;

a rear roller coupled to a rear portion of the frame, the front roller and the rear roller configured to receive thereover a ribbon that couples to the elevator cage; and a piston-cylinder assembly actuatable to move the frame relative to the base between a compact position of the trolley where the frame is adjacent the base so that the rear roller is at a first vertical position and an extended position of the trolley where a rear portion of the frame is spaced from the base so that the rear roller is at a second vertical position, wherein actuation of the piston-cylinder assembly to move the trolley to the extended position lifts the block with the elevator cage by an amount greater than an elongation of the ribbon, and wherein actuation of the piston-cylinder assembly to move the trolley to the compact position lowers the block and releases the elongation of the ribbon.

Clause 43: The trolley of clause 42, further comprising a hydraulic accumulator in fluid communication with the piston-cylinder assembly, wherein actuation of the piston-cylinder assembly to move the trolley to the compact position charges the hydraulic accumulator.

Clause 44: The trolley of any of clauses 42-43, further comprising a lever arm connected to the base and to the frame and actuatable by the piston of the piston-cylinder assembly to move between a collapsed configuration with the trolley is in the compact position and an extended configuration when the trolley is in the extended position.

Clause 45: An energy storage and delivery system, comprising:

a plurality of blocks;

a frame having a vertical height above a foundation defined by a plurality of rows that extend horizontally, the frame including an elevator shaft;

an elevator cage assembly movable along the elevator shaft and operatively coupled to an electric motor-generator, the elevator cage assembly sized to hold and support a block therein while moving along the elevator shaft, the elevator cage assembly comprising an elevator cage movably coupled to a base via a sliding mechanism, the sliding mechanism comprising a linear actuator selectively actuatable to laterally displace the elevator cage relative to the base of the elevator cage assembly;

a trolley movably coupled to a top of the frame and comprising a trolley base, a trolley frame pivotally coupled to the trolley base, a front roller coupled to a front portion of the trolley base, a rear roller coupled to a rear portion of the trolley frame, and a piston-cylinder assembly actuatable to move the trolley frame relative to the trolley base between a compact position of the trolley where the trolley frame is adjacent the trolley base so that the rear roller is at a first vertical position and an extended position of the trolley where a rear portion of the trolley frame is spaced from the trolley base so that the rear roller is at a second vertical position; and a ribbon that couples to the elevator cage assembly, extends over the front roller and the rear roller of the trolley and extends to the electric motor-generator, wherein actuation of the piston-cylinder assembly to move the trolley to the extended position lifts the block with the elevator cage assembly by an amount greater than an elongation of the ribbon, and wherein actuation of the piston-cylinder assembly to move the trolley to the compact position lowers the block and releases the elongation of the ribbon.

Clause 46: The system of clause 45, further comprising a hydraulic accumulator in fluid communication with the piston-cylinder assembly, wherein actuation of the piston-cylinder assembly to move the trolley to the compact position charges the hydraulic accumulator.

Clause 47: The system of clause 45, further comprising a lever arm connected to the trolley base and to the trolley frame and actuatable by the piston of the piston-cylinder assembly to move between a collapsed configuration when the trolley is in the compact position and an extended configuration when the trolley is in the extended position.

Clause 48: The system of clause 45, wherein the elevator cage assembly further comprises a support frame movably coupled to a bottom support of the elevator cage and a plurality of pistons coupled between the support frame and the bottom support of the elevator cage, one or more of the pistons being selective actuatable to laterally move the support frame and/or to rotate the support frame relative to the elevator cage to adjust an orientation of a block supported by the support frame to center the block relative to the elevator cage.

Clause 49: An elevator cage assembly for use in an energy storage and delivery system to move blocks between a lower elevation of a tower and a higher elevation of the tower to store energy and to move blocks between the higher elevation of the tower and the lower elevation of the tower to generate electricity, the elevator cage assembly comprising:

an elevator cage comprising a top support coupleable to one or more cables or ribbons, a rear support attached to the top support and a bottom support attached to the rear support, the elevator cage having a C shaped side profile;

a base disposed below the elevator cage;

a sliding mechanism interposed between the elevator cage and the base and actuatable to laterally displace the elevator cage relative to the base;

a frame movably coupled to a bottom support of the elevator cage; and' a plurality of pistons coupled between the frame and the bottom support of the elevator cage, one or more of the pistons being selective actuatable to laterally move the frame and/or to rotate the frame relative to the elevator cage to adjust an orientation of a block supported by the frame to center the block relative to the elevator cage.

Clause 50: The elevator cage assembly of clause 49, wherein the sliding mechanism comprises a linear actuator actuatable to laterally displace the elevator cage relative to the base.

Clause 51: The elevator cage assembly of any of clauses 49-50, further comprising one or more support members attached to the frame and configured to support a block thereon.

Clause 52: The elevator cage assembly of any of clauses 49-51, wherein the plurality of pistons include a pair of pistons configured to move the frame laterally in a widthwise direction of the elevator cage.

Clause 53: The elevator cage assembly of any of clauses 49-52, wherein the plurality of pistons include a pair of pistons configured to move the frame in a depthwise direction of the elevator cage.

Clause 54: The elevator cage assembly of any of clauses 49-53, wherein actuation of one or more of the pistons moves the frame in one or more of a widthwise direction of the elevator cage, a depthwise direction of the elevator cage, and a clockwise or counterclockwise rotation direction relative to the elevator cage.

Clause 55: The elevator cage assembly of any of clauses 49-54, wherein the pistons communicate with one or more position sensors.

Clause 56: The elevator cage assembly of any of clauses 49-55, further comprising one or more cameras mounted on the elevator cage and configured to visualize an orientation of a block carried by the elevator cage, the one or more cameras configured to communicate information associated with the orientation of the block to a controller, the controller configured to selectively actuate one or more of the pistons to move the frame relative to the bottom support of the elevator cage to center the block relative to the elevator cage.

Clause 57: The elevator cage assembly of any of clauses 49-56, wherein the pistons are hydraulic pistons.

Clause 58: A trolley for an energy storage and delivery system to move blocks with an elevator cage between floors of a tower, comprising:

a base;

a frame pivotally coupled to the base;

a front roller coupled to a front portion of the base;

a rear roller coupled to a rear portion of the frame, the front roller and the rear roller configured to receive thereover a ribbon configured to couple to the elevator cage; and a piston-cylinder assembly actuatable to move the frame relative to the base between a compact position of the trolley where the frame is adjacent the base so that the rear roller is at a first vertical position and an extended position of the trolley where a rear portion of the frame is spaced from the base so that the rear roller is at a second vertical position, wherein actuation of the piston-cylinder assembly to move the trolley to the extended position is configured to lift the block with the elevator cage by an amount greater than an elongation of the ribbon, and wherein actuation of the piston-cylinder assembly to move the trolley to the compact position is configured to lower the block and to release the elongation of the ribbon.

Clause 59: The trolley of clause 58, further comprising a hydraulic accumulator in fluid communication with the piston-cylinder assembly, wherein actuation of the piston-cylinder assembly to move the trolley to the compact position charges the hydraulic accumulator.

Clause 60: The trolley of clause 58, further comprising a lever arm connected to the base and to the frame and actuatable by the piston of the piston-cylinder assembly to move between a collapsed configuration with the trolley is in the compact position and an extended configuration when the trolley is in the extended position.

Clause 61: An energy storage and delivery system, comprising:

one or more modules, each module comprising a frame having a vertical height above a foundation defined by a plurality of rows that extend horizontally, the frame including an upper section having a first set of rows, each of the first set of rows configured to receive and support a plurality of blocks thereon, a lower section having a second set of rows, each of the second set of rows configured to receive and support a plurality of blocks thereon, an intermediate section between the upper section and the lower section, a pair of elevator shafts disposed on opposite ends of the plurality of rows, and an elevator cage assembly movably disposed in each of the pair of elevator shafts and operatively coupled to an electric motor-generator, the elevator cage assembly sized to receive and support one or more blocks therein, wherein the elevator cage assembly in each of the pair of elevator shafts is operable to move one or more blocks from alternating rows of the second set of rows to corresponding alternating rows of the first set of rows to store and amount of electrical energy corresponding to a potential energy amount of said blocks, and wherein the elevator cage assembly in each of the pair of elevator shafts is operable to move one or more blocks from alternating rows of the first set of rows to corresponding alternating rows of the second set of rows at least partially under a force of gravity to generate an amount of electricity, the elevator cage assembly moving said blocks between each of the second set of rows and each of the corresponding first set of rows along a same vertical distance.

Clause 62: The system of clause 61, wherein each row in one or both of the first set of rows and the second set of rows includes a trolley movably coupled to the row and operable to lift a block above the row and to move said block horizontally along the row.

Clause 63: The system of clause 61, wherein the elevator cage assembly comprises an elevator cage movably coupled to a base, the elevator cage configured to move laterally relative to the base to facilitate positioning of a bottom support of the elevator cage under a block to pick up the block.

Clause 64: The system of any of clauses 61-63, wherein the elevator cage assembly further comprises a support frame movably coupled to the bottom support of the elevator cage and a plurality of pistons coupled between the support frame and the bottom support of the elevator cage, one or more of the pistons being selective actuatable to laterally move the support frame and/or to rotate the support frame relative to the elevator cage to adjust an orientation of a block supported by the support frame to center the block relative to the elevator cage.

Clause 65: The system of clause 63, wherein the elevator cage assembly comprises a sliding mechanism interposed between the base and the elevator cage that includes a linear actuator actuatable to move the elevator cage laterally relative to the base of the elevator cage assembly.

Clause 66: The system of any of clauses 61-65, wherein the one or more modules are four modules in a square arrangement in plan view so that the rows of each module extend orthogonal to the rows in adjacent modules to thereby provide the four modules with automatic bracing against wind and seismic forces.

Clause 67: The system of any of clauses 61-65, wherein the one or more modules are two modules arranged in-line so that the rows of each module are substantially aligned.

Clause 68: An energy storage and delivery system, comprising:

a frame having a vertical height above a foundation defined by a plurality of rows that extend horizontally, the frame including an upper section having a first set of rows, each of the first set of rows configured to receive and support a plurality of blocks thereon, a lower section having a second set of rows, each of the second set of rows configured to receive and support a plurality of blocks thereon, an intermediate section between the upper section and the lower section, a pair of elevator shafts disposed on opposite ends of the plurality of rows;

a trolley movably coupled to each row in one or both of the first set of rows and the second set of rows, the trolley operable to travel beneath the blocks in the row and configured to lift a block for movement of said block horizontally along the row; and an elevator cage assembly movably disposed in each of the pair of elevator shafts and operatively coupled to an electric motor-generator, the elevator cage assembly sized to hold and support the block therein while moving along the elevator shaft, the elevator cage assembly comprising an elevator cage movably coupled to a base via a sliding mechanism, the sliding mechanism comprising a linear actuator selectively actuatable to laterally displace the elevator cage relative to the base of the elevator cage assembly, wherein the elevator cage assembly in each of the pair of elevator shafts is operable to move one or more blocks from alternating rows of the second set of rows to corresponding alternating rows of the first set of rows to store and amount of electrical energy corresponding to a potential energy amount of said blocks, and wherein the elevator cage assembly in each of the pair of elevator shafts is operable to move one or more of the blocks from alternating rows of the first set of rows to corresponding alternating rows of the second set of rows under a force of gravity to generate an amount of electricity, the elevator cage assembly moving said blocks between each of the second set of rows and each of the corresponding first set of rows along a same vertical distance.

Clause 69: The system of clause 68, wherein the elevator cage assembly further comprises a support frame movably coupled to a bottom support of the elevator cage and a plurality of pistons coupled between the support frame and the bottom support of the elevator cage, one or more of the pistons being selective actuatable to laterally move the support frame and/or to rotate the support frame relative to the elevator cage to adjust an orientation of a block supported by the support frame to center the block relative to the elevator cage.

Clause 70: A method for storing and generating electricity, comprising:

operating a pair of elevator cages on opposite ends of a plurality of rows of a frame to move a plurality of blocks between a first set of rows in an upper section of the frame and a corresponding second set of rows in a lower section of the frame disposed below an intermediate section of the frame that is free of the blocks, wherein operating each of the pair of elevator cage assemblies includes positioning the elevator cage assembly at or near a row, moving an elevator cage laterally in a first direction relative to a base of the elevator cage assembly to position a bottom support of the elevator cage under a block on the row, actuating a trolley movably coupled to a top of the frame and operatively coupled to the elevator cage assembly via one or more cables from a compact position to an extended position to lift the elevator cage assembly so that the bottom support of the elevator cage moves upward toward the block to move the block off the row, moving the elevator cage laterally in a second direction opposite the first direction relative to the base of the elevator cage assembly to position the elevator cage over the base, and moving the elevator cage assembly vertically along its associated elevator shaft, the elevator cage assemblies moving said blocks between each of the second set of rows and each of the corresponding first set of rows by an equal vertical distance.

Clause 71: The method of clause 70, wherein moving an elevator cage laterally in a first direction relative to a base of the elevator cage assembly to position a bottom support of the elevator cage under a block on the row comprises actuating a linear actuator of a sliding mechanism interposed between the base and the elevator cage of the elevator cage assembly to laterally move the elevator cage relative to the base.

Clause 72: The method of any of clauses 70-71, further comprising centering the block relative to the elevator cage by moving a support frame of the elevator cage laterally and/or rotatably relative to the bottom support to adjust an orientation of the block supported by the support frame.

Clause 73: A method for storing and generating electricity, comprising:

operating a pair of elevator cages on opposite ends of a plurality of rows of a frame to move a plurality of blocks between a first set of rows in an upper section of the frame and a corresponding second set of rows in a lower section of the frame disposed below an intermediate section of the frame that is free of the blocks, wherein operating each of the pair of elevator cage assemblies includes positioning the elevator cage assembly at or near a row, moving an elevator cage laterally in a first direction relative to a base of the elevator cage assembly to position a bottom support of the elevator cage under a block on the row, lifting the block with the elevator cage, centering the block relative to the elevator cage by moving a support frame of the elevator cage laterally and/or rotatably relative to the bottom support to adjust an orientation of the block supported by the support frame, moving the elevator cage laterally in a second direction opposite the first direction relative to the base of the elevator cage assembly to position the elevator cage over the base, and moving the elevator cage assembly vertically along its associated elevator shaft, the elevator cage assemblies moving said blocks between each of the second set of rows and each of the corresponding first set of rows by an equal vertical distance.

Clause 74: The method of clause 73, wherein moving an elevator cage laterally in a first direction relative to a base of the elevator cage assembly to position a bottom support of the elevator cage under a block on the row comprises actuating a linear actuator of a sliding mechanism interposed between the base and the elevator cage of the elevator cage assembly to laterally move the elevator cage relative to the base.

Clause 75: The method of any of clauses 73-74, wherein lifting the block with the elevator cage includes actuating a trolley movably coupled to a top of the frame and operatively coupled to the elevator cage assembly via one or more cables to an extended position to lift the elevator cage assembly so that the support frame contacts and lifts the block off the row.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. An energy storage and delivery system, comprising:

a plurality of blocks;

a frame having a vertical height above a foundation defined by a plurality of rows that extend horizontally, the frame including an elevator shaft;

an elevator cage assembly movable along the elevator shaft and operatively coupled to an electric motor-generator, the elevator cage assembly sized to hold and support a block therein while moving along the elevator shaft, the elevator cage assembly comprising an elevator cage movably coupled to a base via a sliding mechanism, the sliding mechanism comprising a linear actuator selectively actuatable to laterally displace the elevator cage relative to the base of the elevator cage assembly;

a trolley movably coupled to a top of the frame and comprising a trolley base, a trolley frame pivotally coupled to the trolley base, a front roller coupled to a front portion of the trolley base, a rear roller coupled to a rear portion of the trolley frame, and a piston-cylinder assembly actuatable to move the trolley frame relative to the trolley base between a compact position of the trolley where the trolley frame is adjacent the trolley base so that the rear roller is at a first vertical position and an extended position of the trolley where a rear portion of the trolley frame is spaced from the trolley base so that the rear roller is at a second vertical position; and a ribbon that couples to the elevator cage assembly, extends over the front roller and the rear roller of the trolley and extends to the electric motor-generator, wherein actuation of the piston-cylinder assembly to move the trolley to the extended position lifts the block with the elevator cage assembly by an amount greater than an elongation of the ribbon, and wherein actuation of the piston-cylinder assembly to move the trolley to the compact position lowers the block and releases the elongation of the ribbon.

2. The system of claim 1, further comprising a hydraulic accumulator in fluid communication with the piston-cylinder assembly, wherein actuation of the piston-cylinder assembly to move the trolley to the compact position charges the hydraulic accumulator.

3. The system of claim 1, further comprising a lever arm connected to the trolley base and to the trolley frame and actuatable by a piston of the piston-cylinder assembly to move between a collapsed configuration when the trolley is in the compact position and an extended configuration when the trolley is in the extended position.

4. The system of claim 1, wherein the elevator cage assembly further comprises a support frame movably coupled to a bottom support of the elevator cage and a plurality of pistons coupled between the support frame and the bottom support of the elevator cage, one or more of the plurality of pistons being selective actuatable to laterally move the support frame and/or to rotate the support frame relative to the elevator cage to adjust an orientation of a block supported by the support frame to center the block relative to the elevator cage.

5. The system of claim 4, further comprising one or more cameras mounted on the elevator cage and configured to visualize an orientation of a block carried by the elevator cage, the one or more cameras configured to communicate information associated with the orientation of the block to a controller, the controller configured to selectively actuate one or more of the plurality of pistons to move the support frame relative to the bottom support of the elevator cage to center the block relative to the elevator cage.

6. The system of claim 1, wherein the elevator cage comprises a top support coupleable to the ribbon, a rear support attached to the top support, and a bottom support attached to the rear support.

7. The system of claim 6, wherein the elevator cage has a C shaped side profile.

8. The system of claim 6, wherein the elevator cage comprises one or more support members coupled to the bottom support configured to support a block thereon.

9. The system of claim 8, wherein the one or more supports members are fixed at a set height.

10. The system of claim 1, wherein actuation of the piston-cylinder assembly to move the trolley to the extended position elongates the ribbon by 1% of a total length of the ribbon.

11. The system of claim 1, wherein actuation of the piston-cylinder assembly to move the trolley from the compact position to the extended position is configured to lift the elevator cage so that the elevator cage moves upward toward the block to move the block off a row of the plurality of rows.

12. The system of claim 1, wherein the actuation of the piston-cylinder assembly to move the trolley from the extended position to the compact position is configured to provide an elastic recovery system to recover a portion energy expended by elongating the ribbon.

13. A trolley for an energy storage and delivery system to move blocks with an elevator cage between floors of a tower, comprising:

a base;

a frame pivotally coupled to the base;

a front roller coupled to a front portion of the base;

a rear roller coupled to a rear portion of the frame, the front roller and the rear roller configured to receive thereover a ribbon configured to couple to the elevator cage; and a piston-cylinder assembly actuatable to move the frame relative to the base between a compact position of the trolley where the frame is adjacent the base so that the rear roller is at a first vertical position and an extended position of the trolley where a rear portion of the frame is spaced from the base so that the rear roller is at a second vertical position, wherein actuation of the piston-cylinder assembly to move the trolley to the extended position is configured to lift the block with the elevator cage by an amount greater than an elongation of the ribbon, and wherein actuation of the piston-cylinder assembly to move the trolley to the compact position is configured to lower the block and to release the elongation of the ribbon.

14. The trolley of claim 13, further comprising a hydraulic accumulator in fluid communication with the piston-cylinder assembly, wherein actuation of the piston-cylinder assembly to move the trolley to the compact position charges the hydraulic accumulator.

15. The trolley of claim 13, further comprising a lever arm connected to the base and to the frame and actuatable by a piston of the piston-cylinder assembly to move between a collapsed configuration with the trolley is in the compact position and an extended configuration when the trolley is in the extended position.

16. The system of claim 13, wherein actuation of the piston-cylinder assembly to move the trolley from the compact position to the extended position is configured to lift the elevator cage so that the elevator cage moves upward toward the block to move the block off a row of the frame.

17. The system of claim 13, wherein the actuation of the piston-cylinder assembly to move the trolley from the extended position to the compact position is configured to provide an elastic recovery system to recover a portion energy expended by elongating the ribbon.

18. A method for storing and generating electricity, comprising:

operating a pair of elevator cage assemblies on opposite ends of a plurality of rows of a frame to move a plurality of blocks between a first set of rows in an upper section of the frame and a corresponding second set of rows in a lower section of the frame disposed below an intermediate section of the frame that is free of the blocks, wherein operating each of the pair of elevator cage assemblies includes positioning the elevator cage assembly at or near a row, moving an elevator cage of the elevator cage assembly laterally in a first direction relative to a base of the elevator cage assembly to position a bottom support of the elevator cage under a block on the row, actuating a trolley movably coupled to a top of the frame and operatively coupled to the elevator cage assembly via one or more cables from a compact position to an extended position to lift the elevator cage assembly so that the bottom support of the elevator cage moves upward toward the block to move the block off the row, moving the elevator cage laterally in a second direction opposite the first direction relative to the base of the elevator cage assembly to position the elevator cage over the base, and moving the elevator cage assembly vertically along an associated elevator shaft, the elevator cage assemblies moving said blocks between each of the second set of rows and each of the corresponding first set of rows by an equal vertical distance.

19. The method of claim 18, wherein moving an elevator cage laterally in a first direction relative to a base of the elevator cage assembly to position a bottom support of the elevator cage under a block on the row comprises actuating a linear actuator of a sliding mechanism interposed between the base and the elevator cage of the elevator cage assembly to laterally move the elevator cage relative to the base.

20. The method of claim 18, further comprising centering the block relative to the elevator cage by moving a support frame of the elevator cage laterally and/or rotatably relative to the bottom support to adjust an orientation of the block supported by the support frame.

* * * * *